US008416103B2

(12) United States Patent
Gutowitz et al.

(10) Patent No.: US 8,416,103 B2
(45) Date of Patent: Apr. 9, 2013

(54) KEYPADS ROW SIMILAR TO A TELEPHONE KEYPAD

(76) Inventors: Howard Andrew Gutowitz, New York, NY (US); Dimitrios Kechagias, Brooklyn, NY (US)

( * ) Notice: Subject to any disclaimer, the term of this patent is extended or adjusted under 35 U.S.C. 154(b) by 0 days.

(21) Appl. No.: 12/441,327

(22) PCT Filed: Sep. 14, 2007

(86) PCT No.: PCT/US2007/078573
§ 371 (c)(1),
(2), (4) Date: Jan. 5, 2010

(87) PCT Pub. No.: WO2008/034112
PCT Pub. Date: Mar. 20, 2008

(65) Prior Publication Data
US 2010/0134328 A1 Jun. 3, 2010

Related U.S. Application Data

(60) Provisional application No. 60/844,592, filed on Sep. 14, 2006, provisional application No. 60/905,054, filed on Mar. 5, 2007, provisional application No. 60/932,449, filed on May 31, 2007, provisional application No. 60/958,775, filed on Jul. 9, 2007, provisional application No. 60/962,267, filed on Jul. 27, 2007.

(51) Int. Cl.
*H03K 17/94* (2006.01)
(52) U.S. Cl.
USPC ............. 341/22; 345/156; 345/168; 345/169; 345/171; 710/65; 710/67; 710/72; 710/73; 400/472; 704/251; 708/144; 708/145

(58) Field of Classification Search .............. 341/20–22; 400/472, 48; 710/65, 67, 72, 73; 345/156, 345/168, 169, 171; 704/251; 708/144, 145
See application file for complete search history.

(56) References Cited

U.S. PATENT DOCUMENTS 5,375,165 A * 12/1994 Haber et al. ............. 379/110.01
6,005,495 A * 12/1999 Connolly et al. ............... 341/22
(Continued)

FOREIGN PATENT DOCUMENTS

AU 760655 5/2003
AU 2005325740 B2 8/2006
(Continued)

OTHER PUBLICATIONS

"U.S. Appl. No. 09/856,863, Notice of Allowance mailed Nov. 30, 2004", 4 pgs.
(Continued)

*Primary Examiner* — Lam T Mai

(57) ABSTRACT

Keypads are described which are row similar to a standard telephone keypad though they have a different number of columns of base-letter-assigned keys than the standard to which they are related. Smooth sequences of such row-similar keypads are exhibited. Keypads which support both row-similar telephone keypad layouts and reduced layouts corresponding to typewriter standards are disclosed. It is shown how to combine various structural and statistical limitations with row similarity. It is also shown how to embed a row-similar digit layout in row-similar base letter layouts, and how to beneficially provide negative space between keys, construct pseudo standards, and extend or reduce desktop standards or pseudo standards while obeying structural or typability constraints.

69 Claims, 68 Drawing Sheets

U.S. PATENT DOCUMENTS

| | | | | |
|---|---|---|---|---|
| 6,885,317 | B1 * | 4/2005 | Gutowitz | 341/22 |
| 7,583,206 | B2 * | 9/2009 | Volckers | 341/23 |
| 7,633,412 | B2 * | 12/2009 | Lee et al. | 341/22 |
| 7,649,477 | B2 * | 1/2010 | Lee et al. | 341/22 |
| 7,761,175 | B2 * | 7/2010 | Gutowitz et al. | 700/84 |
| RE43,082 | E * | 1/2012 | Gutowitz | 341/22 |
| 8,200,865 | B2 * | 6/2012 | Gutowitz | 710/67 |
| 2003/0073456 | A1 | 4/2003 | Griffin | |
| 2008/0309520 | A1 * | 12/2008 | Wilson | 341/22 |

FOREIGN PATENT DOCUMENTS

| | | |
|---|---|---|
| CA | 2353862 | 11/2007 |
| CA | 2354155 | 10/2010 |
| CN | 1218233 C | 9/2005 |
| JP | 2002/251253 A | 9/2002 |
| WO | WO 98/33111 A | 7/1998 |
| WO | WO-0034880 A1 | 6/2000 |
| WO | WO 03/056784 A | 7/2003 |
| WO | WO-2006080927 A1 | 8/2006 |
| WO | WO-2008034112 A2 | 3/2008 |
| ZA | 2001/4509 | 9/2002 |

OTHER PUBLICATIONS

"U.S. Appl. No. 09/856,863, Preliminary Amendment mailed May 24, 2001", 143 pgs.

"U.S. Appl. No. 11/814,769, Final Office Action mailed Dec. 22, 2010", 10 pgs.

"U.S. Appl. No. 11/814,769, Non Final Office Action mailed Jul. 9, 2010", 9 pgs.

"U.S. Appl. No. 11/814,769, Response filed Apr. 13, 2011 to Final Office Action mailed Dec. 22, 2010", 17 pgs.

"U.S. Appl. No. 11/814,769, Response filed Oct. 6, 2010 to Non Final Office Action mailed Jul. 9, 2010", 16 pgs.

"U.S. Appl. No. 12/747,265, Petition Decision mailed Jan. 3, 2011", 3 pgs.

"U.S. Appl. No. 12/747,265, Petition Decision mailed Sep. 9, 2011", 3 pgs.

"U.S. Appl. No. 12/747,265, Petition Regarding Non-Signing Inventor filed Oct. 22, 2010", 5 pgs.

"U.S. Appl. No. 12/747,265, Re-Petition Regarding Non-Signing Inventor filed Jul. 5, 2011", 6 pgs.

"Australian Application Serial No. 20499/00, Office Action mailed Sep. 12, 2002", 2 pgs.

"Australian Application Serial No. 20499/00, Response filed Mar. 6, 2003 to Office Action mailed Sep. 12, 2002", 19 pgs.

"Canadian Application Serial No. 2,353,862, Office Action mailed Apr. 1, 2005", 5 pgs.

"Canadian Application Serial No. 2,353,862, Office Action mailed Nov. 6, 2006", 3 pgs.

"Canadian Application Serial No. 2,353,862, Response filed May 7, 2007 to Office Action mailed Nov. 6, 2006", 54 pgs.

"Canadian Application Serial No. 2,353,862, Response filed Oct. 2, 2006 to Office Action mailed Apr. 1, 2005", 9 pgs.

"Canadian Application Serial No. 2,354,155, Office Action mailed Jul. 6, 2009", 2 pgs.

"Canadian Application Serial No. 2,354,155, Response filed Jan. 6, 2010 to Office Action mailed Jul. 6, 2009", 3 pgs.

"Chinese Application Serial No. 99814191.7, Notice of Allowance mailed Apr. 29, 2005", 2 pgs.

"Chinese Application Serial No. 99814191.7, Office Action mailed Jan. 9, 2004", 4 pgs.

"Chinese Application Serial No. 99814191.7, Office Action mailed Sep. 24, 2004", 3 pgs.

"Chinese Application Serial No. 99814191.7, Response filed Jun. 21, 2004 to Office Action mailed Jan. 9, 2004", 10 pgs.

"Chinese Application Serial No. 99814191.7, Response filed Dec. 8, 2004 to Office Action mailed Sep. 24, 2004", 3 pgs.

"Eatoni's Amended Complaint", 1:08-CV-10079-WHP—*Eatoni Ergonomics, Inc.* v. *Research in Motion Corp. and Research in Motion Limited*, PACER document 52, Southern District of New York, (Jun. 8, 2011), 80 pgs.

"Eatoni's Memorandum of Law in Opposition to RIM's Motion to Dismiss the Amended Complaint", 1:08-CV-10079-WHP—*Eatoni Ergonomics, Inc.* v. *Research in Motion Corp. and Research in Motion Limited*, PACER Document 78, Southern District of New York, (Sep. 13, 2011), 34 pgs.

"Eatoni's Memorandum of Law in Support of Its Motion for Reconsideration", 1:08-CV-10079-WHP—*Eatoni Ergonomics, Inc.* v. *Research in Motion Corporation and Research in Motion Limited*, PACER Document 60, Southern District of New York, (Jun. 16, 2011), 24 pgs.

"Eatoni's Notice of Motion for Reconsideration", 1:08-CV-10079-WHP—*Eatoni Ergonomics, Inc.* v. *Research in Motion Corp. and Research in Motion Limited*, PACER document 56 thru 56-12, includes exhibits, Southern District of New York, (Jun. 15, 2011), 276 pgs.

"Eatoni's Reply Memorandum of Law in Support of the Motion for Reconsideration", 1:08-CV-10079-WHP—*Eatoni Ergonomics, Inc.* v. *Research in Motion Corp. and Research in Motion Limited*, PACER Document 68, Southern District of New York, (Jul. 9, 2011), 12 pgs.

"European Application Serial No. 99964211.9, Office Action mailed Jan. 30, 2007", 5 pgs.

"European Application Serial No. 99964211.9, Office Action mailed Dec. 16, 2008", 5 pgs.

"European Application Serial No. 99964211.9, Response filed Jun. 18, 2009 to Office Action mailed Dec. 16, 2008", 28 pgs.

"European Application Serial No. 99964211.9, Response filed Aug. 6, 2007 to Office Action mailed Jan. 30, 2007", 14 pgs.

"European Application Serial No. 99964211.9, Response filed Aug. 26, 2011 to Summons mailed May 13, 2011", 10 pgs.

"European Application Serial No. 99964211.9, Summons to Attend Oral Proceedings mailed May 13, 2011", 6 pgs.

"International Application Serial No. PCT/US05/03093, Search Report mailed Oct. 27, 2005", 1 pg.

"International Application Serial No. PCT/US05/03093, Written Opinion mailed Oct. 27, 2005", 6 pgs.

"International Application Serial No. PCT/US05/14211, Search Report mailed Sep. 13, 2005", 1 pg.

"International Application Serial No. PCT/US05/14211, Written Opinion mailed Sep. 13, 2005", 3 pgs.

"Japanese Application Serial No. 2000-587443, Final Office Action mailed Nov. 4, 2009", 6 pgs.

"Japanese Application Serial No. 2000-587443, Office Action mailed Jun. 9, 2009", 3 pgs.

"Japanese Application Serial No. 2000-587443, Pretrial Examination Report mailed Mar. 29, 2011", 6 pgs.

"Japanese Application Serial No. 2000-587443, Response filed Mar. 4, 2010 to Final Office Action mailed Nov. 4, 2009", 7 pgs.

"Japanese Application Serial No. 2000-587443, Response filed Aug. 17, 2009 to Office Action mailed Jun. 9, 2009", 17 pgs.

"Memorandum and Order", 1:08-CV-10079-WHP—*Eatoni Ergonomics, Inc.* v. *Research in Motion Corp., et ano.*, PACER Document 75, Southern District of New York, (Aug. 25, 2011), 4 pgs.

"Memorandum and Order", 1:08-CV-10079-WHP—*Eatoni Ergonomics, Inc.* v. *Research in Motion Corp. and Research in Motion Limited*, PACER document 50, Southern District of New York, (Jun. 1, 2011), 19 pgs.

"Mexican Application Serial No. PA/a/2001/005887, Notice of Allowance mailed Jul. 2, 2004", 1 pg.

"Mexican Application Serial No. PA/a/2001/005887, Response filed Sep. 28, 2004 to Notice of Allowance mailed Jul. 2, 2004", 2 pgs.

"Notice of Motion to Dismiss Eatoni's Amended Complaint", 1:08-CV-10079-WHP—*Eatoni Ergonomics, Inc.* v. *Research in Motion Corporation and Research in Motion Limited*, PACER document 73, Southern District of New York, (Aug. 12, 2011), 2 pgs.

"Research in Motion's Memorandum in Opposition to Eatoni's Motion for Reconsideration", 1:08-CV-10079-WHP—*Eatoni Ergonomics, Inc.* v. *Research in Motion Corporation and Research in Motion Limited*, PACER document 66, Southern District of New York, (Jun. 27, 2011), 7 pgs.

"Research in Motion's Memorandum in Support of its Motion to Dismiss Eatoni's Amended Complaint", 1:08-CV-10079-WHP—*Eatoni Ergonomics, Inc.* v. *Research in Motion Corporation and*

*Research in Motion Limited*, PACER Document 74, Southern District of New York, (Aug. 12, 2011), 25 pgs.

"Research in Motion's Reply in Support of Its Motion to Dismiss Eatoni's Amended Complaint", 1:08-CV-10079-WHP—*Eatoni Ergonomics, Inc. v. Research in Motion Corporation and Research in Motion Limited*, PACER Document 81, South District of New New York, (Filed Sep. 23, 2011), 16 pgs.

"Stipulation and Proposed Order", 1:08-CV-10079-WHP—*Eatoni Ergonomics, Inc. v. Research in Motion Corporation and Research in Motion Limited*, PACER document 62, Southern District of New York, (Jun. 17, 2011), 2 pgs.

Arnott, J. L., et al., "Probabilistic Character Disambiguation for Reduced Keyboards Using Small Text Samples", Augmentative and Alternative Communication, V. 8(3), (Sep. 1992), 215-223.

Bentley, J., "The Littlest Keyboard", UNIX Review, (Dec. 1994), 6 pgs.

Fukomoto, Masaaki, et al., "Body Coupled FingeRing: Wireless Wearable Keyboard", CHI 97 Electronic Publications: Papers, [Online]. Retrieved from the Internet: <URL: www.sigchi.org/chi97/proceedings/paper/fkm.htm> Retrieved on Sep. 7, 2011, 17 pgs.

Gutowitz, Howard Andrew, "Efficient Merger of Telephone Keypad and Typewriter Keyboard Conventions", U.S. Appl. No. 60/844,592, filed Sep. 14, 2006, 93 pgs.

Gutowitz, Howard Andrew, et al., "Keypads Row Similar to a Telephone Keypad", U.S. Appl. No. 60/905,054, filed Mar. 5, 2007, 55 pgs.

Gutowitz, Howard Andrew, et al., "Row Similar Extensions of Telephone Keypads", U.S. Appl. No. 60/932,449, filed May 31, 2007, 73 pgs.

Gutowitz, Howard Andrew, et al., "Row Similar Extensions of Telephone Keypads", U.S. Appl. No. 60/958,775, filed Jul. 9, 2007, 105 pgs.

Gutowitz, Howard Andrew, et al., "Row Similar Extensions of Telephone Keypads", U.S. Appl. No. 60/962,267, filed Jul. 27, 2007, 95 pgs.

Kreifeldt, J. G., et al., "Reduced Keyboard Designs Using Disambiguation", Proceedings of Human Factors and Ergonomics Soc., 33rd Annual Meeting, (1989), 441-444.

Kushler, Cliff, "AAC Using a Reduced Keyboard", CSUN Conference Proceedings, [Online]. Retrieved from the Internet: <URL: http://www.dinf.org.csun98/csun98_140.htm>, (May 1998), 5 pgs.

Knodt, R.W.; "Smart Virtual Keyboard System Suitable for Mouse or Stylus Entry"; Xerox Disclosure Journal, Xerox Corp., Stamford, CT, US, vol. 18, No. 3; pp. 245-246; XP000367968; May 1, 1993.

Lesher, G.W. et al.; << Optimal Character Arrangements for Ambiguous Keyboards >> ; IEEE Transactions of Rehabilitation Engineering, IEEE Inc., New York, NY; vol. 6, No. 4; Dec. 1, 1998.

PCT/US2007/078573; International Search Report and Written Opinion; ISA/EP; Oct. 9, 2009.

* cited by examiner

FIG. 1
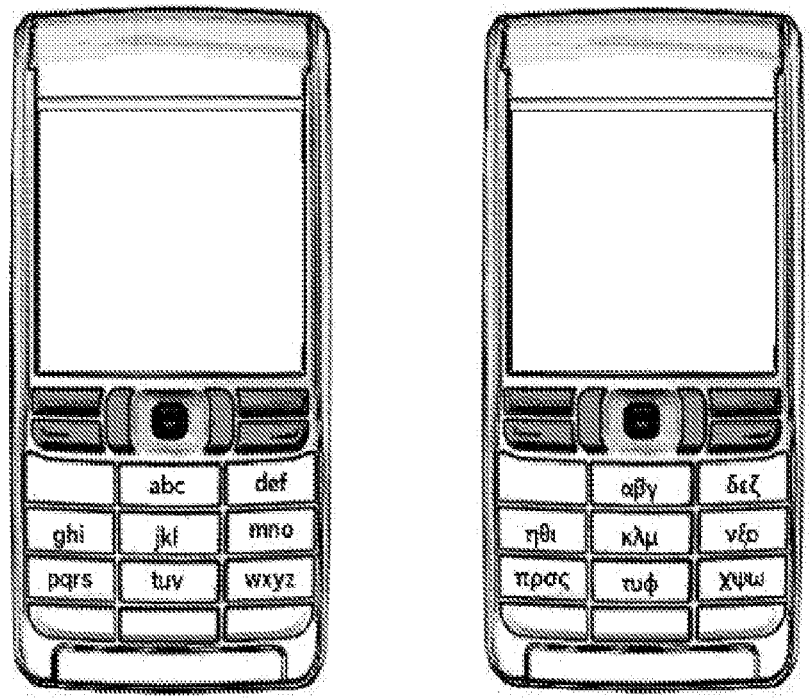
A                    B
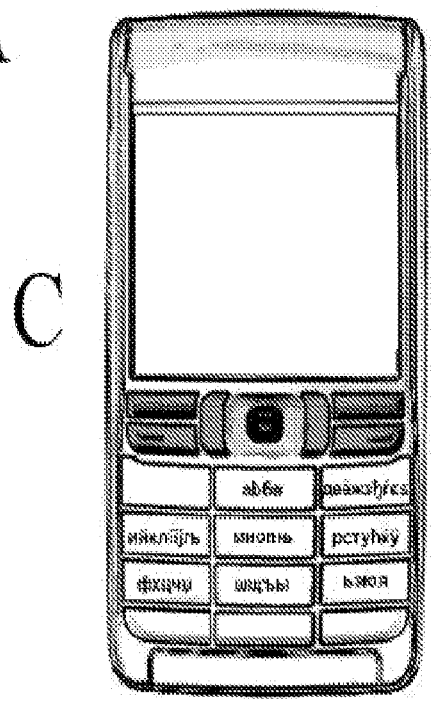
C
Prior Art

Prior Art

Prior Art

FIG. 5 (CONT.)
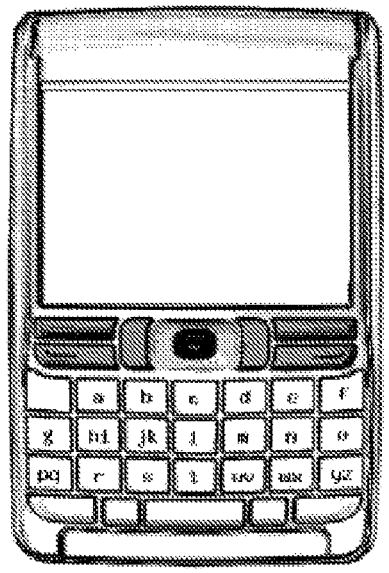
E
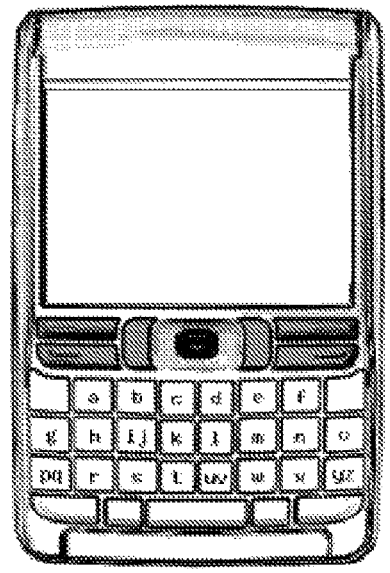
F
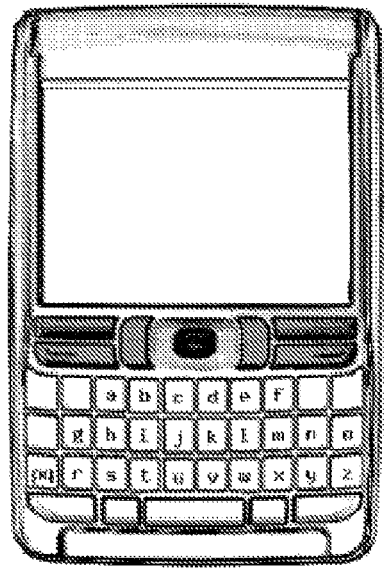
G
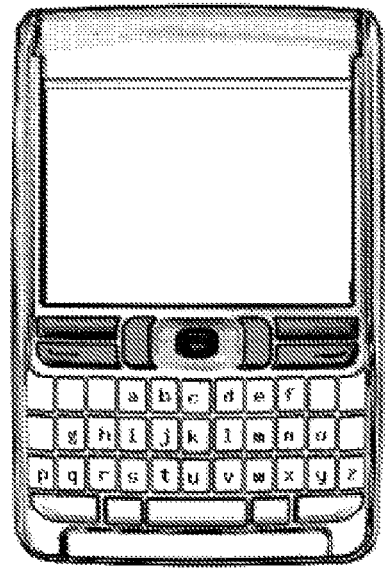
H

FIG. 10

| # | Lookup Error Rate | Top Row | Middle Row | Bottom Row |
|---|---|---|---|---|
| 1 | 157.9 | -a-b-c-d-e-f | -gh-ij-kl-m-n-o | -pq-rs-t-uv-wx-yz |
| 2 | 156.2 | -a-b-c-d-e-f | -gh-ij-kl-m-n-o | -pq-rs-tu-v-wx-yz |
| 3 | 151.8 | -a-b-c-d-e-f | -gh-ij-kl-m-n-o | -pq-rs-tu-vw-x-yz |
| 4 | 148.7 | -a-b-c-d-e-f | -gh-ij-kl-m-n-o | -pq-rs-tu-vw-xy-z |
| 5 | 138.2 | -a-b-c-d-e-f | -g-hi-jk-l-m-no | -pq-rs-t-uv-wx-yz |
| 6 | 136.6 | -a-b-c-d-e-f | -g-h-ij-kl-m-no | -pq-rs-t-uv-wx-yz |
| 7 | 135.8 | -a-b-c-d-e-f | -g-hi-jk-l-m-no | -pq-rs-tu-v-wx-yz |
| 8 | 134.6 | -a-b-c-d-e-f | -g-h-ij-kl-m-no | -pq-rs-tu-v-wx-yz |
| 9 | 132.4 | -a-b-c-d-e-f | -gh-ij-k-l-m-no | -pq-rs-t-uv-wx-yz |
| 10 | 132.3 | -a-b-c-d-e-f | -g-hi-jk-l-m-no | -pq-rs-tu-vw-x-yz |
| 11 | 131.5 | -a-b-c-d-e-f | -gh-i-jk-l-m-no | -pq-rs-t-uv-wx-yz |
| 12 | 130.5 | -a-b-c-d-e-f | -gh-ij-k-l-m-no | -pq-rs-tu-v-wx-yz |
| 13 | 129.6 | -a-b-c-d-e-f | -g-hi-jk-l-m-no | -pq-rs-tu-vw-xy-z |
| 14 | 129.3 | -a-b-c-d-e-f | -gh-i-jk-l-m-no | -pq-rs-tu-v-wx-yz |
| 15 | 124.2 | -a-b-c-d-e-f | -g-hi-jk-lm-n-o | -pq-rs-t-uv-wx-yz |
| 16 | 122.6 | -a-b-c-d-e-f | -g-hi-jk-lm-n-o | -pq-rs-tu-v-wx-yz |
| 17 | 119.8 | -a-b-c-d-e-f | -g-hi-jk-lm-n-o | -pq-rs-tu-vw-x-yz |
| 18 | 117.6 | -a-b-c-d-e-f | -g-hi-jk-lm-n-o | -pq-rs-tu-vw-xy-z |
| 19 | 112.9 | -a-b-c-d-e-f | -gh-ij-k-lm-n-o | -pq-rs-t-uv-wx-yz |
| 20 | 111.5 | -a-b-c-d-e-f | -gh-i-jk-lm-n-o | -pq-rs-t-uv-wx-yz |

FIG. 14 (CONT.)
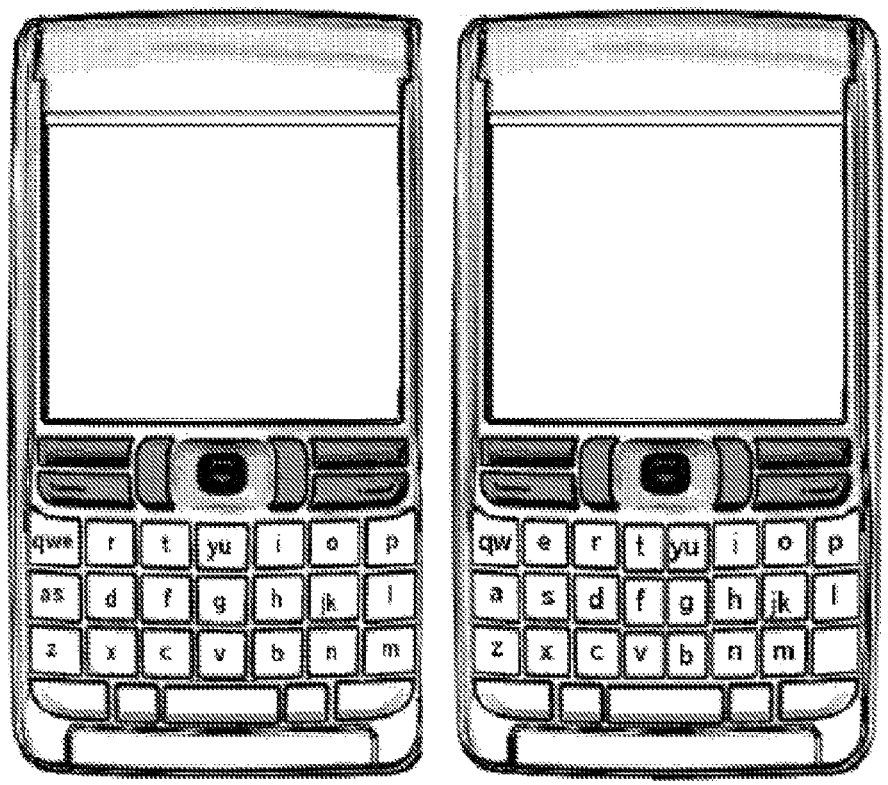
E F
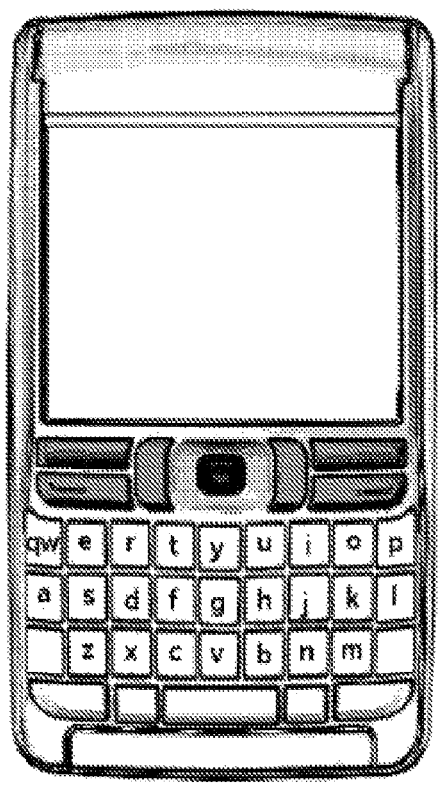
G

FIG. 15

FIG. 18
A  B  C
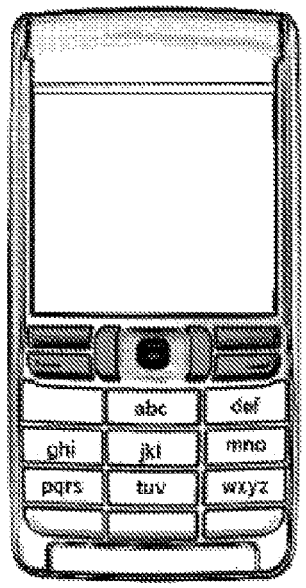
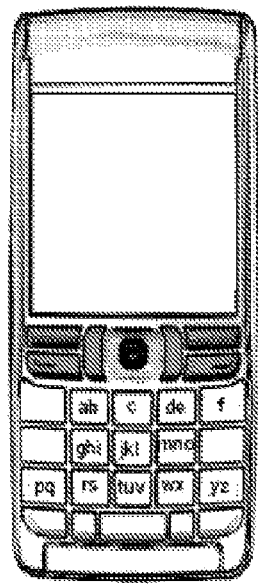
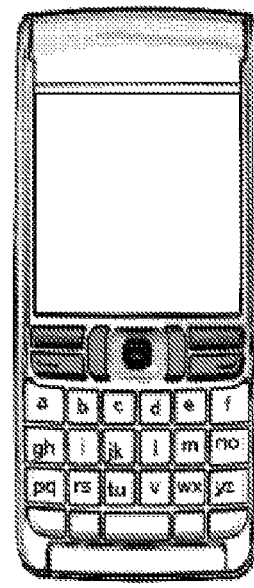
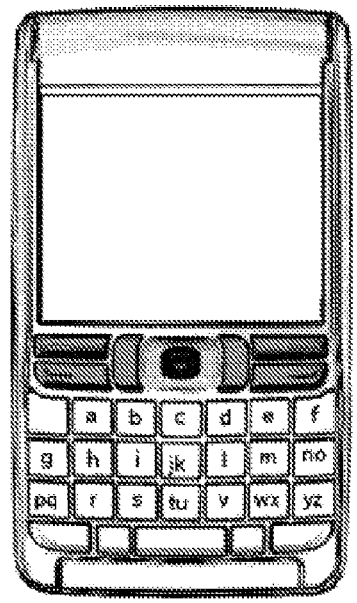
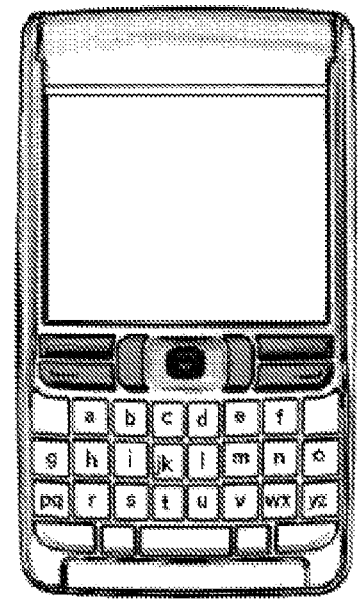
E  F

FIG. 19
A 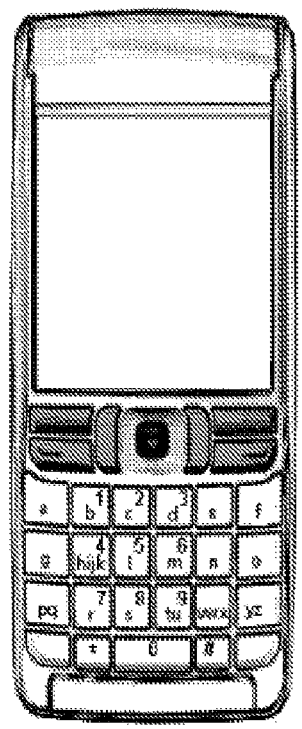
B 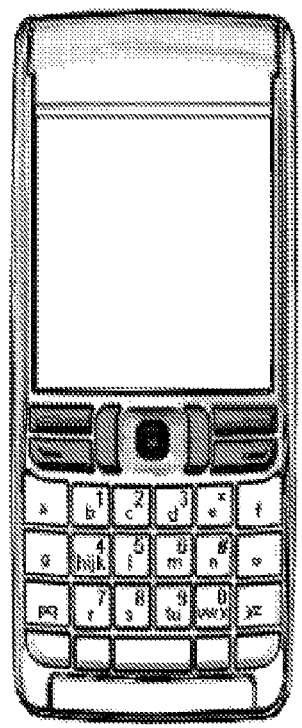

FIG. 22
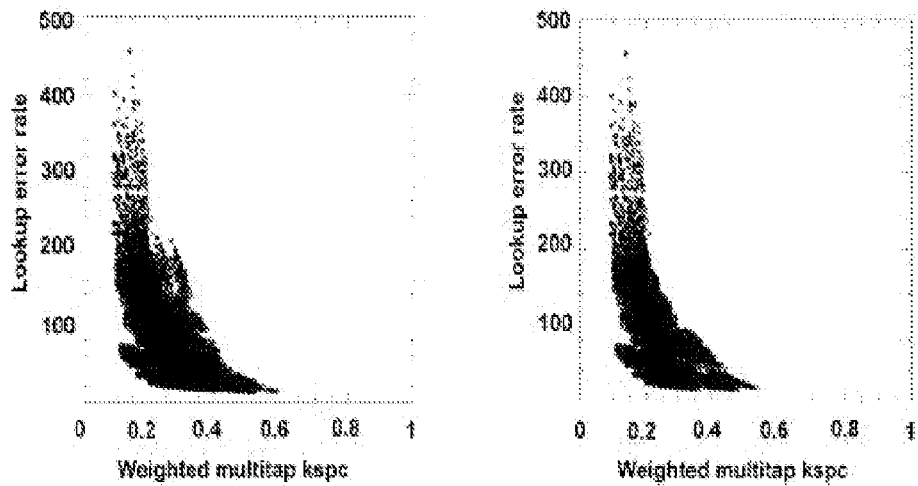
A                    B
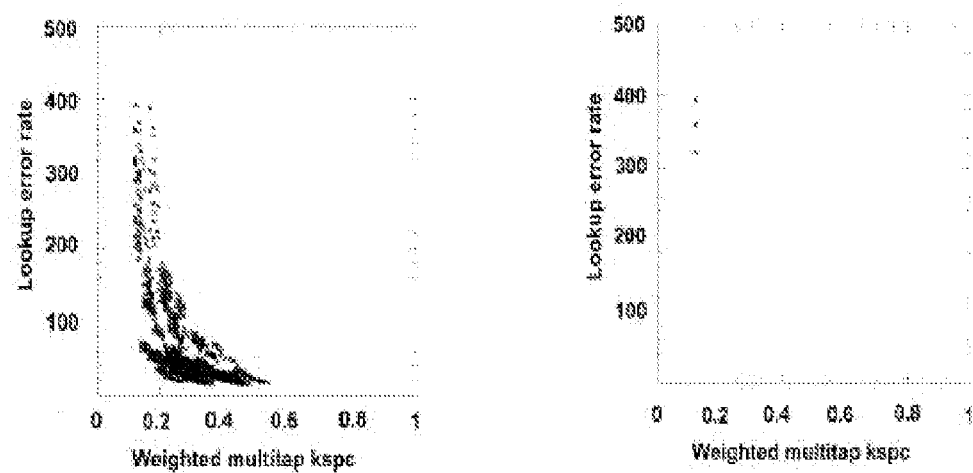
C                    D

FIG. 25
A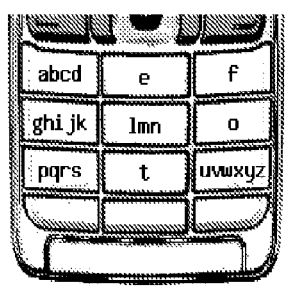 B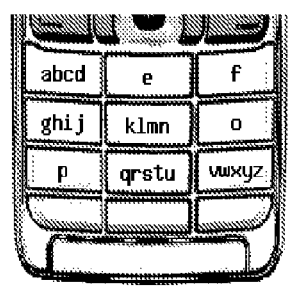 C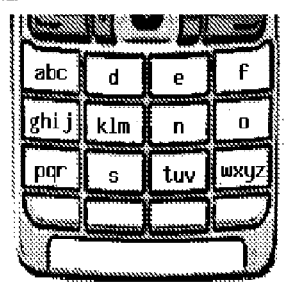
D E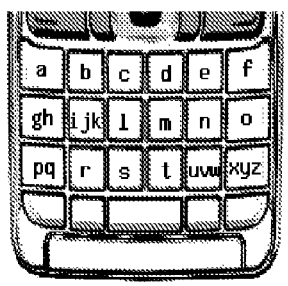 F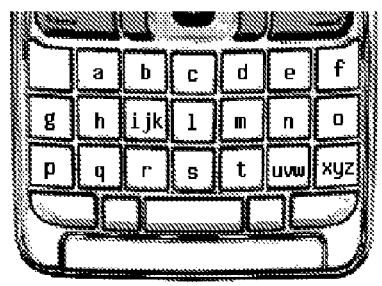

FIG. 54
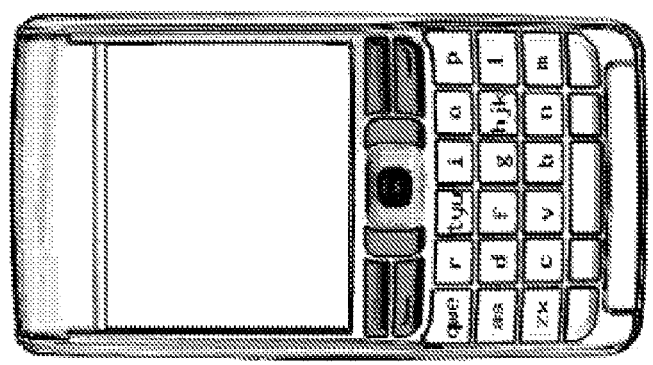
C
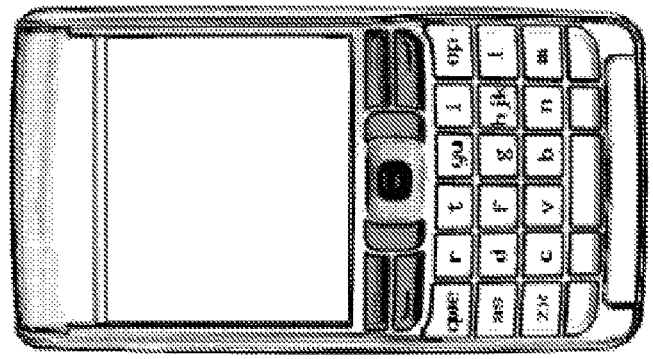
B
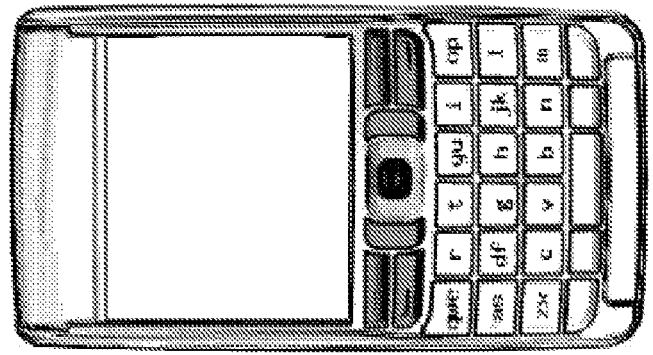
A

FIG. 55

| Lookup | top row | middle row | bottom row |
|---|---|---|---|
| 13.11 | qwe r t yu i op | as df g h jk l | zx c v b n m |
| 13.04 | qwe r t yu i op | as df g h jk l | z xc v b n m |
| 12.83 | qwe r t yu i op | as df g hj k l | zx c v b n m |
| 12.76 | qwe r t yu i op | as df g hj k l | z xc v b n m |
| 12.29 | qwe r t yu i op | as df g h jk l | z x c vb n m |
| 12.04 | qwe r t yu i op | as df g hj k l | z x c vb n m |
| 11.91 | qwe r t yu i op | as df g h jk l | z x cv b n m |
| 11.81 | qwe r t yu i op | as d f gh jk l | zx c v b n m |
| 11.76 | qwe r t yu i op | as d f gh jk l | z xc v b n m |
| 11.75 | qwe r t yu i op | a s df gh jk l | zx c v b n m |
| 11.70 | qwe r t yu i op | a s df gh jk l | z xc v b n m |
| 11.67 | qwe r t yu i op | as d fg h jk l | zx c v b n m |
| 11.67 | qwe r t yu i op | as df g hj k l | z x cv b n m |
| 11.63 | qwe r t yu i op | as d f g hj kl | zx c v b n m |
| 11.62 | qwe r t yu i op | as d fg h jk l | z xc v b n m |
| 11.58 | qwe r t yu i op | as d f g hj kl | z xc v b n m |
| 11.45 | qwe r t yu i op | as d fg hj k l | zx c v b n m |
| 11.40 | qwe r t yu i op | as d fg hj k l | z xc v b n m |
| 11.38 | qwe r t yu i op | as df g h jk l | z x c v bn m |
| 11.21 | qwe r t yu i op | a s df gh jk l | z x cvb n m |

FIG. 56

| Lookup | top row | middle row | bottom row |
|---|---|---|---|
| 15.39 | qwe r t yu i op | as d f g hjk l | zx c v b n m |
| 15.30 | qwe r t yu i op | as d f g hjk l | z xc v b n m |
| 14.27 | qwe r t yu i op | as d f g hjk l | z x c vb n m |
| 13.76 | qwe r t yu i op | as d f g hjk l | z x cv b n m |
| 13.52 | qwe r t yu i op | a s df g hjk l | zx c v b n m |
| 13.45 | qwe r t yu i op | a s df g hjk l | z xc v b n m |
| 13.14 | qwe r t yu i op | as d f g hjk l | z x c v bn m |
| 12.81 | qwe r t yu i op | a s df g hjk l | z x c vb n m |
| 12.30 | qwe r t yu i op | a s df g hjk l | z x cv b n m |
| 12.19 | qwe r t yu i op | a s d fg hjk l | zx c v b n m |
| 12.13 | qwe r t yu i op | a s d fg hjk l | z xc v b n m |
| 11.68 | qwe r t yu i op | a s df g hjk l | z x c v bn m |
| 11.66 | qwe r tyu i o p | a s dfgh jk l | zx c v b n m |
| 11.61 | qwe r t yu i op | a s df g hjk l | z x c vb n m |
| 11.59 | qwe r tyu i o p | a s dfgh jk l | z xc v b n m |
| 11.47 | qwe r tyu i o p | as d f ghj k l | zx c v b n m |
| 11.44 | qwe r tyu i o p | as df g h jk l | zx c v b n m |
| 11.41 | qwe r t yu i op | as d f ghj k l | z xc v b n m |
| 11.41 | qwe r tyu i o p | a s dfghj k l | zx c v b n m |
| 11.38 | qwe r tyu i o p | as df g h jk l | z xc v b n m |

FIG. 57

| Lookup | top row | middle row | bottom row |
|---|---|---|---|
| 13.26 | qwe r tyu i o p | a s df g hjk l | zx c v b n m |
| 13.18 | qwe r tyu i o p | a s df g hjk l | z xc v b n m |
| 13.12 | qwe r tyu i o p | as d f g hjk l | zx c v b n m |
| 13.04 | qwe r tyu i o p | as d f g hjk l | z xc v b n m |
| 12.43 | qwe r tyu i o p | a s df g hjk l | z x c v b n m |
| 12.16 | qwe r tyu i o p | as d f g hjk l | z x c vb n m |
| 12.13 | qwe r tyu i o p | a s d f g hjk l | zx c v b n m |
| 12.06 | qwe r tyu i o p | a s d fg hjk l | z xc v b n m |
| 12.04 | qwe r tyu i o p | a s df g hjk l | z x cv b n m |
| 11.85 | qwe r tyu i o p | as d f g hjk l | z x cv b n m |
| 11.43 | qwe r tyu i o p | a s d fg hjk l | z x cvb n m |
| 11.18 | qwe r tyu i o p | a s df ghj k l | zx c v b n m |
| 11.12 | qwe r tyu i o p | a s df ghj k l | z xc v b n m |
| 10.81 | qwe r tyu i o p | a s d f ghj kl | zx c v b n m |
| 10.79 | qwe r tyu i o p | a s df g hjk l | z x c v bn m |
| 10.75 | qwe r tyu i o p | a s d f ghj kl | z xc v b n m |
| 10.75 | qwe r tyu i o p | as d f g hjk l | z x c v bn m |
| 10.72 | qwe r tyu i o p | a s d f gh jkl | zx c v b n m |
| 10.66 | qwe r tyu i o p | a s d f gh jkl | z xc v b n m |
| 10.59 | qwe r tyu i o p | a s df ghj k l | z x cvb n m |

| Lookup | Prob (isolated) | top row | middle row | bottom row |
|---|---|---|---|---|
| 1.69 | 0.67 | qw e r t yu iop | a s dfg h jk l | zx c v b n m |
| 4.02 | 0.67 | qw e r t yui op | a s dfg h jk l | zx c v b n m |
| 1.90 | 0.66 | qw e r t yui op | a s d fg h jkl | zx c v b n m |
| 5.84 | 0.66 | qw e r t yui op | a s d fg h jkl | zx c v b n m |
| 1.81 | 0.66 | qw e r t yui op | a s dfgh jk l | zx c v b n m |
| 2.03 | 0.66 | qw e r t yui op | a s d fg hjkl | zx c v b n m |
| 4.94 | 0.66 | qw e r t yui op | a s d fgh jk l | zx c v b n m |
| 6.98 | 0.66 | qw e r t yui op | a s d fg hjkl | zx c v b n m |
| 3.98 | 0.65 | qw e r tyu i op | a s dfg h jk l | zx c v b n m |
| 5.37 | 0.65 | qw e r tyu i op | a s d fg h jkl | zx c v b n m |
| 1.94 | 0.65 | qw e r tyu i op | a s df g h jkl | zx c v b n m |
| 6.09 | 0.65 | qw e r tyu i op | a s df g h jkl | zx c v b n m |
| 4.37 | 0.64 | qwe r t yui o p | a s dfg h jk l | zx c v b n m |
| 1.67 | 0.64 | qw e r t yu iop | a s dfg h jk l | z x c vb n m |
| 3.95 | 0.64 | qw e r t yui op | a s dfg h jk l | z x c vb n m |
| 6.82 | 0.64 | qw e r t yui o p | a s d fg h jkl | zx c v b n m |
| 1.88 | 0.64 | qw e r t yu iop | a s d fg h jkl | z x c vb n m |
| 5.69 | 0.64 | qw e r t yui op | a s d fg h jkl | z x c vb n m |
| 4.49 | 0.64 | qw e r tyu i op | a s dfgh jk l | zx c v b n m |
| 6.15 | 0.64 | qw e r tyu i op | a s d fg hjkl | zx c v b n m |

FIG. 60

| Lookup | Prob (not first letter) | top row | middle row | bottom row |
|---|---|---|---|---|
| 7.41 | 0.092 | qwe r ty u i op | a s d fg hj kl | zx c v b n m |
| 9.98 | 0.092 | qwe r ty u i op | a s d fg hj kl | zx c v b n m |
| 7.38 | 0.093 | qwe r ty u i op | a s d fg hj kl | z xc v b n m |
| 9.94 | 0.093 | qwe r ty u i op | a s d fg hj kl | z xc v b n m |
| 7.83 | 0.094 | qwe r ty u i op | a s d fgh jkl | zx c v b n m |
| 7.88 | 0.094 | qwe r ty u i op | a s d fghj kl | zx c v b n m |
| 8.89 | 0.094 | qwe r ty u i op | a s d fg hjk l | zx c v b n m |
| 7.35 | 0.094 | qwe r ty u i op | a s d fg h jkl | zx c v b n m |
| 10.67 | 0.094 | qwe r ty u i op | a s d fgh jkl | zx c v b n m |
| 10.83 | 0.094 | qwe r ty u i op | a s d fghj kl | zx c v b n m |
| 12.19 | 0.094 | qwe r ty u i op | a s d fg hjk l | zx c v b n m |
| 9.77 | 0.094 | qwe r ty u i op | a s d fg h jkl | zx c v b n m |
| 7.81 | 0.094 | qwe r ty u i op | a s d fg hj kl | zx c v b n m |
| 10.85 | 0.094 | qwe r ty u i op | a s dfg hj kl | zx c v b n m |
| 7.80 | 0.095 | qwe r ty u i op | a s d fgh jkl | z xc v b n m |
| 7.85 | 0.095 | qwe r ty u i op | a s d fghj kl | z xc v b n m |
| 8.85 | 0.095 | qwe r ty u i op | a s d fg hjk l | z xc v b n m |
| 7.32 | 0.095 | qwe r ty u i op | a s d fg h jkl | z xc v b n m |
| 10.63 | 0.095 | qwe r ty u i op | a s d fgh jkl | z xc v b n m |
| 10.79 | 0.095 | qwe r ty u i op | a s d fghj kl | z xc v b n m |

A  B  C

FIG. 64
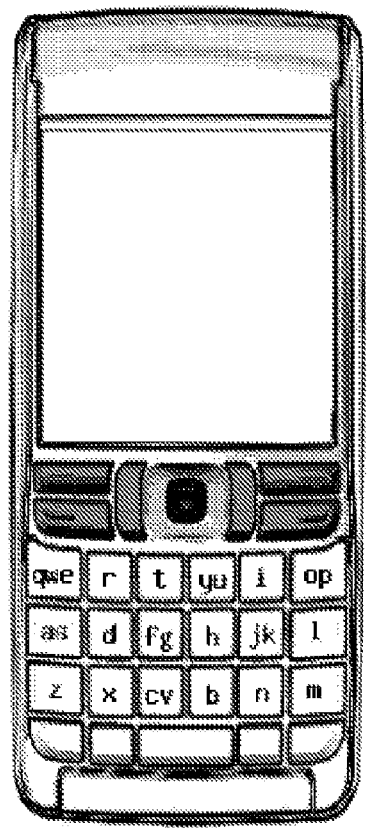
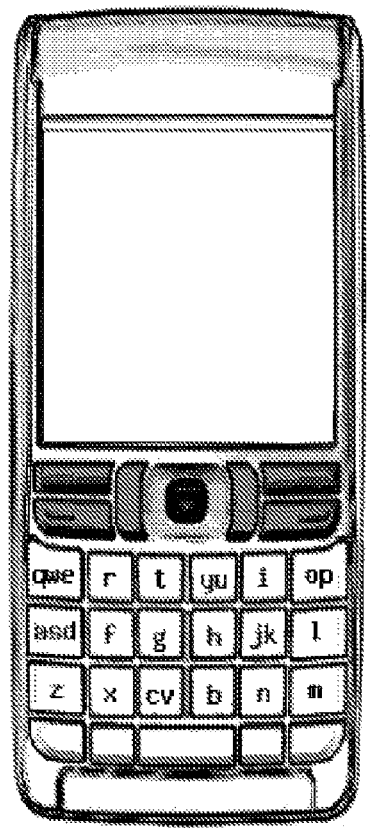
A　　　　　　　　B

FIG. 65

| Lookup | top row | middle row | bottom row |
|---|---|---|---|
| 22.46 | qwe r t yu i op | as d fg h jk l | z x cv b n m |
| 22.46 | qwe r t yu i op | as d fg h jk l | z x c vb n m |
| 18.93 | qwe r tyu i op | as df g h jk l | z x cv b n m |
| 18.93 | qwe r tyu i op | as df g h jk l | z x c vb n m |
| 18.63 | qwe r tyu i op | as d f g hj kl | z x cv b n m |
| 18.63 | qwe r tyu i op | as d f g hj kl | z x c vb n m |
| 17.98 | qwe r tyu i op | as d fg h j kl | z x cv b n m |
| 17.98 | qwe r tyu i op | as d fg h j kl | z x c vb n m |
| 15.85 | qwe r tyu i op | as d fg h jk l | z xc v b n m |
| 15.82 | qwe r tyu i op | as d fg hj k l | z x cv b n m |
| 15.82 | qwe r tyu i op | as d fg hj k l | z x c vb n m |
| 15.78 | qwe r t yu i op | asd f g h jk l | z x cv b n m |
| 15.78 | qwe r tyu i op | asd f g h jk l | z x c vb n m |
| 15.65 | qwe r tyu i op | as df g h j kl | z x cv b n m |
| 15.65 | qwe r tyu i op | as df g h j kl | z x c vb n m |
| 15.40 | qwe r tyu i op | as d fg h jk l | z x c v b nm |
| 14.90 | qw er tyu i op | asd f g h jk l | z x cv b n m |
| 14.90 | qw er tyu i op | asd f g h jk l | z x c vb n m |
| 14.50 | qwe r tyu i op | as d f g hjk l | z x cv b n m |
| 14.50 | qwe r tyu i op | as d f g hjk l | z x c vb n m |

KEYPADS ROW SIMILAR TO A TELEPHONE KEYPAD

CROSS REFERENCES

This application relates to and claims benefit of priority to: U.S. provisional patent application 60/844,592 filed on Sep. 14, 2006; U.S. provisional patent application 60/905,054 filed Mar. 5, 2007; U.S. provisional patent application 60/932,449 filed May 31, 2007; U.S. provisional patent application 60/958,775 filed Jul. 9, 2007; and U.S. provisional patent application 60/962,267 filed Jul. 27, 2007, all of which are hereby incorporated by reference in their entirety.

This application incorporates by reference and relies upon: PCT application number PCT/US2005/003093 with priority date of Jan. 27, 2005; "Method and apparatus for accelerated entry of symbols on a reduced keypad" PCT/US01/30264 to Gutowitz and Jones, with a priority date of Sep. 27, 2001, U.S. Pat. No. 6,885,317 to Gutowitz, with a priority date of Dec. 9, 1998, U.S. Pat. No. 6,219,731, U.S. Pat. No. 6,885,317 to Gutowitz, U.S. patent application Ser. Nos. 09/856,863, 10/415,031, and 10/605,157 and all family members thereto.

FIELD OF INVENTION

This invention relates generally to computerized text-entry systems based on ambiguous keypads, more specifically to keypads with base-letter layouts which are row-similar to a standard telephone keypad or a standard typewriter keyboard.

INTRODUCTION

There is at present a world-wide battle of standards for keypads for handheld devices, for example, cell phones. One set of established standards are based on alphabetic ordering of letters, on a 12-key telephone keypad, another set is based on standards for full-sized keyboards such as the qwerty, azerty, or Dvorak keyboards, for the Latin alphabet, and other standard full-sized keyboards for other alphabets. In general, telephone keypad standards are too ambiguous for efficient text entry, while full-sized keyboards have too many keys to fit on a handheld device and still be big enough to type on comfortably. The present disclosure provides expanded telephone keypad standards with a typically larger number of keys, so as to give aspects of the look and feel of a full-sized keyboard standard, while retaining as well as possible aspects of the look and feel of a telephone keypad standard. It also provides keyboards which may support several standards simultaneously, as well as other aspects and features which will become apparent from the detailed disclosure.

DEFINITIONS AND BASIC NOTIONS

This section collects definitions of words and concepts which will be used in the following detailed specification.

Language

Given a set of symbols, one can construct sequences of symbols, and assign probabilities to the sequences. The set of symbols, sequences of symbols, and the probabilities assigned to the sequences will be referred to here as a language. For clarity of discussion, and without limiting the scope of this invention, the languages we will refer to are written natural languages, such as English, and though for concreteness we may refer to symbols as "letters" or "punctuation", it will be understood by those of ordinary skill in the art that symbols in this discussion may be any discrete unit of writing, including standard symbols such as Chinese ideograms or invented symbols such as the name of the artist formerly known as Prince. In particular, a Unicode codepoint will be treated as a "letter" when no ambiguity will arise, the codepoint is assigned to a key in a standard telephone keypad layout, and used to form standard dictionary words in a language. This excluded digits and punctuation marks. Note, however, that in typical standards for telephone keypads, only the base letter of a group of Unicode codepoints related by accents, diacritical marks, or other linguistic groupings will be labeled on the keypad. Properties of layouts such as even-as-possible or number of isolated letters refer to these labels, rather than the set of codepoints related by accents or other diacritic marks (often but not always indicated by the presence of WITH in the Unicode name for the codepoint). For instance, the letters u and u-umlaut will typically be assigned to the same key in a telephone keypad standard, but only the 'u' label will appear on the key and u and u-umlaut will thus be treated as a single letter for the description of layout properties. Similarly, the syllables ka, ki, ke, ko, ku are assigned to the same key in a standard telephone keypad layout for Japanese, though only ka will typically be labeled on the key.

Ambiguous Codes

An ambiguous code is code in which a given input sequence may correspond to more than one output sequence. On the standard telephone keypad for Latin script, there are 12 keys, 10 of which encode a digit, and several of these, typically 8, encode in addition 3 or 4 letters of the alphabet, arranged in alphabetic order. These assignments produce an ambiguous code: abc def (top row), ghi jkl mno (middle row), pqrs tuv wxyz (bottom row).

Conventional Keyboards

There are essentially three standard keyboards in wide use for Latin alphabets: the qwerty keyboard and its close variants, such as Azerty, and the 12-key telephone keypad with the standard ambiguous code described above. Other scripts have other keyboards, both for desktop and telephone keypad use. It will be appreciated that any device or method described here applies as well to those keyboards for other scripts.

Layouts

A layout is an assignment of base letters to keys where the keys are in some spatial arrangement. When no confusion will arise, the words keyboard and layout may be used interchangeably. The number of letters labeled on a key may have little to do with the number of letters ambiguously assigned to a key. For instance, it is common for Japanese telephones to be labeled only with one representative of a set of Hiragana and Katakana symbols assigned to a key. The user is understood to be able to comprehend that all members of the set of Hiragana and/or Katakana are entered using the key labeled with the sole representative of the set. Similarly, for Latin script, a single symbol label on a key may represent a set including a base letter and some or all of its accented counterparts. Intermediate cases exist, where some letters with accents may be separately labeled from their base letter or other accented counterparts, even on separate keys. The partition properties described herein typically apply to the number of labels, rather than the number of ambiguously represented symbols, as they concern the look aspects of the keypad.

Even-as-Possible

An even-as-possible partition is a partition which, to the extent possible given pre-determined constraints, has the same number of items in each partition element. If there are no constraints at all, an even-as-possible partition on an integer n is a partition with a number of partition element m equal to a prime divisor of n. Thus, with no other constraint, the most even partitions of 26 are one group of 26, two groups of 13, or 13 groups of 2. If the number of partition elements are fixed then an even-as-possible partition does not necessarily contain the same number of items in each partition element. For instance, the most even distribution of 26 letters over 8 keys has 6 keys with 3 letters each, and 2 keys with 4 letters each, if there are no other constraints than the number of keys. Depending on context, there may be still other constraints on even as possible distributions. For instance, if given subsets of letters are constrained to occupy given rows with a given number of keys in each row, then the most even partition must conform to these constraints and may be different from a partition which did not have the subset-to-row constraints, or the number of keys per row constraints.

Range

The range of a partition is a generalization of even-as-possible property. The range of a partition is defined as the difference between the minimum and maximum number of letters assigned to any partition element. For example, the range of the standard telephone keypad for English is 1, since there is a maximum of 4 base letters on a key and a minimum of 3 base letters on a key.

Restricted Range

The restricted range is the range considered over a subset of keys. Example restrictions are row-wise restricted range or column-wise restricted range. The restricted range may be different from the range considered over all keys, but cannot be greater than the full range. For instance, the range in the top row of the standard telephone keypad for English is 0, though the range for the entire keypad is 1.

Minimal Maximum

Let M(L) be the maximum number of letters on a key in a layout L.

The minimum maximum layout is such that $M(L)=\min(M(L))$ is the minimum over a set of layouts $L \in \mathcal{L}$. It is to be noted that a layout might be a minimum maximum layout, but not have the minimum range of any layout $L \in \mathcal{L}$. It is also to be noted that the minimum of the maximum might be restricted to a subset of keys in the layout, for instance, the subset of keys in a given row of the keyboard.

Typability

Typability refers to the work or time required to enter text. A commonly used measure of work for an ambiguous keyboard is kspc (average keystrokes per character). The amount of time needed to enter text may not be simply related to the kspc. Various processes may have to occur in addition to pressing keys in order to enter text, and these processes take additional time which is not accounted for by the kspc measurement. For instance, if a word-based disambiguation method is used, and more than one word corresponds to the keystroke sequence used to enter the intended word, then time will be required to examine and select from the possible candidates the intended word. Other typability properties could relate to other measures of ambiguity, such as the probability that a letter will be displayed at a given position during entry of the word which is different from the letter which is ultimately displayed at that position when the word is completely entered, or more generally, changes from time to time as the word is entered (the "flip" probability).

Row Similarity

A given keypad will be said to be row similar to a standard keypad if a base letter assigned to a key in a row of the standard keypad is also assigned to the corresponding row in the given keypad, but the assignment of base letters to keys in the given keypad is not identical to the assignment of letters to keys in the standard for the letters assigned, in the sense that the assignment is partitioned across keys differently.

SUMMARY OF THE DISCLOSURE

The disclosure begins with an introduction and definitions of certain terms used in the remainder of the disclosure. The notion of row similarity is illustrated with various examples. It is shown how to combine the property of row similarity with various restrictions on the partition of letters over keys. Such properties include the min-max, max-2, max greater than standard, min range, and restricted min range properties. It is shown how a keypad can be dual labeled so that some combination of row-similar telephone keypads and/or typewriter standards can be supported on the same keyboard.

The concepts of break similarity and smooth sequences are then introduced. Through a variety of non-limiting examples, it is shown how these concepts may be combined with concepts previously introduced. Examples are shown of row-similar keypads suitable for typing with gloved fingers or thumbs, and how the letter arrangements described earlier may be combined with digit arrangements.

In one aspect, the invention is characterized by an apparatus for inputting letters of a natural alphabetic language having a first array of a plurality of keys having a first layout of a plurality of letters from a natural language assigned to various of said keys with at least one of said keys having more than one of said letters thereon, said first array and said first layout being row-similar to a second apparatus having a second array of a plurality of keys and a second layout of a plurality of letters taken from the group of standard telephone keypads having substantially alphabetic ordering of letters and standard typewriter keyboards for said natural language.

In another aspect, the invention is characterized by an apparatus for inputting letters of a natural alphabetic language having a first array of a plurality of keys having a first layout of a plurality of said letters from a natural alphabetic language assigned to various of said keys with at least one of said keys having more than one of said letters thereon, said first array and said first layout being break similar to a second apparatus having a second array of a plurality of keys and a second distribution of a plurality of letters taken from the group of standard telephone keypads having substantially alphabetic ordering of letters and standard typewriter keyboards for said natural language, In another aspect, the invention is characterized by apparatus for inputting letters of a natural alphabetic language having an array of a plurality of keys having a layout of a plurality of said letters from a natural alphabetic language assigned to various of said keys with at least one of said keys having more than one of said letters thereon, said first layout meeting at least one constraint from the group a predetermined maximum of letters assigned to any one key and row-similarity, maximizing the number of isolated letters.

In another aspect, the invention is characterized by apparatus for inputting letters of a natural alphabetic language having an array of a plurality of keys having a layout of a plurality of said letters from a natural alphabetic language assigned to various of said keys with at least one of said keys having more than one of said letters thereon, further comprising means for inputting digits, said means comprising either a digit key or a digit label interposed generally between an adjacent pair of keys.

In another aspect, the invention is characterized by apparatus for inputting letters of a natural alphabetic language having a first array of a plurality of keys having a first layout of a plurality of letters from a natural language assigned to various of said keys with at least one of said keys having more than one of said letters thereon, said first array and said first layout being row-similar to a second apparatus having a second array of a plurality of keys and a second layout of a plurality of letters taken from the group of standard telephone keypads having substantially alphabetic ordering of letters and standard typewriter keyboards for said natural language, each of said keys being separated horizontally from an adjacent key by at least a first amount of negative space.

In another aspect, the invention is characterized by apparatus for inputting letters of a natural alphabetic language having a first array of a plurality of keys having a first layout of a plurality of letters from a natural language assigned to various of said keys with at least one of said keys having more than one of said letters thereon, said first array and said first layout being row-similar to a second apparatus having a second array of a plurality of keys and a second layout of a plurality of letters taken from the group of pseudo-standard telephone keypads having substantially alphabetic ordering of letters and pseudo-standard typewriter keyboards for said natural language.

BRIEF DESCRIPTION OF THE DRAWINGS

FIG. 1 Illustrative standard telephone keypads for Latin, Greek and Cyrillic scripts.

FIG. 3 Illustrative standard full-sized keyboards for Latin, Greek, and Cyrillic scripts.

FIG. 10 Illustrative table of max-2 keyboards on 6 columns.

FIG. 15 Illustrative smooth lookup error rate optimized telephone keypad sequence.

FIG. 18 Illustrative smooth subsequence of row-wise minimum range keypads row-similar to a standard telephone keypad for Latin.

FIG. 19 Illustrative placement of digits on a 6-column keypad.

FIG. 22 Illustrative successive refinement of a set of qwerty-like keypads.

FIG. 25 Illustrative selections of keypads row-similar to a telephone keypad for Latin represented in FIG. 23.

FIG. 54 Illustrative keyboards with different numbers of keys with a given fixed maximum number of letters, and varying number of isolated letters.

FIG. 55. Top 20 6-column qwerty layouts, with 11 isolated letters, according to lookup error rate evaluated according to illustrative data, scaled to the lookup error rate of the standard telephone assignment for Latin script.

FIG. 56. Top 20 6-column qwerty layouts, with 12 isolated letters, according to lookup error rate evaluated according to illustrative data, scaled to the lookup error rate of the standard telephone assignment for Latin script.

FIG. 57. Top 20 6-column qwerty layouts, with 13 isolated letters, according to lookup error rate evaluated according to illustrative data, scaled to the lookup error rate of the standard telephone assignment for Latin script.

FIG. 59. Top 20 6-column qwerty layouts with maximum 3 letters per key, according to the probability of an isolated letter.

FIG. 60. Top 20 6-column qwerty layouts with maximum 3 letters per key, according the frequency of the first letter in a fixed order on each key.

FIG. 64. Illustrative layouts optimized for the input of Pinyin.

FIG. 65. Top 20 6-column qwerty layouts with maximum 3 letters per key, according to Lookup error rate evaluated relative to illustrative reference data.

DETAILED DESCRIPTION

Example Standard Telephone Keypad Layouts

Figure 2:
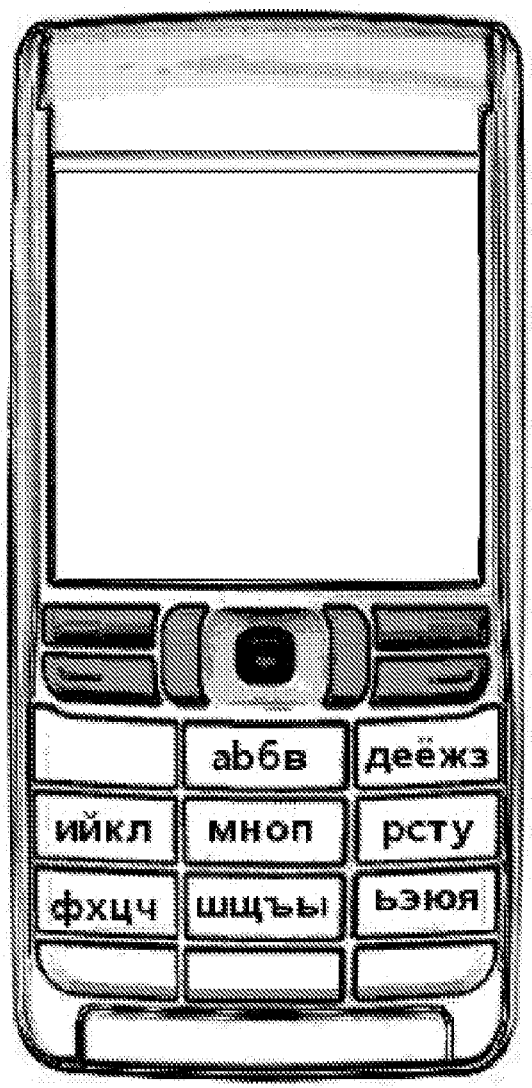
FIG. 2 Illustrative standard telephone keypad for Russian language.
Figure 3:
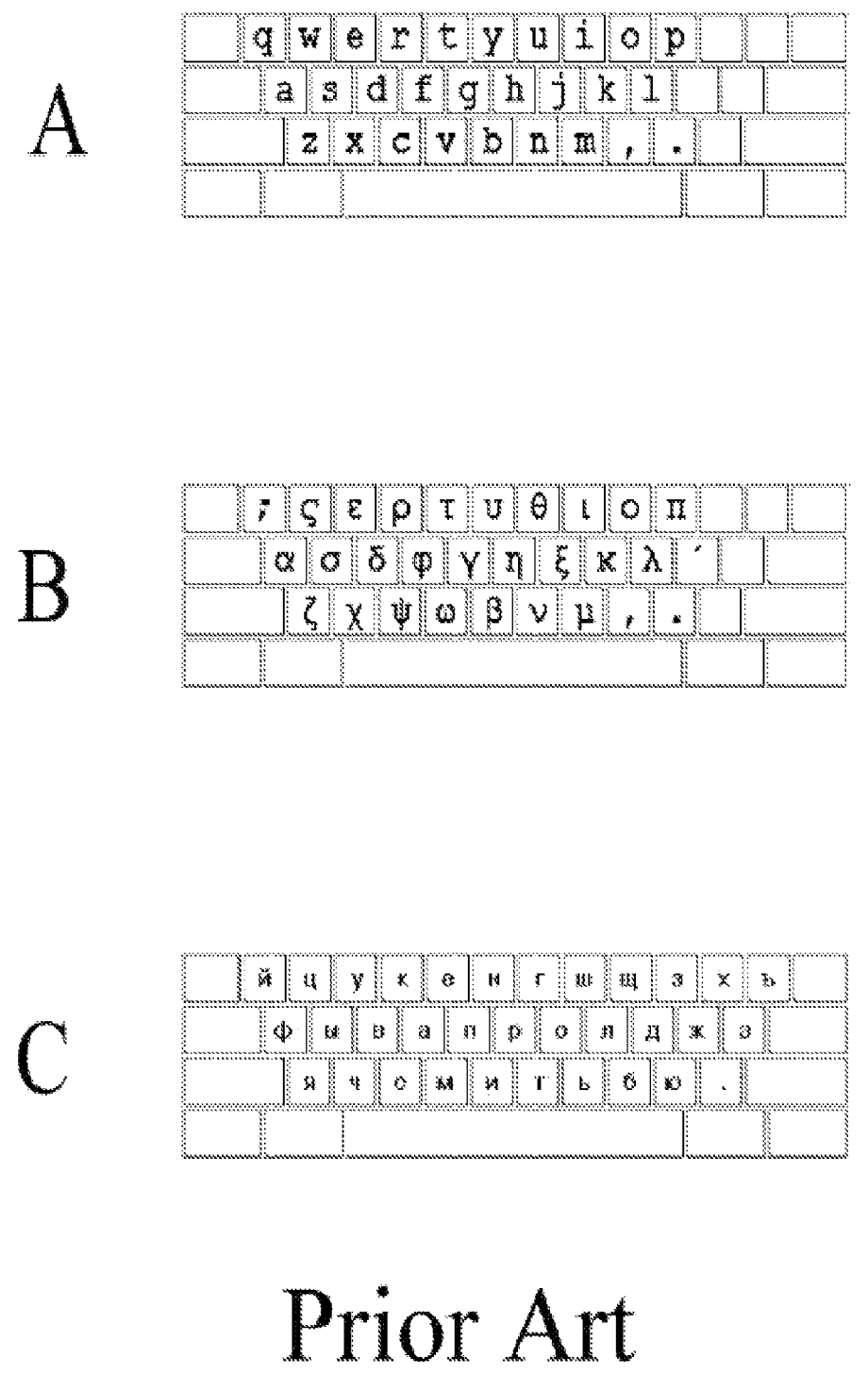

Non-limiting example standard telephone keypad layouts for Latin, Greek, and Cyrillic scripts are shown in FIGS. 1A-1C, respectively. These standard layouts are described in the European Telecommunications Standards Institute document *Character repertoires, ordering rules, and assignments to the* 12-*key telephone keypad*, ES 202 130. Other standards, either de facto or de jure, exist for other scripts and may be treated by the same approaches herein disclosed. A given standard may also contain sub-standards. For example, in reference to FIG. 1C, this standard is for the Cyrillic script, where as a sub-standard may apply to a language written in Cyrillic script, such as Russian, where the Russian sub-standard will only include letters commonly used in Russian. A Russian standard telephone keypad layout is shown in FIG. 2. On the other hand, a specific language-based sub-standard may augment the letters in a script standard by the addition of letters commonly used in the language, but not part of the basis script standard layout. In this disclosure, a standard may be any of such standards or sub-standard, and either de facto or de jure. Desktop full keyboards (typewriter keyboards) also obey standards. Illustrative standard full-sized keyboards for Latin, Greek, and Cyrillic are shown in FIG. 3.

An Embodiment Illustrating Telephone Keypad Row Similarity

In the first illustrative non-limiting embodiment of the row similarity aspect of the present invention, we describe keypads may which preserve many aspects of the numeric keypad layout of a standard telephone keypad, as well all of the aspects of the letter keypad of a standard telephone keypad, except that this embodiment has a) more letter-assigned keys, b) in more than three columns, and c) the association between digits and letters on a given key is modified, regardless of how the digits are assigned.

Figure 4:
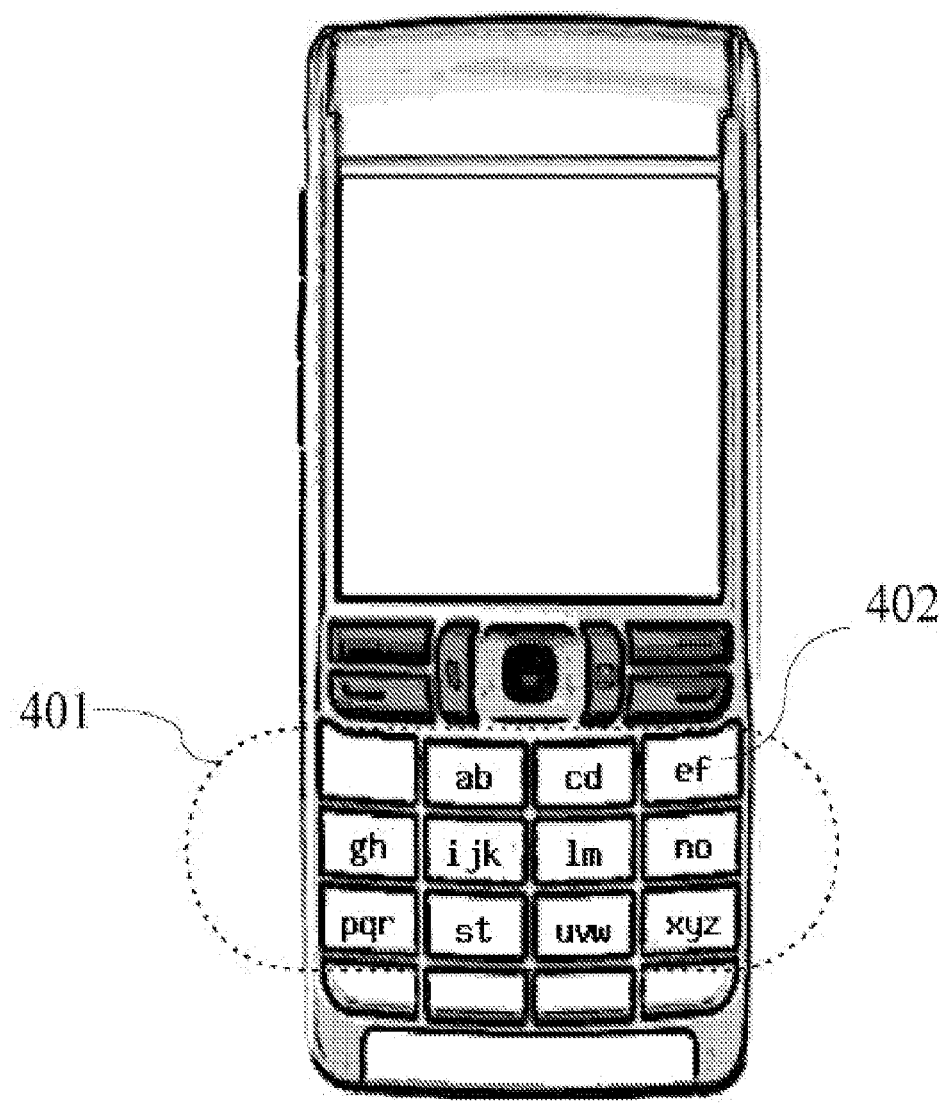
FIG. 4 Illustrative an example row-similar layout for Latin script.

Turning now to FIG. 4, we see a keypad [401] which has 12 keys [402] to which letters might be assigned, laid out in 3 rows and 4 columns Note that the letter assignment is row similar to the standard telephone keypad for Latin script for English, and its range is 1, as in the standard. There are 16 letter assignments which obey these constraints, an illustrative example of which is shown.

Figure 5:
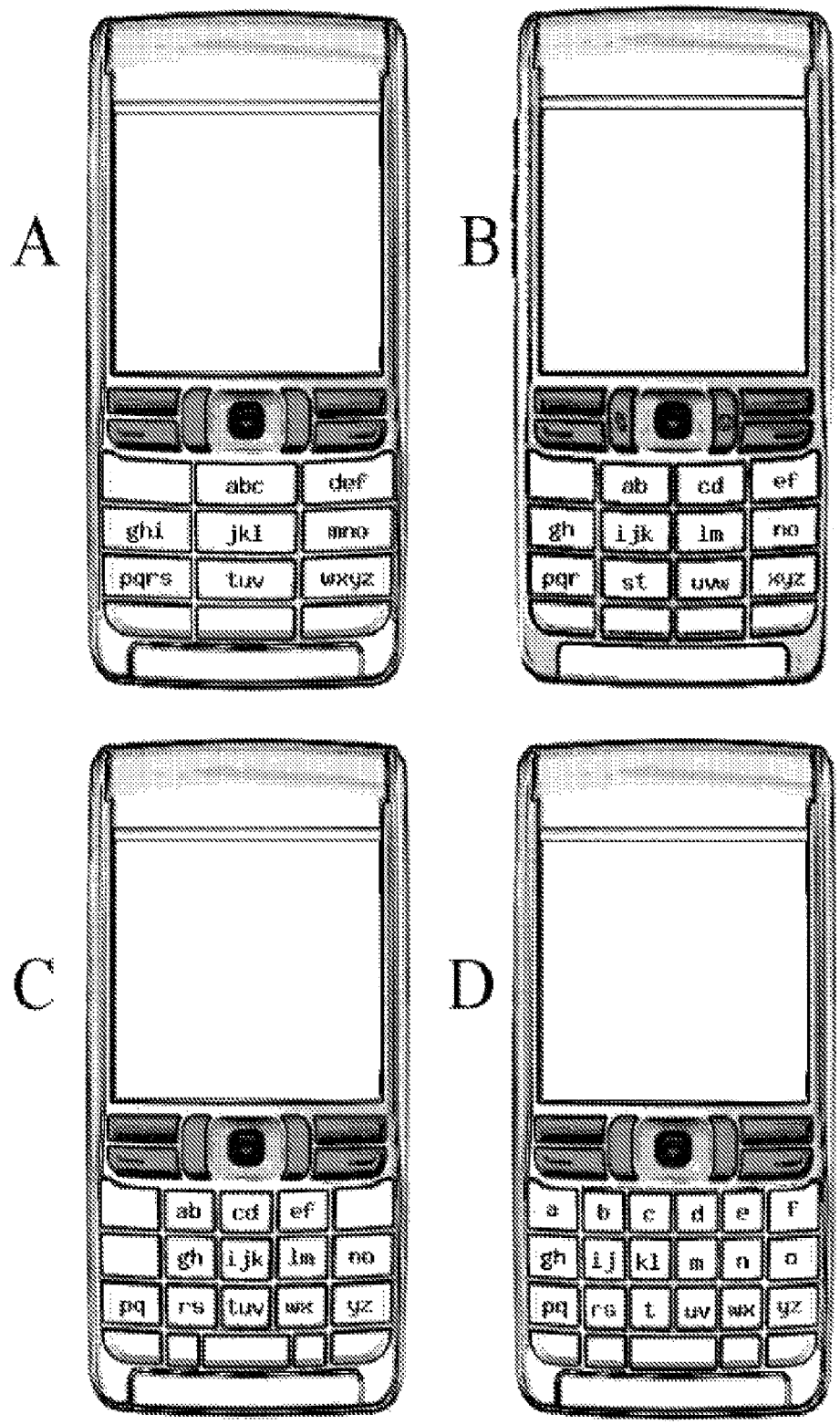
FIG. 5 Illustrative range 1 row-similar layouts.
Figure 6:
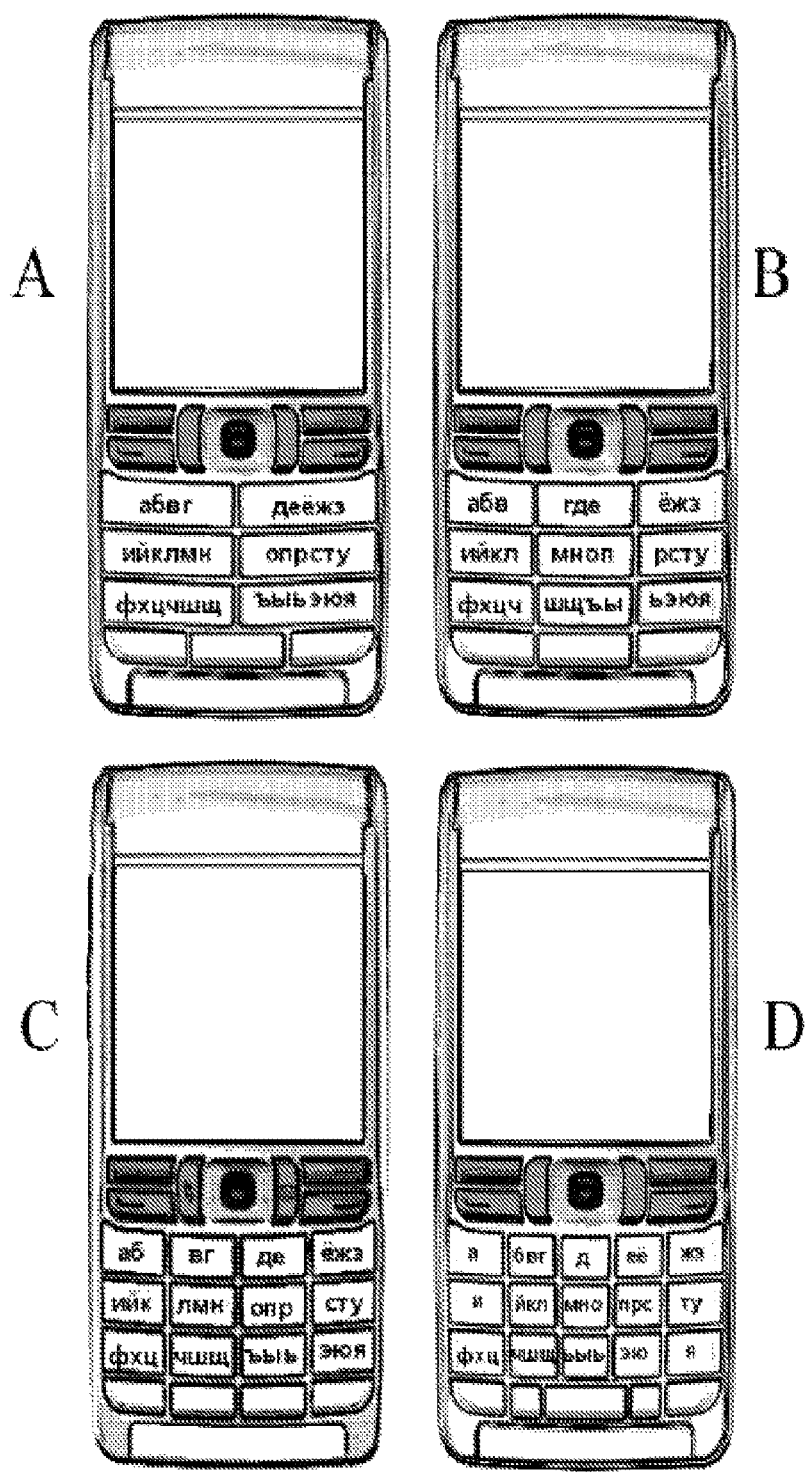
FIG. 6 Illustrative minimum maximum keypads for Russian language.
Figure 6:
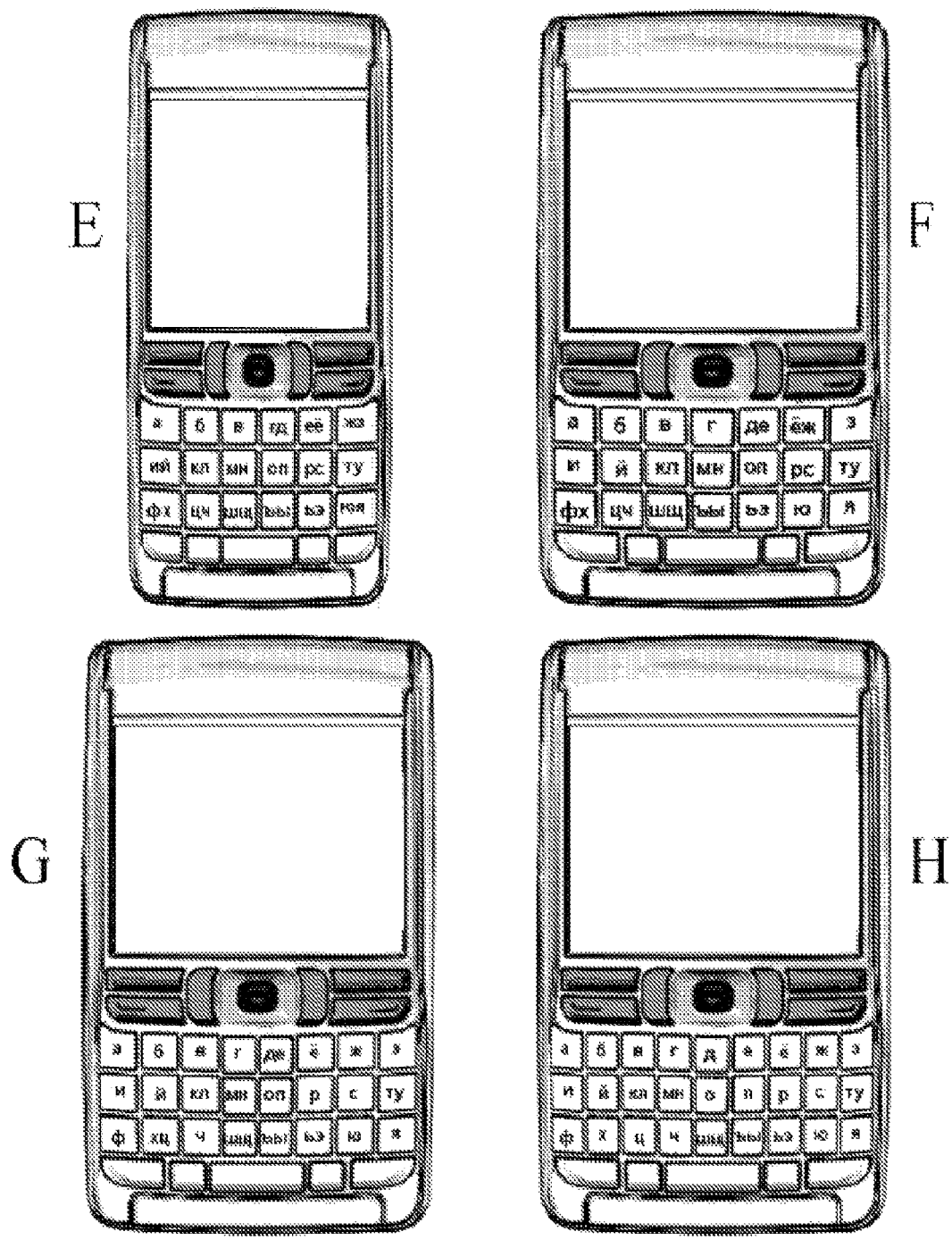

Note that the approach taken in this embodiment is not limited to 4 columns of letter assigned keys. For the Latin standard, the number of columns containing letter assigned keys can increase up to 11, which is the number of letters in the bottom row of the keyboard. In the standard telephone keypad for Latin script, the overall range is 1. In this embodiment we preserve the property of range limited to 1 in a sequence of keypads with different numbers of columns of letter-assigned keys. An example of such keypads, where the range remains 1, as the number of columns varies from 3 up to 11 is shown in FIG. 5, FIG. 5A is the standard telephone keypad for English, whereas FIG. 5B-FIG. 5H are row-similar, range 1 expansions for number of columns of letter-assigned keys 4-11 respectively. It will be appreciated that this is merely a non-limiting example, in particular other choices within the scope of this embodiment could be made for a) the choice of non-letter-assigned keys, and 2) the horizontal displacements of the keys in relationship to each other, and the detailed row-similar, range-1 letter layouts, of which there are many. It will be appreciated that a sequence of keypads with the range fixed to other values than 1 could be generated by the same techniques and are within the scope of this embodiment, and that changing the base standard would not escape the scope of this embodiment, as given any assignment or labeling for a standard telephone, row similar keypads of fixed range can be generated.

An Embodiment Illustrating Minimal Maximum (Min-Max) Keypads

A minimal maximum (min-max) keypad is one in which the maximum number of letters on a key is minimized given other constraints on the layout. As a non-limiting example of this property, we will consider row-similar layouts for a Cyrillic script telephone keypad standard for Russian, for a variety of number of columns, and such that all of the keys in a row are assigned letters from the script, unless there are more columns than letters in the row, in which case the number of letter-assigned keys in the row is equal to the number of letters in the row. Under these constraints, the minimal maximum number of letters on a key is 6, 4, 3, 3, 2, 2, 2, 2 for number of columns=2 to 9 respectively. Illustrative, non-limiting example layouts meeting the minimum maximum limitation under these conditions are shown in FIG. 6A-H for number of columns of letter-assigned keys 2-9 respectively.

Figure 7:
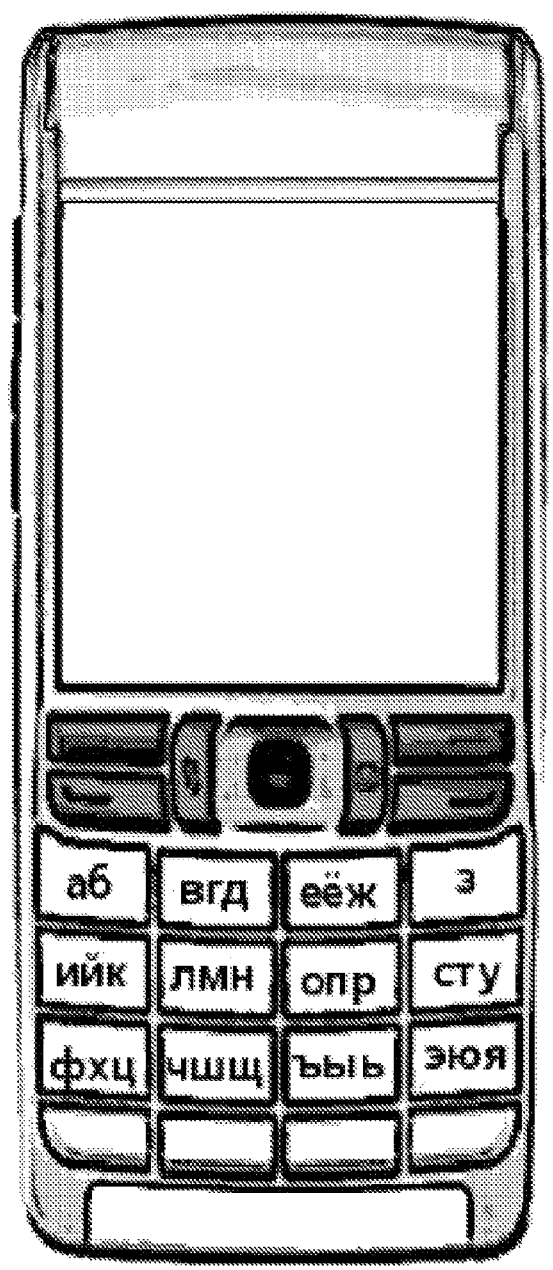
FIG. 7 Illustrative minimum maximum keypad with range greater than the minimum range.

To illustrate that the minimum maximum property is different from a minimum range property, an example keypad is shown in FIG. 7 which has the minimum maximum property (given that all keys in a row are assigned letters, etc. as in this embodiment) but does not have minimum range. In 6C the range is 1, but as seen in FIG. 7, it is possible to arrange the letters so that the layout has the same maximum (3) on the same number of columns of letter-assigned keys, but with a range of 2.

Figure 8:
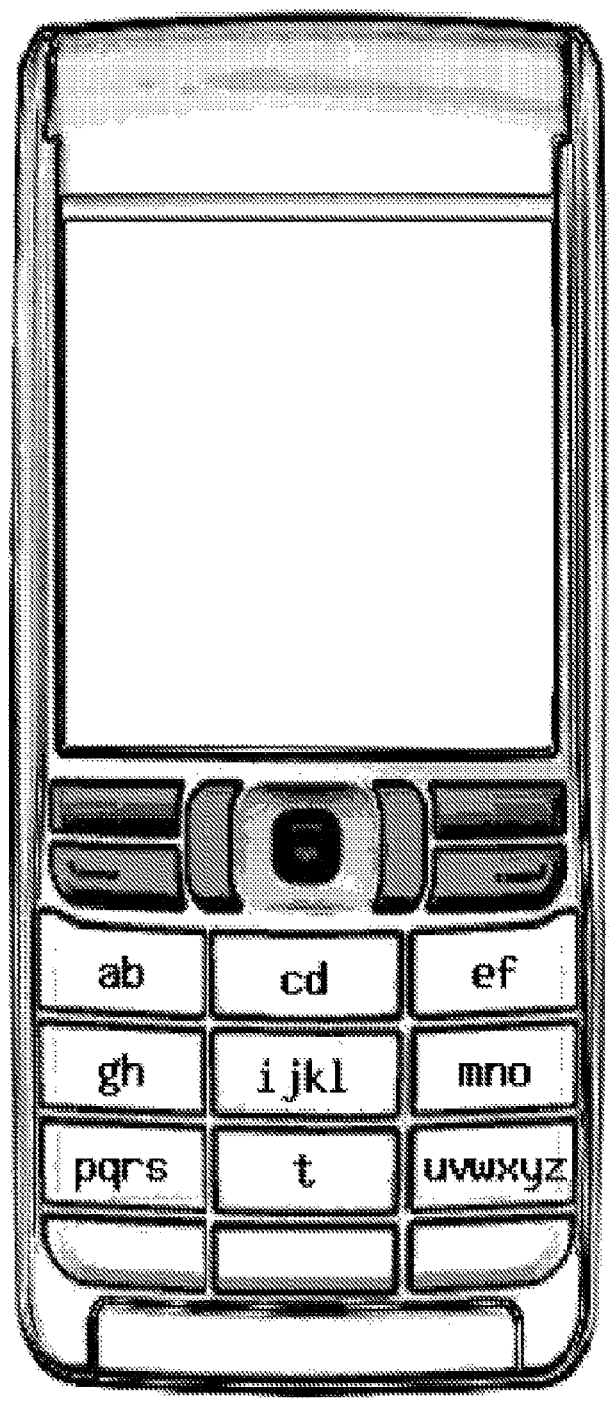
FIG. 8 Illustrative Latin script row-similar keypads with number of letters per key 5 or greater.

An Embodiment Illustrating Row-Similar Keypads with at Least One Key Assigned More Letters than any Key in the Standard This embodiment illustrates keypads row similar to a standard keypad where the number of base letters assigned to at least one key is greater than the greatest number of base letters assigned to any key in the standard. In the case of the Latin script for English, this means considering keypads with the maximum number of letters ambiguously assigned to a key of 5 or greater. An example is shown in FIG. 8. Here, a 3-column keypad row-similar to the standard telephone keypad for English is shown, with a maximum number of letters per key of 6, and with a lookup error rate of 43.7 on certain linguistic data for English, whereas the standard itself has a lookup error rate of 29.7 on the same data.

Figure 9:
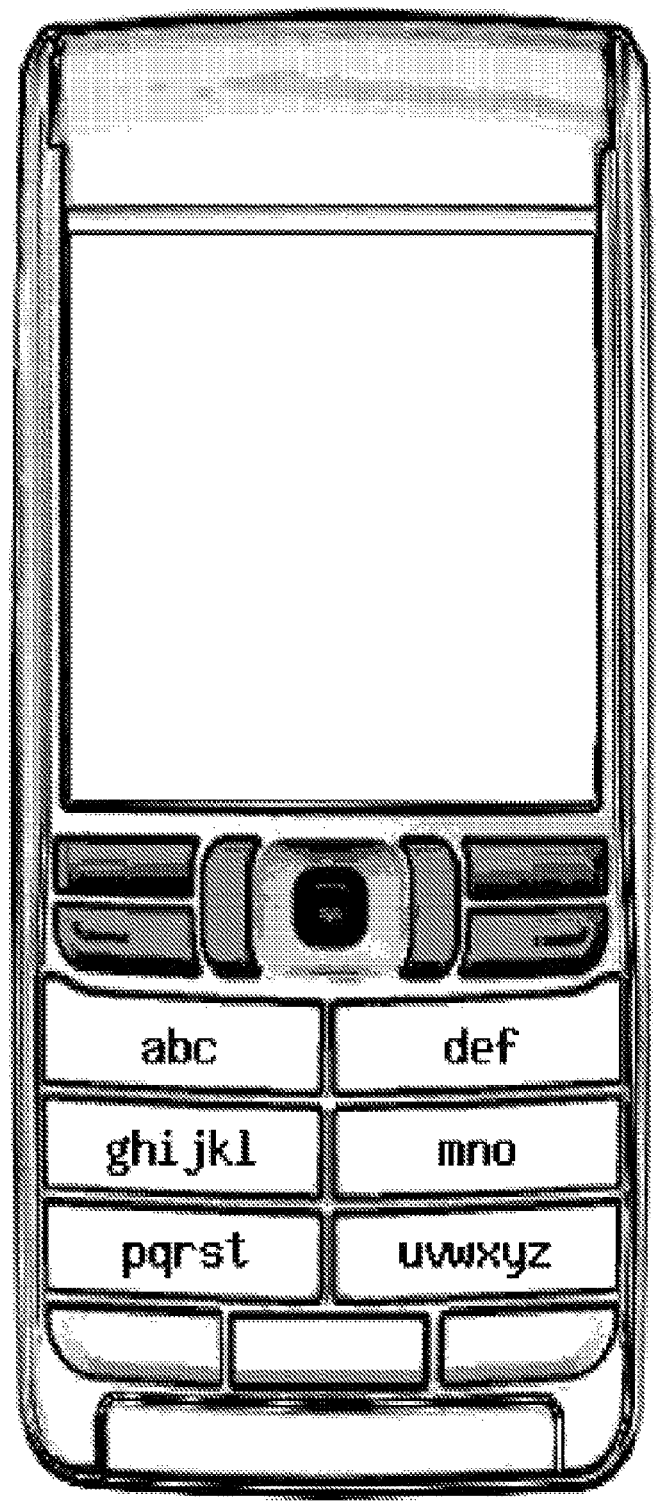
FIG. 9 Illustrative 2-column keypad row-similar compression of the standard telephone keypad for Latin script.

Row-similar keypads in which at least one key has more letters assigned to it than any key in the standard to which it is row similar occur particularly, but not exclusively, when the number of columns of letter-assigned keys is less than the number of columns of letter-assigned keys in the standard, that is, when the row similar keypad is produced by compression of the standard rather than extension. A 2-column keypad which is a compressed keypad row similar to the standard telephone keypad for Latin is shown in FIG. 9. This keypad also has a maximum number of letters per key of 6.

Alternatively, one may seek keypads which are row similar to a telephone keypad standard, and an extension of that standard, but such that no key is assigned a number of base letters greater than the number of base letters assigned to any key in the standard. For the standard telephone keypad for Latin, this would entail no key with more than 4 base letters assigned. Illustrative examples will appear later in the disclosure.

Max-2 Keyboards

A row-similar max-2 keyboard has no more than 2 base letters assigned to any key, and is row-similar to a keypad standard. For a row-similar keypad similar to a standard telephone keypad for English, there must be at least 6 columns in a max-2 keyboard. This is due to the large number of base letters (11) is in the bottom row. For less than 6 keys in the bottom row, at least one key must have three or more base letters assigned to it, as can be seen from the min-max keypad embodiment above. It should be noted, however, that not all rows need to have the same number of letter-assigned keys to satisfy both the row-similarity and the max-2 constraint.

For example, there are 20 possible ways to lay out letters on 3-row, 6-column array, given that all keys of the array are assigned letter labels, and that the keyboard is max-2 and row-similar to a telephone keypad for Latin script. These 20 layouts are shown in FIG. 10, ordered by their lookup error rate as calculated relative to sample reference data. In view of the teachings of this embodiment, it should be evident to one skilled in the art that row-similarity relative to different telephone keypad standards will produce results which differ in detail but not concept from those shown here with respect to row-similarity to the conventional telephone keypad layout for English, in Latin script.

Figure 11:
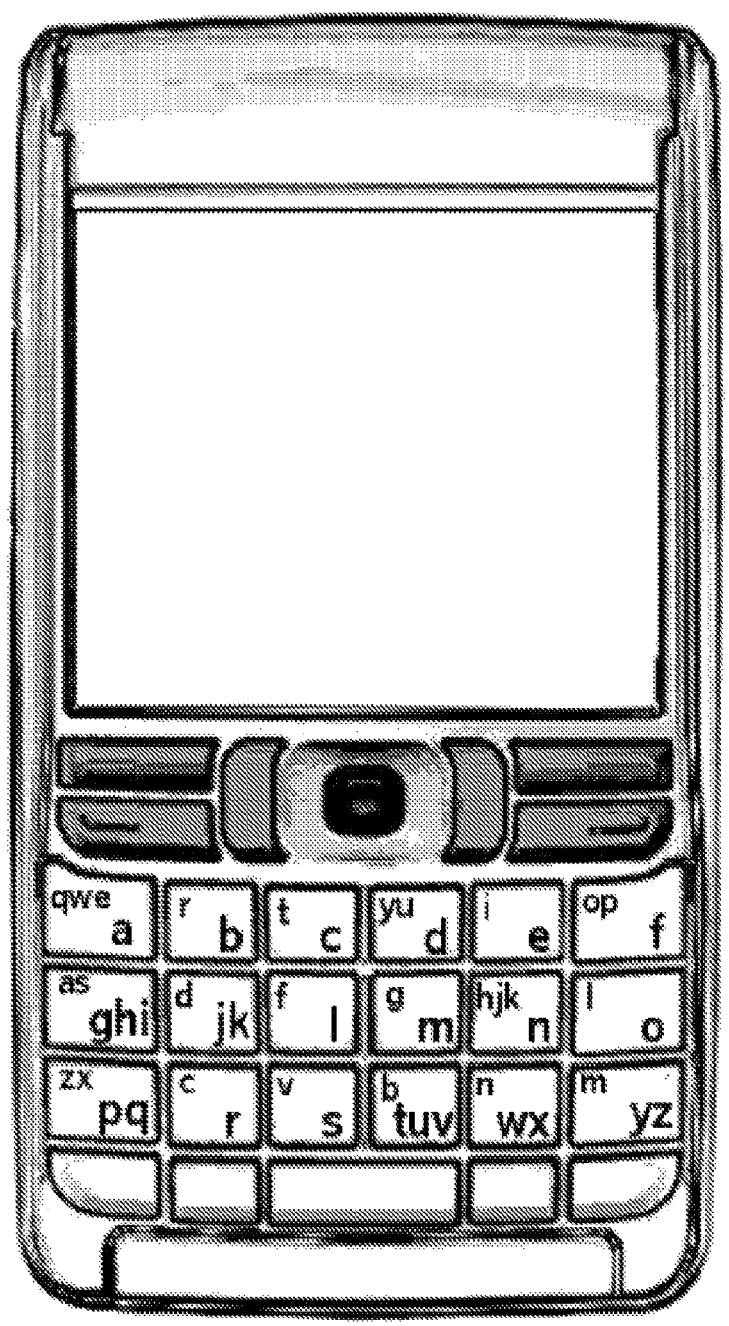
FIG. 11 Illustrative 6-column keypad with both qwerty and Latin row-similar telephone layouts.

Keypads which Support Both Row-Similar Telephone Keypad Layouts and Reduced Layouts Corresponding to Typewriter Standards An aspect of the present invention illustrated by the present embodiment is the dual labeling of a keyboard with both a) a row-similar to a telephone keypad layout, and b) a row-similar to a full-sized keyboard layout. Turning now to FIG. 11, we see an illustrative example of such dual labeling. Here a 6-column keypad is labeled both with a keyboard row-similar to qwerty and row-similar to a telephone keypad layout for English.

Figure 12:
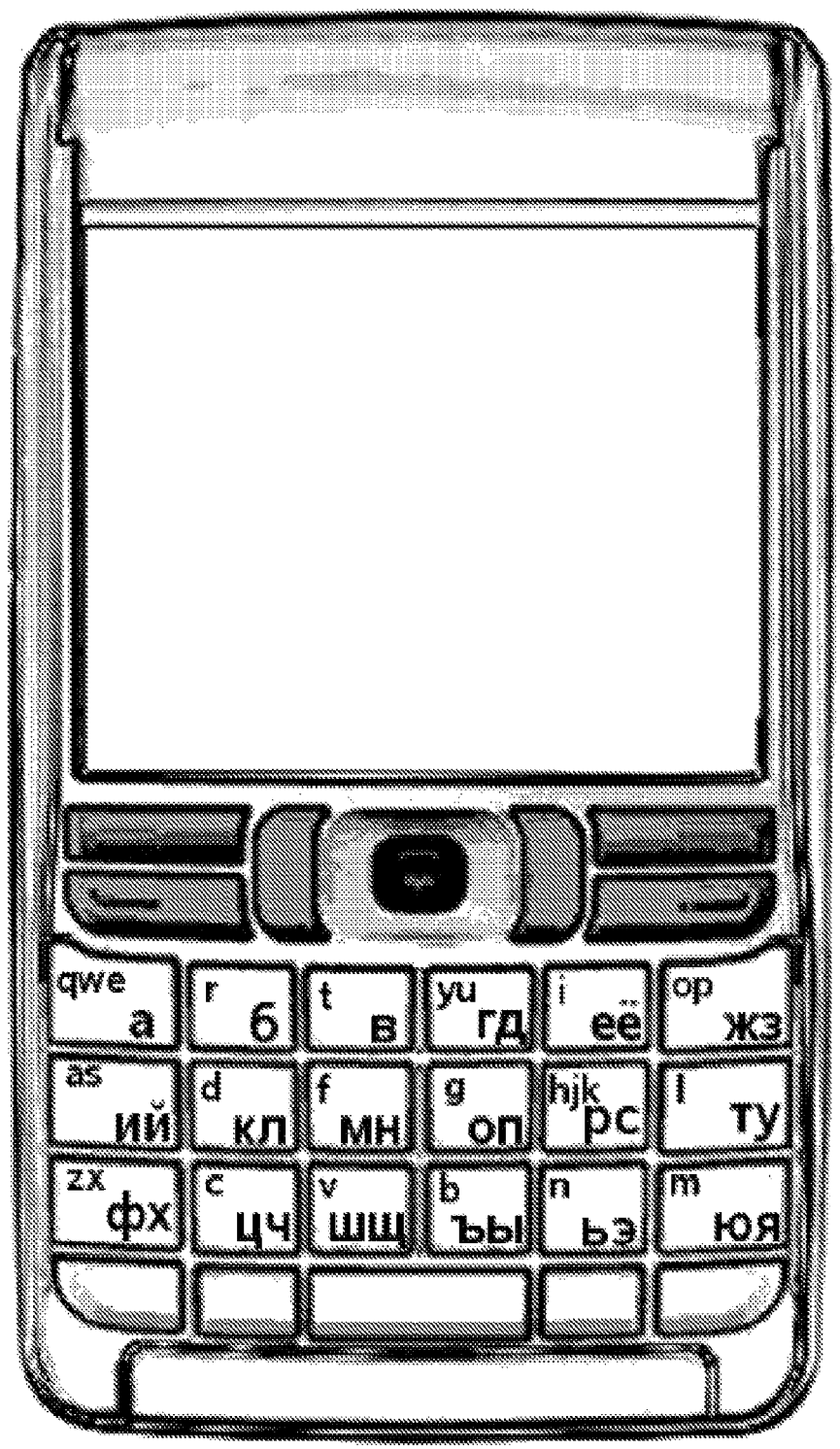
FIG. 12 Illustrative 6-col keypad with both a row-similar qwerty and Russian telephone layout.

Multiple Script Labeling of Telephone Keypad Row-Similar Keypads and/or Keypads Row-Similar to a Standard Typewriter Arrangement Various other combinations of standards are subject to dual labeling. For example, one of the set of labels could correspond to a row-similar arrangement for one script, and another could correspond to a row-similar arrangement for another script. Alternatively, one set of labels could correspond to a reduced typewriter arrangement for a given script, and the other to a row-similar arrangement for a telephone keypad in another script. A non-limiting illustrative example is shown in FIG. 12. Here, one set of labels corresponds to the Latin script qwerty keyboard; the other is row-similar to a standard telephone keypad for Russian, in Cyrillic script. One or more sets of labels could be configured to be shown to the user, or be visually emphasized for the user, by use of selective backlighting, polarized lighting, or similar means. The same techniques could be used to visually emphasize other sets of labels, such as sets containing digits and/or punctuation.

Break Similarity

A first layout will be said to be break similar to a second layout if when a pair of letters is assigned to different keys in the second layout, they are also assigned to different keys in the first layout. Here there is only one such pair, cd. For instance, considering only the letters a-f, if the first layout is on four keys: ab c d ef, it is break similar to a second layout abc def, since every pair of letters which is separated to different keys in the second layout is also separated to different keys in the first layout. Note that the relationship is not symmetrical, since in the 4-key layout the pairs be and de are separated on different keys, but on the same key in the 2-key layout. Row similarity and break similarity are different properties. A layout could be row similar to another but not break similar.

Smooth Sequences of Keyboards

A smooth sequence of keyboards is a sequence of keyboards of a monotonically increasing number of columns such that transitions between members of the sequence can be smoothly animated. A smooth sequence is one in which each member of the sequence is both row similar and break similar to all members of the sequence with a smaller number of columns. One application of smooth sequences is to soft keyboards on touch screen displays. In such a soft keyboard, the user may control the number of columns of letter-assigned keys at will. The means to control the number of columns could include a hardware or software switch, a gesture on a multi-touch touch screen, and so on. Thus it is to be understood that drawings representing a sequence of hardware designs may also represent sequences in which the keyboards in the sequence are generated in software only. One way to achieve break similarity is to make it such that if a pair of base letters assigned to the same key is split to adjacent keys as the number of columns of letter-assigned keys is increased, then the pair is never reassigned to the same key as the number of columns of letter-assigned keys is further increased. An example of a non-smooth and smooth sequence of keyboards is shown in FIG. 13 and FIG. 14 respectively.

Figure 13:
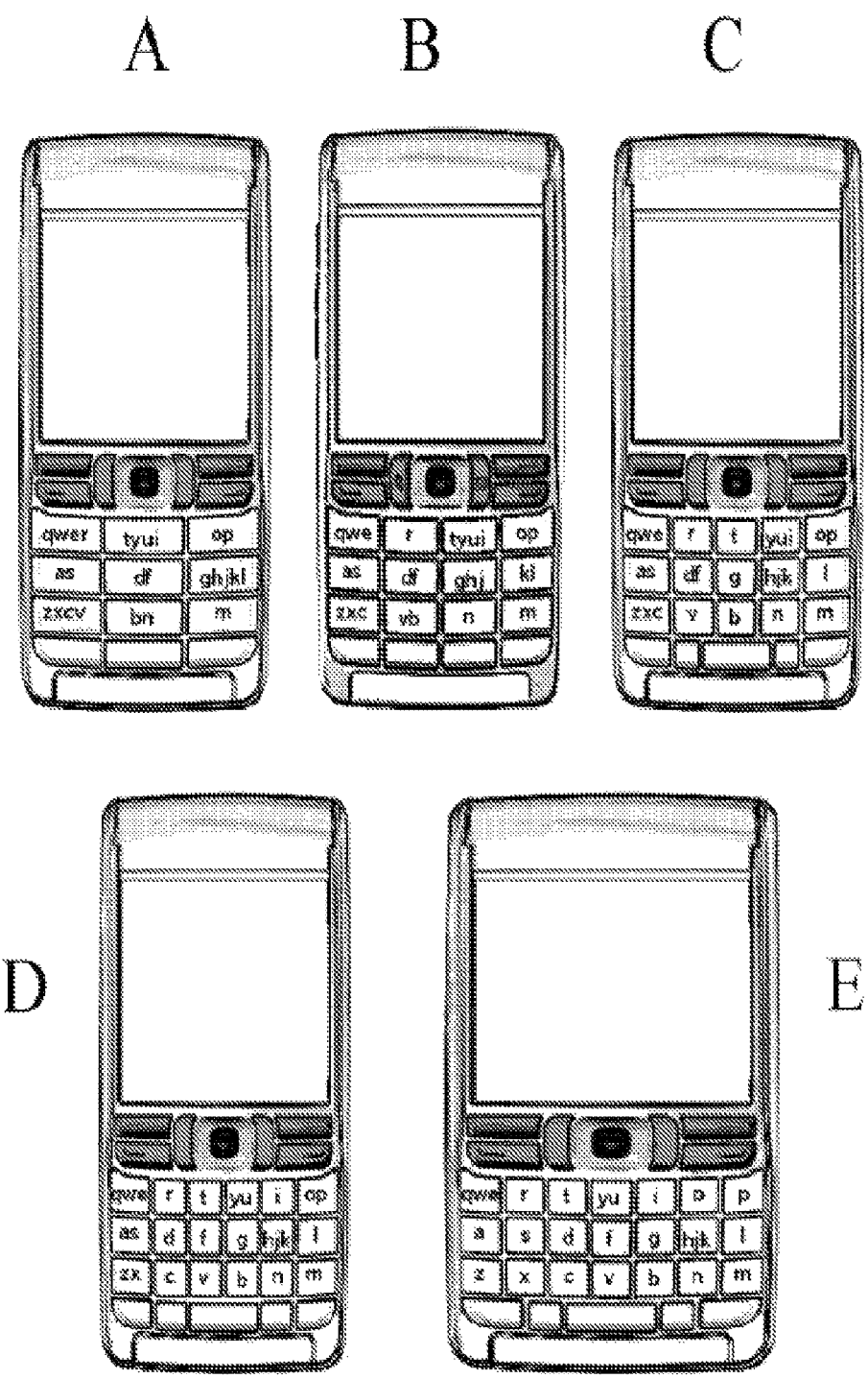
FIG. 13 Illustrative non-smooth sequence of keypads.
Figure 14:
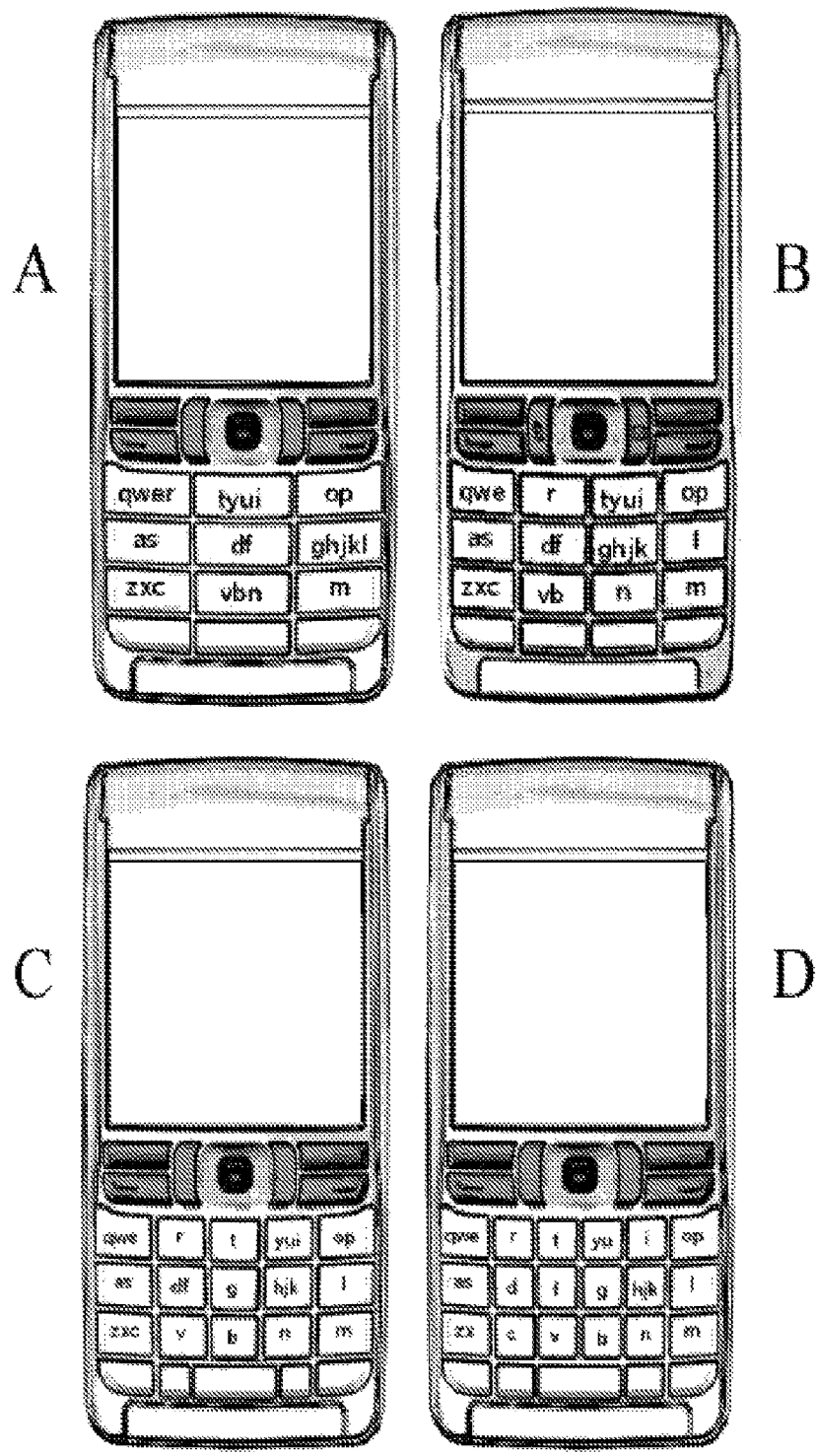
FIG. 14 Illustrative smooth sequence of keypads.

In reference to FIG. 13, consider the pair of letters jk. Both members of the pair are assigned to the same key in the 3-column version (FIG. 13A), on separate keys in the 4-column version (FIG. 13B), and recombined on the same key for the 5-column version (FIG. 13C) Similarly, the letter pair vb is separated on the 3-column version (FIG. 13A), combined for the 4-column version (FIG. 13B) and separated again for the 5-column version (FIG. 13C). By contrast, the sequence shown in FIG. 14 is smooth; all letter pairs which are separated for n columns are also separated for m>n columns. FIG. 14A-G shows a smooth sequence for a qwerty keyboard for number of columns 3-9 respectively.

Smooth Sequences Optimized for Typability

Figure 15:
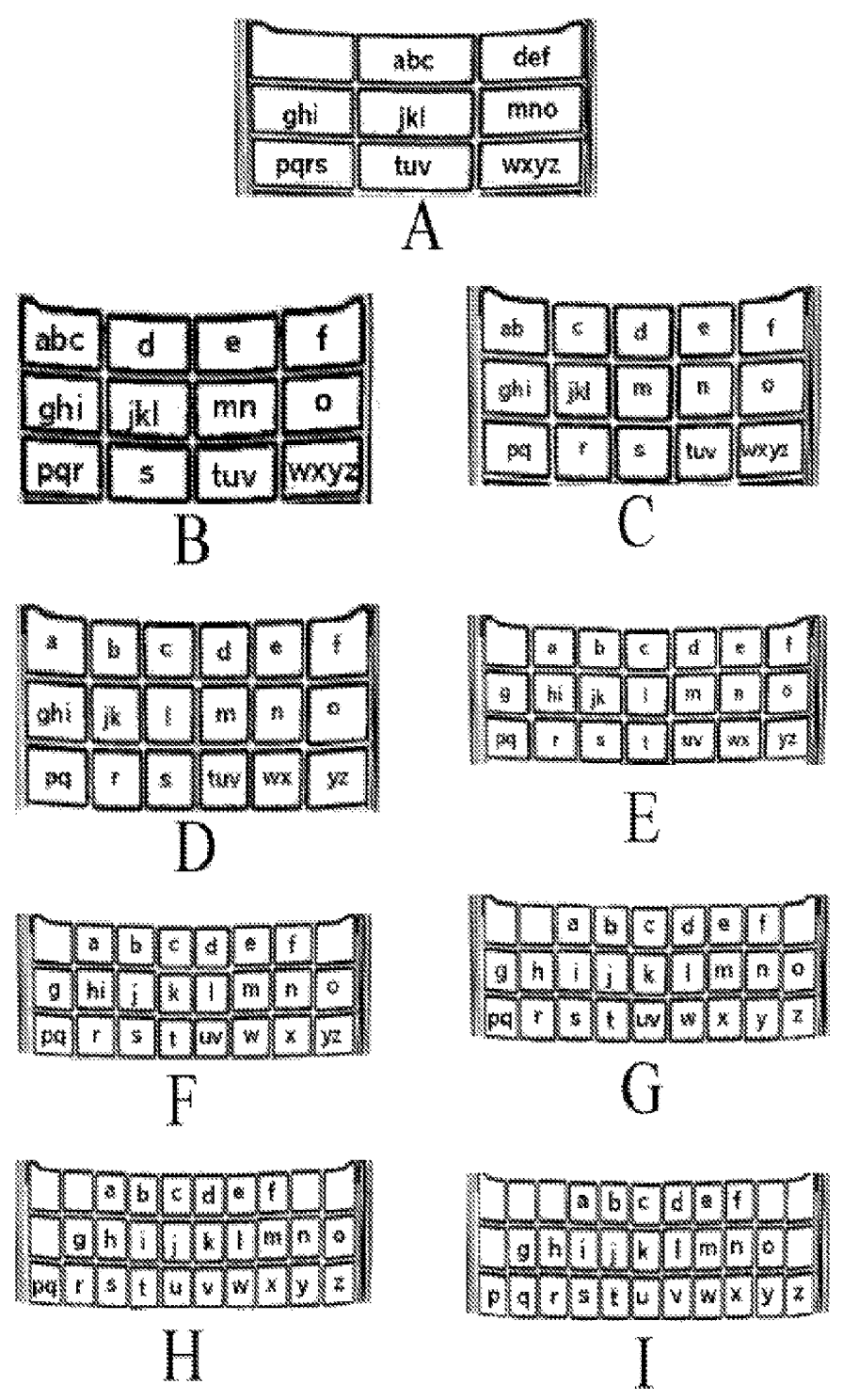

Similarly, smooth sequences can be found for other layouts than qwerty. In FIG. 15, the standard telephone keypad for Latin script is used as a base, and smoothly expanded to an 11-column unambiguous keyboard. There are typically many possible layouts which smoothly extend a given layout to more columns. For the sake of illustration, the sequence shown in FIG. 15 was chosen so as to optimize with respect to lookup error rate. That is, of all the ways to smoothly extend from n to m>n columns, the extension which maximized lookup error rate was chosen at each step, where the lookup error rate was measured relative to some reference data. It will be appreciated by one skilled in the art that some other quantitative measure of typability could have been used, and that other reference data might produce a different smooth sequence.

Figure 16:
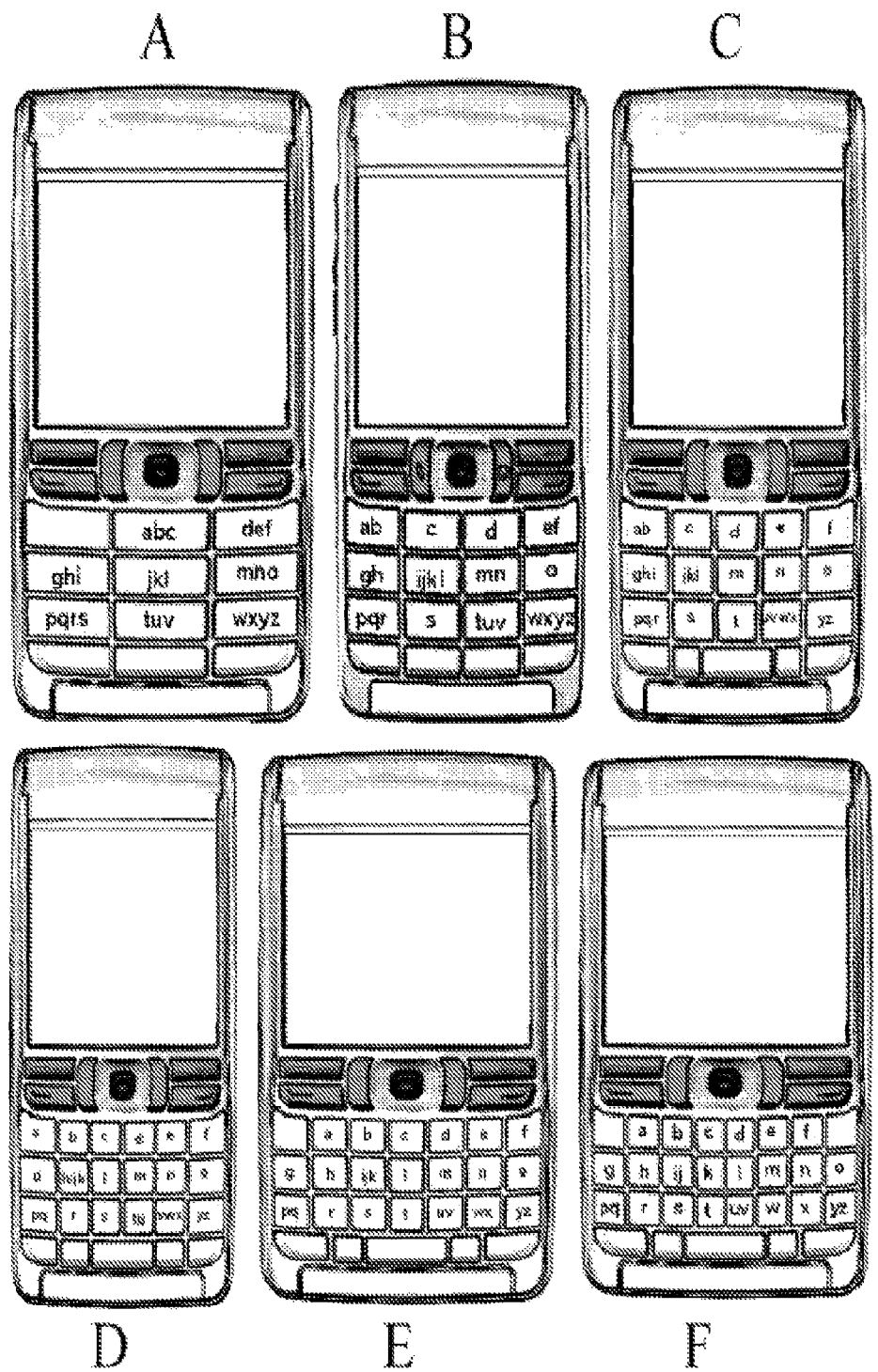
FIG. 16 Illustrative non-smooth typability optimized telephone keypad sequence.

Turning now to FIG. 16, we see a non-smooth sequence of keypads which has better typability properties (as measured by lookup error rate) than the sequence of FIG. 15 or any which could be found in the set of smooth sequences obeying the given restrictions applicable to embodiments captured by that figure. To see that the sequence of FIG. 16 is non-smooth, note that the pair of letters hi is separated (h on one key and i on another) at FIG. 16B, but reunited to the same key at FIG. 16C and FIG. 16D, and then separated again at FIG. 16E. Similarly, the letter pair uv is together in FIG. 16C, separated at FIG. 16D and reunited at FIG. 16E.

Row-Wise Minimum Range Keypads

Figure 17:
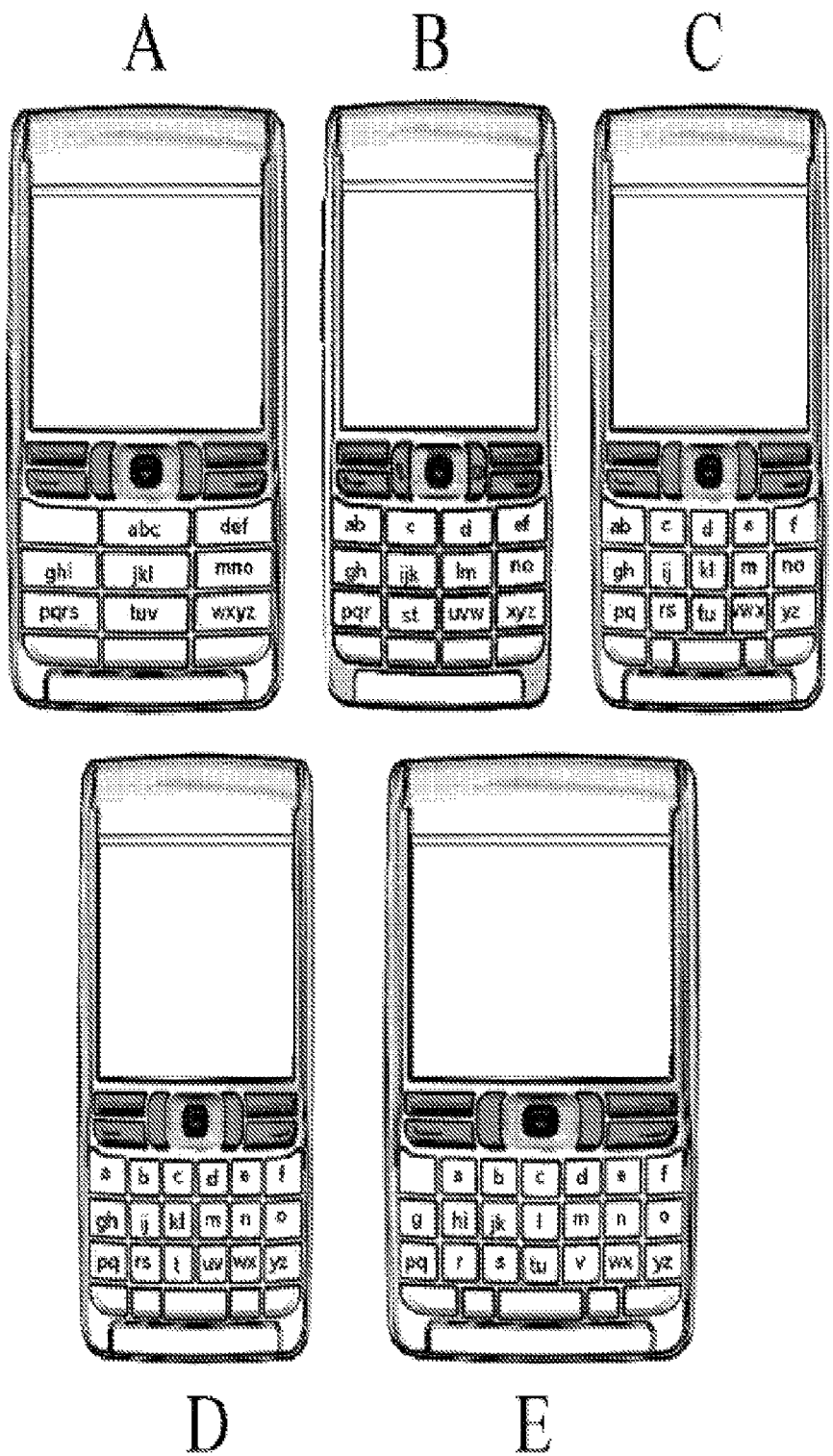
FIG. 17 Illustrative non-smooth sequence of row-wise minimum range keypads.

Row-wise minimum range keypads are keypads in which the difference between the maximum number of letters assigned to any key in a given row and the minimum number of letters assigned to any key in the same given row is as small as possible. The standard telephone keypad layout for Latin is row-wise minimum range. The range in the top and middle rows is 0, and the range in the bottom row is 1. The property can be applied to describe other keypads, such as the sequence of keypads shown in FIG. 17, which are also, for the sake of illustration, optimized with respect to lookup error rate given that each member of the sequence is a) row similar to the standard telephone keypad for Latin, and b) minimum range given that all keys are assigned letters in the set A-Z and no others. Note that this sequence is not a smooth sequence. For instance, the letter pair kl is separated for the 4-column version (FIG. 17B) but recombined for the 5-column (FIG. 17C) and 6-column versions (FIG. 17D). Note also that these keypads have row-wise minimum range, given that all columns of keys are labeled with a letter when the number of letters in a row is greater than or equal to the number of columns. This figure illustrates that the row-wise range may be less than the overall range. For instance, in FIG. 17B, the row-wise ranges are 1 for each row, though the overall range is 2. An overall range of 1 could be achieved at the expense of labeling only 3 keys in the top row with letters, and placing 2 letters on each key in the top row, with a possible deleterious effect on typability.

Smooth, Row-Wise Minimum-Range Keypad Sequences

The smoothness property may be imposed on a sequence of keyboards which are of row-wise minimum range. Within the set of sequences satisfying these constraints, typability may be optimized, for instance, by selecting elements of the sequence to have good lookup error rates. A non-limiting example such sequence is shown in FIG. 18, which discloses a smooth sequence of row-wise minimum range keyboards optimized for lookup error rate. Note that this sequence omits a 4-column version. This is because, under the limitations of this embodiment, no 4-column version was found which smoothly interpolates between the standard telephone keypad for English and an unambiguous 11-column version (not shown), while maintaining row-wise minimum range. This illustrates that sequences are understood to include non-trivial subsequences. Even on this subsequence, lookup error rate can not be optimized as well as if the smoothness and row-wise minimum range limitations are removed. It should be clear that the smoothness property could be combined with other partition limitations disclosed herein, such as even-as-possible and minimum maximum, and such combinations are understood to be within the scope of this disclosure.

Placement of Digits

While this disclosure up to now has focused on letter assignments and labels, the same keypads could be used to enter other symbols, predictively or non-predictively, such as digits or punctuation symbols. We now consider some illustrative non-limiting examples of combinations of digit labeling with the letter labeling and assignments disclosed herein. Telephone keypads typically have digits occupying 3 or more rows, while in typewrite layouts, digits are typically confined to one row (typically the row above the top row for letters). In the standard qwerty layout, and some other standard typewriter layouts, the row with the largest number of letter-assigned keys has an even number of letter-assigned keys. In the qwerty layout, the top row of letter-assigned keys has 10 letter-assigned keys. It is difficult to exactly center an odd-column-number telephone digit arrangement (3 columns) in a keypad in an even number of columns keypad when each digit is represented on a unique key. One solution is to place the telephone keypad somewhat off center, no more than 3 columns from center, but with the digits shifted in the other direction to compensate, as is shown in FIG. 19A, where a 3-column telephone-keypad-like digit array is embedded in a 6-column row-similar to a telephone keypad letter arrangement. In FIG. 19B, the number of columns of the telephone digit array (including the symbols * and #) is made to be an even number by placing the final row of symbols (0,*,#) in the standard telephone keypad in a column along side the 3-columns containing the other digits. This strategy was employed to embed a telephone keypad in a 10-column qwerty keyboard by Nokia in its E61 model phones. It should be clear to one skilled in the art that various departures from the arrangement are possible. For instance, the column containing (0,*,#) could be placed to the right rather than the left, and the order of the symbols (0,*,#) from top to bottom could be changed. These variants, as well as many others to this and all other particular illustrative embodiments described herein as well of combinations of features thereto are well within the scope of this disclosure, which scope should be judged by the appended claims.

Maximization of the Number of Isolated Letters while Minimizing the Maximum Number of Base Letters on a Key, and/or Minimizing the Number of Keys which have a Fixed Maximum Number of Base Letters Assigned to them Given a fixed number K of base-letter-assigned keys, a fixed number of base letters L, and a fixed maximum number of base letters on a key $L_{max}$, there is a maximum number of keys which can be assigned a single base letter, $I_{max}(K, L, L_{max})$. For instance, with 26 base letters and 18 keys, and no other constraints on the assignment of letters to keys, if the maximum allowed number of letters assigned to a given key is 3, then the maximum number of isolated base letters is 14.

This limit is obtained when 4 keys are assigned three letters each, and the other 14 keys are assigned one letter each. Similarly, given a fixed number K of base-letter-assigned keys, a fixed number of base letters, L, and a fixed number of isolated base letters I, there is a minimum maximum number of base letters which must be assigned to some key, $L_{min-max}$ (K,I,L). For example, if there are 26 base letters, 18 keys, and 25 isolated letters, then one of the keys must be assigned 9 letters. Thus, the maximum number of letters on a key, the number of keys which have that maximum number of letters assigned to them, and the number of isolated letters are interdependent quantities, and can be optimized within ranges in different orders or simultaneously, with potentially different results depending on the order or weighting of importance. Clearly, for some values of their arguments, the functions are undefined. For instance, the number of isolated base letters cannot be greater than the number of base-letter-assigned keys. In this embodiment, we seek to maximize the number of isolated letters (keys with a single base letter assigned to them) given a fixed maximum number of base letters assigned to any single key, and/or a fixed maximum number of keys with the maximum number of base letters. The optimization of these properties imposes a partial ordering on the set of layouts. That is, for instance, for a fixed maximum number of letters on a key, if two keyboards have at least one key with that maximum number of letters, and have the same number of isolated letters, then the one with the smaller number of keys with the specified maximum number of letters is greater than the other, other things being equal. And yet two different keypads may have the same number of keys with the same maximum, and the same number of isolated letters, so the ordering is only a partial ordering. Similarly, for a fixed maximum number of letters on a key, if two keyboards have at least one key with that maximum number of letters, and have the same number of keys with the specified maximum number of letters, the one with the most isolated letters may be said to be greater, other things being equal.

It may be noted that the number of isolated letters, and the number of keys with the maximum number of letters may be evaluated and optimized for any ambiguous keyboard. The keyboards need not follow any standard arrangement or be row-similar to a standard arrangement. In particular, these properties apply both to reduced typewriter keyboards as well as expanded telephone keyboards. Row similarity may be imposed as an additional limitation. Row similarity imposes additional limitations on the relationship between the number of isolated letters and the number of keys with a fixed maximum number of letters. In an example given above, we saw that 26 letters can be distributed over 18 keys so that no key has more than 3 letters, and there are 14 isolated letters. If we now consider that the 18 letter-assigned keys are arranged in 3 rows, and the letters on each row are those of the qwerty keyboard, so that the 6-column keyboard is row similar to a full qwerty keyboard, then only 3 keys can have 3 letters each, and the maximum number of isolated letters is 13. A non-limiting example is shown FIG. 54C. If only 2 keys are allowed 3 letters, then the maximum number of isolated letters is 12 (FIG. 54B), and if only 1 key is allowed 3 letters, then the maximum number of isolated letters is 11 (FIG. 54A). Further limitations within the scope of this aspect include fixing the number of columns of letter assigned keys, and/or fixing the number of letter-assigned keys row by row. Each of these limitations may also affect the relationships between the maximum number of letters assigned to a given key, and the number of isolated letters overall. The smoothness property applies generally to expansions of ambiguous keyboards, and may also be combined with the other limitations described above. For instance, one could seek a smooth sequence of keyboards in which all members have the same fixed maximum number of letters assigned to a key, or a maximum which is a function of the number of columns, and with a maximum number of isolated letters.

Figure 20:
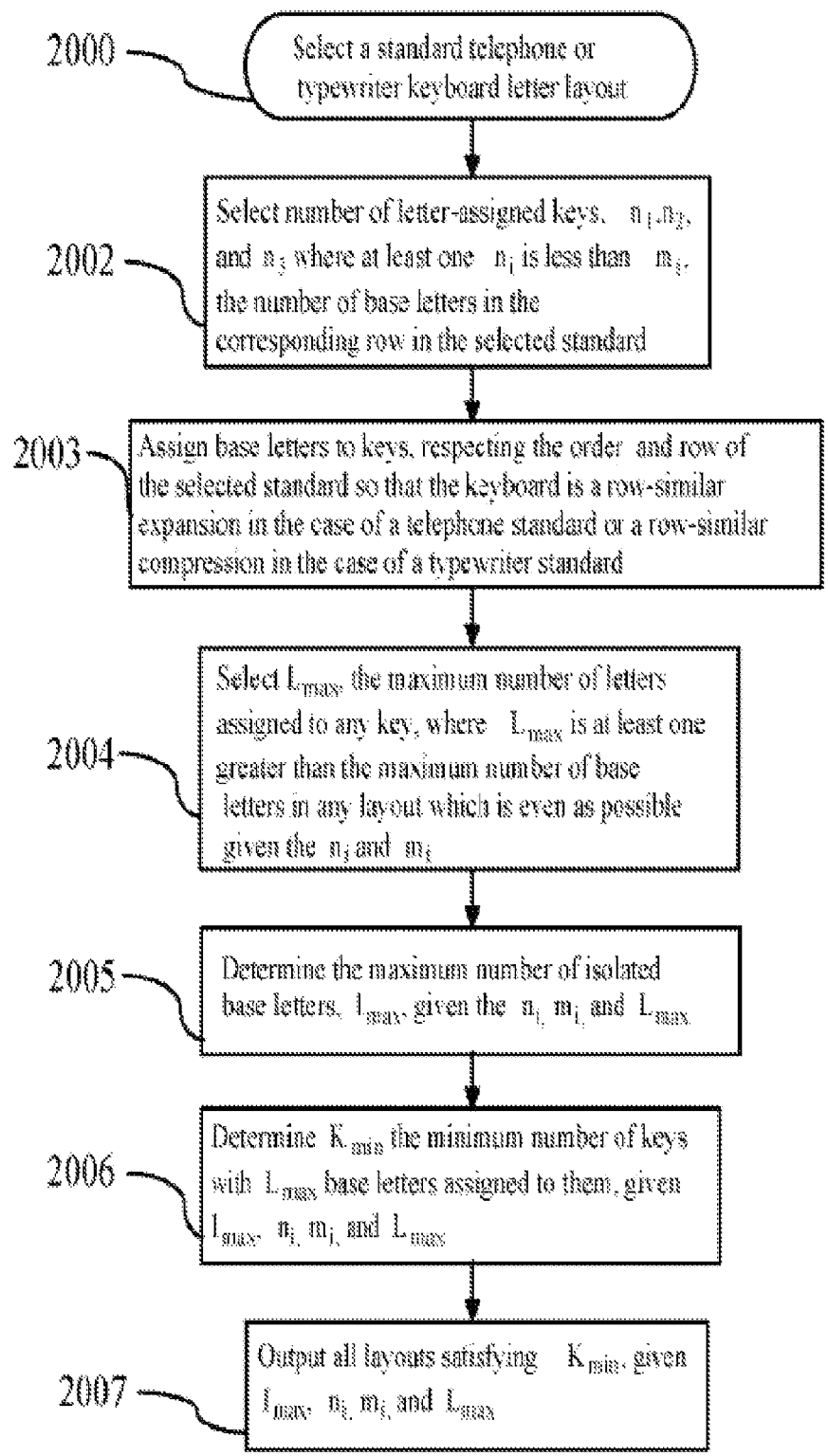
FIG. 20 Illustrative method to select a set of keypads optimized for number of isolated letters and minimum number of keys with maximum number of letters.

Several steps of an illustrative method for making keyboards within the scope of this aspect are described in reference to FIG. 20. This figure illustrates one way to apply structural constraints according to the teachings of this invention. Here, for the sake of illustration, we will apply some constraints to 6-column qwerty-like keyboards. The selection of the qwerty standard completes step 2001.

Figure 24:
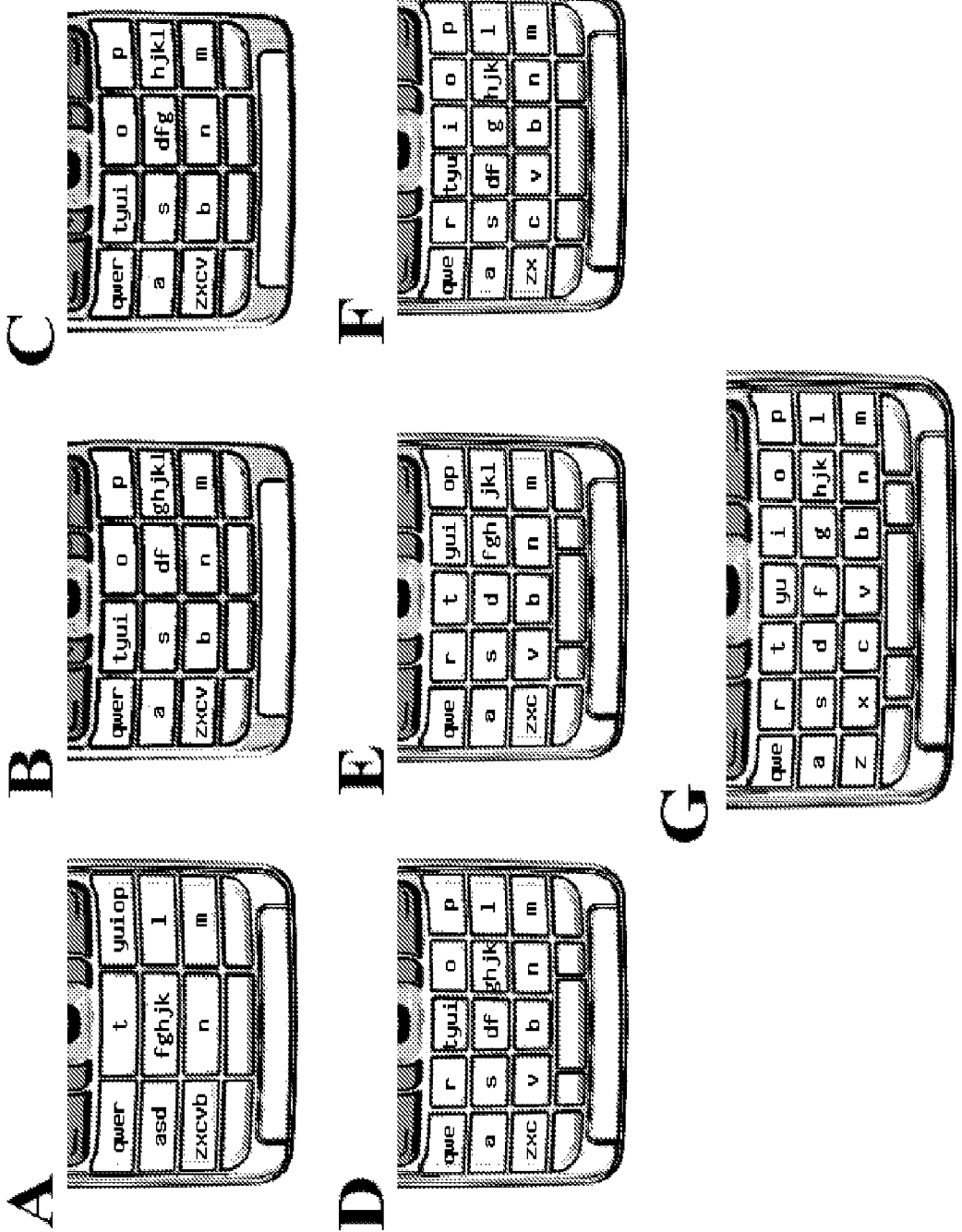
FIG. 24 Illustrative selections of qwerty-like keypads represented in FIG. 22.

For this illustrative embodiment, we will require that all 6 keys in each row are assigned letters, so that each of $n_1$, $n_2$, and $n_3$ are equal to 6. Since there are 6, 9, and 11 letters in the top, middle, and bottom rows of the standard telephone keypad for Latin, this selection of $n_i$ completes step 2002, since 6, the number of columns is less than 9 (or 11). By assigning letters a-e to the top row in order, f-o to the middle row in order, and p-z to the bottom row, in order, we complete step 2003. Even-as-possible layouts given these limitations have at most 2 letters per key. To execute step 2004, we select $L_{max}$ to be 3. The maximum number of isolated letters given these limitations is 13, the determination of which completes step 2005, which may be achieved with only 3 keys with 3 letters each, the determination of which completes step 2006. These determinations can be achieved by combinatorial methods well known to those skilled in the art of combinatorics. Upon determination, the set of layouts satisfying the limitations are output in step 2007. We will now present two illustrative examples of the results of applying the methods of FIG. 20. The first example, shown in FIG. 22, uses the parameters set as above. More particularly, the set of 6-column qwerty-like keypads in which all rows have 6 letter assigned keys is shown in FIG. 22A, plotted in the (prob$_{mt}$, Lookup error rate) plane. FIG. 22B shows the set of FIG. 22A further limited to those keypads with $L_{max}=3$. Limiting further to those keypads with 10 isolated letters, and the minimum number of keys with $L_{max}$ letters produces the results of FIG. 22C. Some examples keypads produced by this method applied to qwerty-like keyboards, for different numbers of columns, are shown in FIG. 24.

Figure 23:
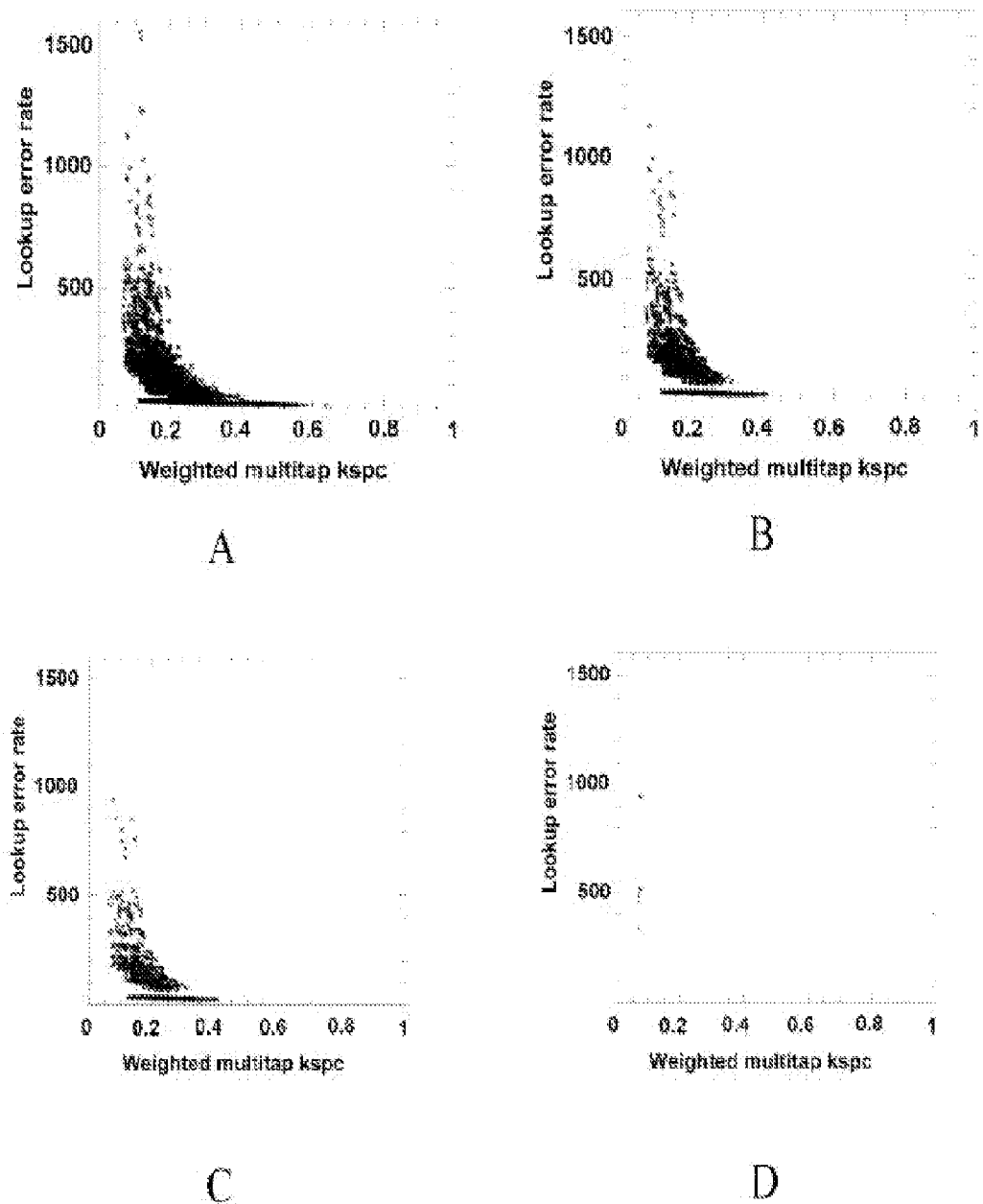
FIG. 23 Illustrative successive refinement of a set of keyboards row similar to a standard telephone keypad for Latin script.

We next consider keypads which are row similar to a telephone keypad for Latin, on six columns of letter-assigned keys, in which each of the 6 keys in each of the top, middle, and bottom row are letter-assigned, and no key has more than 6 letters assigned to it. The set of such keyboards, plotted in the Weighted multitap kspc vs. Lookup error rate plane is shown in FIG. 23A. FIG. 23B shows the subset of such keyboards which have $L_{max}=3$. FIG. 23C shows the subset of the keyboards of FIG. 23B which have 13 isolated letters, and the minimum number of keys with $L_{max}$ letters. Some examples of keypads produced by this method applied to keypads row similar to the telephone keypad for Latin, for different numbers of columns, are shown in FIG. 25.

Structural Interior Points

Alternatively, the steps can be applied in a different order, for instance, rather than first maximizing the number of isolated letters, and then minimizing the number of keys with the fixed maximum number of letters, first fix the number of keys assigned the fixed maximum number of letters, and then maximize the number of isolated letters. More generally, the various limitations can be optimized simultaneously with some weighting, so that we explore the set of layouts bounded by the extreme points in the set of structural parameters, such points to be called structural interior points. We have seen that given a fixed number of letter-assigned keys, a fixed number of letters, and a fixed maximum number of letters per key, and, possibly, a row-similarity constraint, the maximum number of isolated letters typically decreases with the number of keys which are assigned that fixed maximum number of letters. The interior points are those layouts in which the number of isolated letters is maximized while the number of keys with the maximum number of letters assigned to them is less than the largest such number consistent with the other constraints. For instance, FIGS. 54A-B are interior points in the set of layouts on 6 columns of letter-assigned keys, 6 letter-assigned keys per row, which are row similar to qwerty, when the maximum number of letters per key is 3. Under these constraints, it is possible to have up to 3 keys with 3 letters per key, as shown in FIG. 54C. Since the layouts of FIGS. 54A-B have less than 3 keys with 3 letters per key, and yet the number of isolated letters is maximized given the maximum letters per key constraint, they are interior points.

Further Selection by Typability Properties

Figure 21:
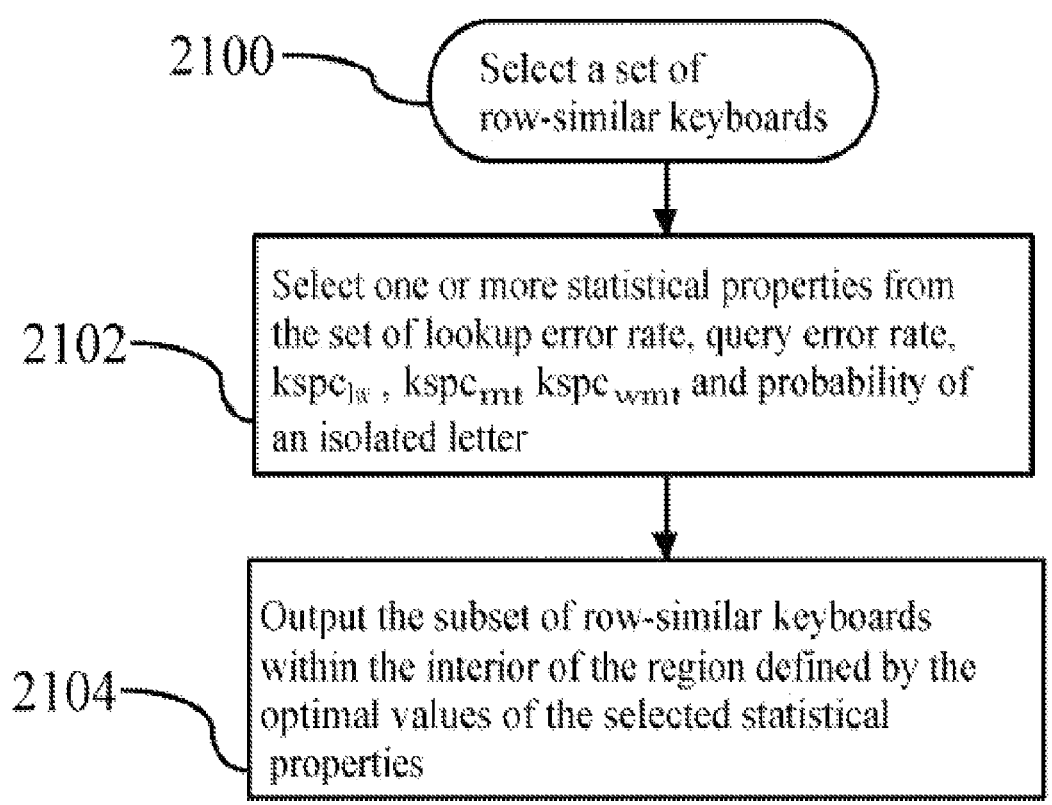
FIG. 21 Illustrative method to select row-similar keyboards optimized with respect to a statistical property.

Referring to FIG. 21, we chose one or more typability properties from the set, $LW_{mt}$ alpha$_{mt}$, prob$_{mt}$, lookup error rate, query error rate, flip rate, probability of an isolated letter or any of these combined with each other and/or further combined with word prediction and/or multiple next words prediction, though other statistical measures of ambiguity may be used as well. Where $LW_{mt}$ means the average keystrokes per character when prefix blocks are used for prediction of single letters, alpha$_{mt}$ means the keystrokes per character when multi-tap is used as a text entry method (with or without the use of an auxiliary "next" key), and prob$_{mt}$, means the same as alpha$_{mt}$ except that the letters are ordered by descending average probability. Lookup error rate and query error rate have the same meaning as given in the '317 patent which is incorporated herein by reference. Interior points defined by statistical properties can be found in the same way as interior points defined by structural properties, and structural and statistical limitations can be combined.

As an illustrative example, we select the set of qwerty-like keyboards limited by structural properties as discussed above in reference to FIG. 21. This selection completes step 2100. We now seek a subset which has desirable values of statistical properties. In particular, we seek the interior points of the set of statistical values. We may, for instance, select lookup error rate and weighted multi-tap kspc (prob$_{mt}$) as statistical measures of typability. This selection completes step 2102. Output of the set of keyboards which are both structural interior points and statistical interior points completes step 2104. As an illustrative example of the application of the method of FIG. 21, we turn to FIG. 22D, which shows the subset of keypads of FIG. 22C further limited to be interior points in the (prob$_{mt}$, Lookup error rate) plane. For a further illustrative example of the method of FIG. 21, we turn now to FIG. 23D. Within the set of keypads represented in FIG. 23C, the interior points with respect to weighted multitap kspc and Lookup error rate are those points shown in FIG. 23D. As in the case of applying these steps to qwerty-like keyboards, the combination of structural and statistical limitations leads to a specification of a small number of keyboards. It is to be appreciated that which small set will depend on the order in which the structural limitations are applied, and, to some degree, and the statistical data used to evaluate the statistical properties.

The relationship between the number of isolated letters and lookup error rates may be better appreciated by reference to FIGS. 55-57. These figures show the top 20 qwerty-like layouts on 6 columns of letter-assigned keys, where all keys in each row are assigned letters, for number of isolated letters equal 11-13 for FIGS. 55-57 respectively. In each of these figures, lookup error rate is evaluated in reference to illustrative reference data for English. The raw lookup error rates are scaled relative to the lookup rate of the standard telephone layout for Latin script. We see that, in general, higher lookup error rates can be achieved when the layouts are structural interior points. The highest values (up to 15.39 times better than the standard telephone layout) are achieved when the number of isolated letters is 12, as shown in FIG. 56. Relative to the standard telephone layout, greater than 10 times better values can be achieved with any number of isolated letters 11-13. It may be desirable to select layouts in view not only of the number of isolated letters and lookup error rate, but also of the number of isolated vowels. There are no layouts with three isolated vowels in the set of layouts described in FIG. 55, but there are several in the sets described in FIGS. 56-57, including the layout with the highest lookup error rate and 13 isolated letters shown in FIG. 57 (qwe r tyu i o p a s df g hjk l zx c v b n m), and the structural interior point in FIG. 56 (qwe r tyu i o p as df g hjk l zx c v b n m) proving that the structural interior limitation may be compatible with the 3 or more isolated vowel limitation.

Probability of an Isolated Letter

Figure 58:
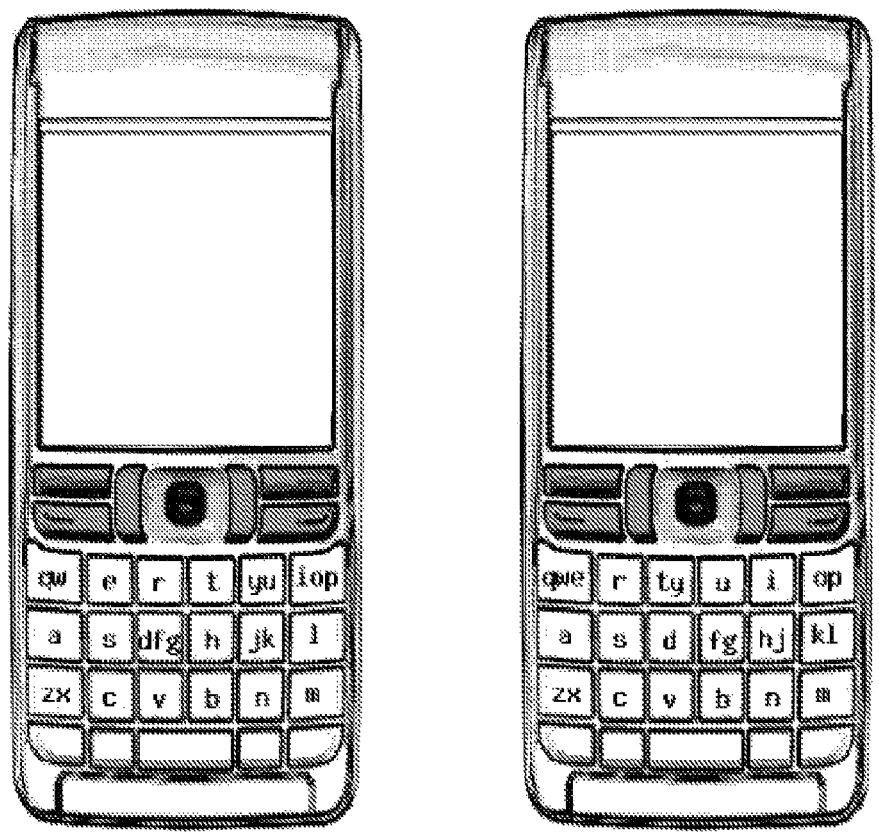
FIG. 58. Illustrative layouts which maximize the frequency of an isolated letter (A) or maximize the frequency of the first letter in a fixed order on each key (B).

In addition to selecting layouts for the number of isolated letters (given structural and/or typability constraints) on may seek layouts which maximize the probability of an isolated letter. That is, relative to a standard corpus of text, the probability of occurrence of each letter may be calculated, and the sum of those probabilities taken over all isolated letters. If, for illustration, we take a qwerty-like row-similar keyboard on 6 columns of letter-assigned keys, where each key in each of the 6 columns is assigned a letter, and no key is assigned more than 3 letters, we find that layouts with up to ⅔ probability of an isolated letter may be found. The best 20 layouts relative to this parameter are shown in FIG. 59, along with their lookup error rates scaled to the lookup error rate of the standard telephone keypad for Latin. We observe that high probability of an isolated letter is very poorly correlated with high lookup error rates, as can be seen by comparing these values with those of FIGS. 55-57. The best layout of FIG. 59 is shown assigned to a keypad in FIG. 58A.

Probability of being the First Letter in a Fixed Order

Alternatively, one may seek to optimize the probability of a letter being the first in the order, when the order of letters is fixed by their probability. That is, when a key is pressed, and there is more than one letter on the key, the one with the highest probability will be the first displayed when letters are always presented in a fixed order according to their probability. Referring to FIG. 60, we see the top 20 layouts according to this measure, where all other constraints are then taken to be the same as in the previous section. The first column of the table of FIG. 60 gives the lookup error rate, scaled to the lookup error rate of the standard telephone keypad for Latin, and the second column gives the probability of not being the first presented letter. We find that this criterion is better, but still poorly, correlated with lookup error rates than the probability of an isolated letter. The top layout from FIG. 60 is shown laid out on a keyboard in FIG. 58B.

Further Selection for Smoothness

Figure 26:
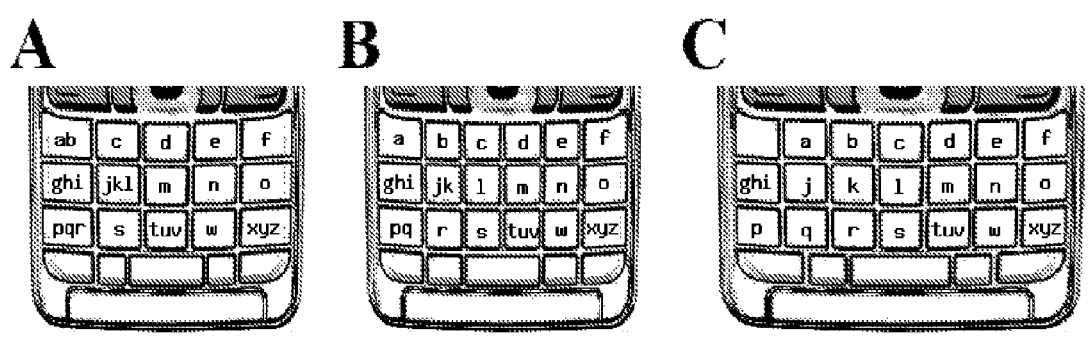
FIG. 26 Illustrative keypads row similar to a standard telephone keypad produced by methods similar to those of FIG. 20, which are also smoothly related to the standard telephone keypad for Latin.

The smoothness property can be enforced as a structural properties limitation for row-similar extensions of telephone keypad standards. It may be used as an additional surface of the hyperplane in the space of keyboards defining a set of interior points. In particular, and without limitation, it could be combined with any of the limits on maximum number of letters on a key, minimal number of keys with the maximum number of letters, and maximum isolated letters, alone or in combination, in any order or weighting. Illustrative examples are shown in FIG. 26A-C, for 5-7 columns of letter-assigned keys respectively.

Digit Assignment Smoothness

Figure 27:
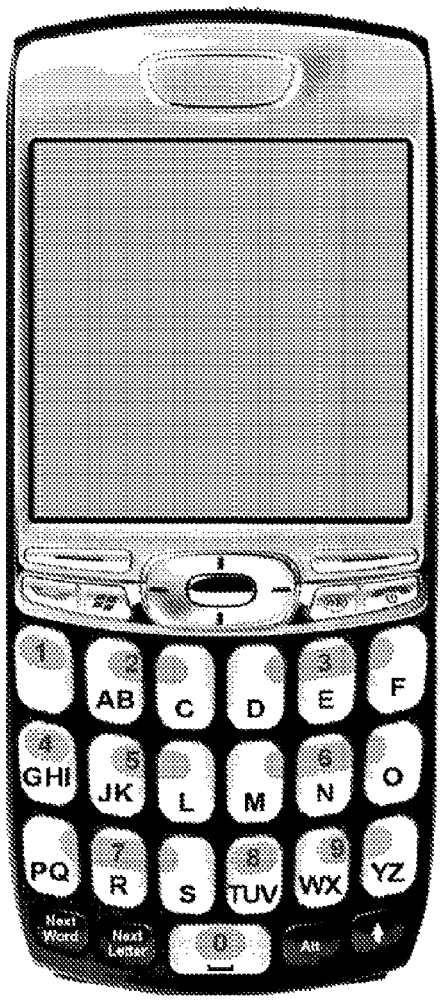
FIG. 27 Illustrative 1-800-flowers grouping using labeling to establish key grouping.

This embodiment illustrates smooth extension of digit labels on keys. Extension of digit assignment means smoothly extending digit assignments in a way parallel to letter assignment extension. The resulting extensions may be applied to row similar telephone keypads, or keypads which are row similar to typewriter keyboard standards. For example, if the standard has all of the letters abc assigned to a single key and also the digit 2, but the smooth extension splits these letter assignments to two keys, for instance, ab and c, then if both of the descendant keys are assigned the digit 2, the assignment a smooth digit assignment. The assignment of the same symbol to multiple keys is preferably signaled to the user by sensory (typically visual, but possibly tactile or auditory) signals associated with all keys which are smooth descendants of the standard keys. These sensory signals could be, e.g., distinctive colors, shapes, sounds, fonts, illumination, vibrations. An illustrative way of doing this sensory association is shown in FIG. 27, where a shape overlaps all of the keys descended from a single in the standard telephone keypad for Latin script. This association may be further emphasized by labeling the overlapping shape with a distinctive color, and/or the associated digit. The digit could also be replicated on each of the descendant keys, differently colored, the extension indicated by ellipses, and so on. Note that we have reserved one key for the digit 1 in the top row. This key has no letters assigned to it in the standard telephone keypad for Latin.

Digit Row-Similarity Via Doubling and Tripling of the Telephone Keypad

Row similarity for digits is an aspect of the teachings of the present invention which may pertain to both extended telephone keypads and reduced desktop keyboards. A given keyboard has digits row similar to a telephone keypad if digits, at least 1-9, which are assigned to a given row in a standard telephone keypad are assigned to the corresponding row in the given keyboard. A particular class of digit-row similar keypads is such that all, or all but less than 6, letter-assigned keys are also assigned a digit. Distinguished within these are those keypad in which the number of columns of letter-assigned keys is twice or three times the number of columns of letter-assigned keys in a standard telephone keypad (typically 3). For these keypads, letter-assigned keys can be uniformly grouped into "macro-keys" where the macro-keys represent a digit and follow the form of the digit layout of a standard telephone keypad, while the "micro keys" of which the macro-keys are composed are assigned letters. The macro-micro distinction has already been seen in the embodiment of FIG. 27. By further limiting the micro-micro split to predominantly uniform splits, in which most macro keys contains the same number of micro keys, a surprising flexibility in keypad design emerges, sufficient to encompass novel designs which emulate standard telephone keypads on the macro level, and may provide for enhanced typability on the micro level via judicious choice of letter assignments. Illustrative, non-limiting, examples embodying these novel mechanisms will now be discussed in detail.

Uniform Micro/Macro in a Qwerty-Like Layout

Figure 28:
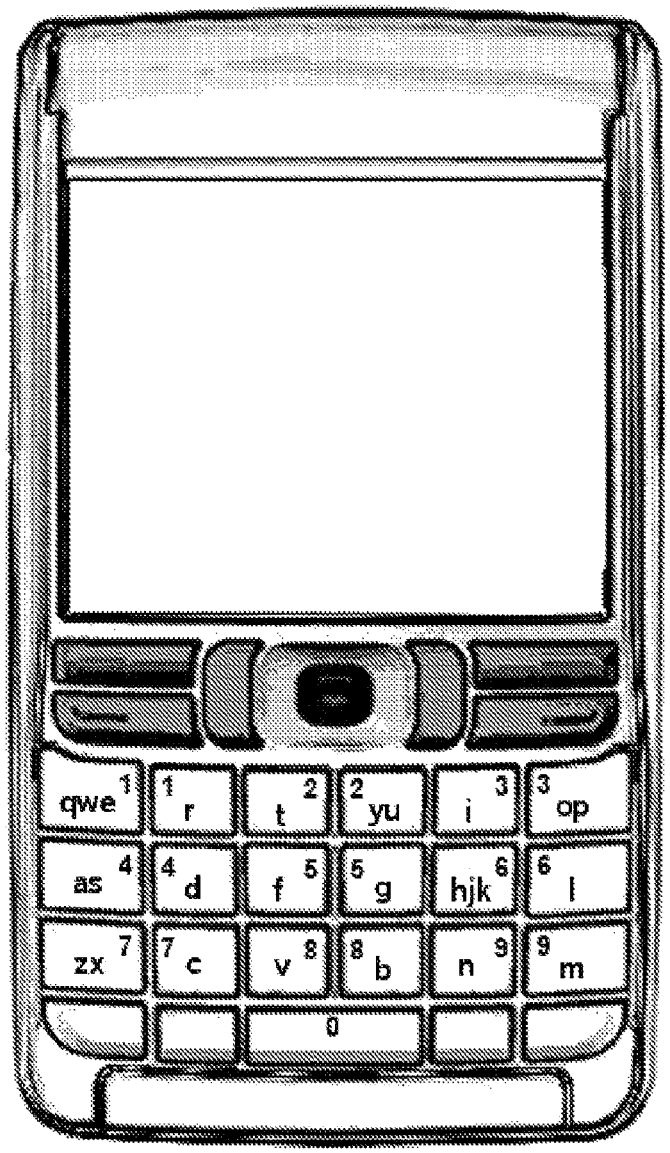
FIG. 28 Illustrative telephone digit assignment and typewriter letter assignment, exhibiting a uniform micro/macro distinction in a qwerty-like layout.

An illustrative, non-limiting example of a substantially uniform macro/micro keyboard in which almost all letter assigned keys are also assigned a digit is described in reference to FIG. 28. FIG. 28 shows a 6-column keypad which has a reduced qwerty-like letter layout in a micro/macro layout. In this example, the micro/macro distinction is marked by digit labels, the digits 1-9 each assigned to 2 keys. For instance, the key labeled qwe is also labeled with the digit 1, as is the key assigned the letter r. Each of the other digits 2-9 is also assigned to two keys. The digit 0 is assigned to a single key, which key may be thought of as both micro and macro. In this embodiment, when any of the letter-assigned keys are pressed in digit mode, a digit is entered. In an alternate embodiment, only one of the two keys might be set to enter a digit (say the left or the right member of a pair).

Enhancement of the Macro-Micro Distinction; Chimeric Keypads

Figure 29:
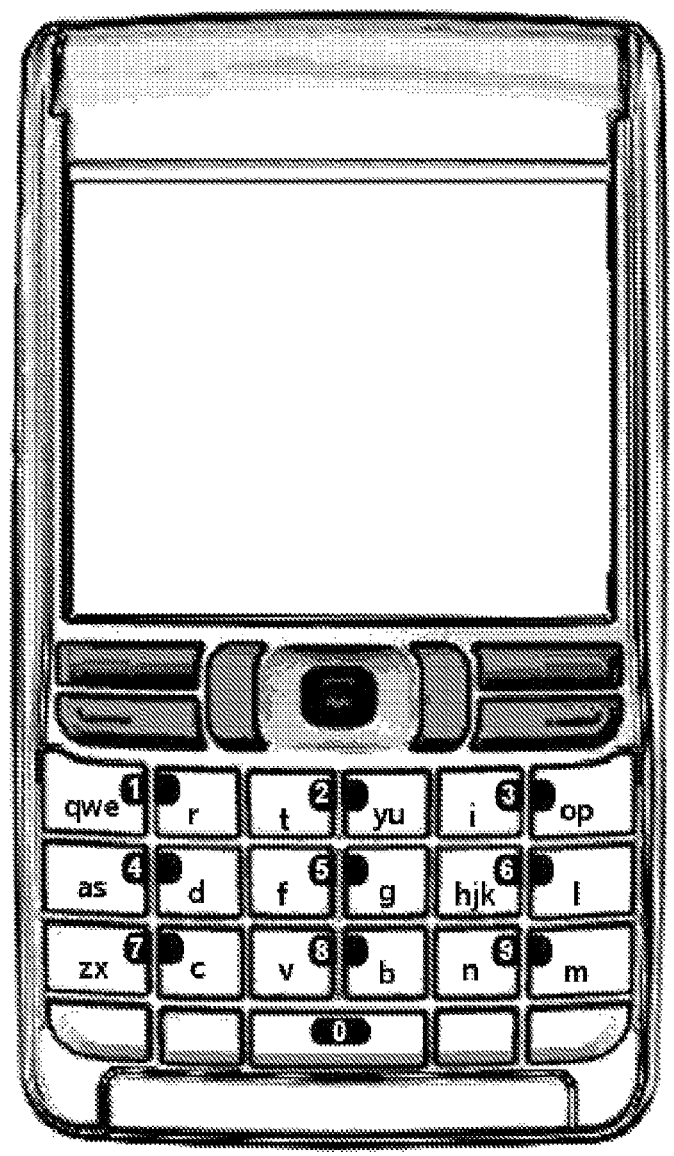
FIG. 29. Illustrative telephone digit assignment and typewriter letter assignment in a chimeric keyboard.

Referring now to FIG. 29, we see an additional illustration of how the macro/micro distinction can be visually and/or tactilely enhanced to improve ease-of-use. Here, micro-keys which are part of the same macro key are visually linked by means of a color bar which spans the related micro keys. The effect is to create a chimeric keypad which viewed in one way is a standard telephone keypad, and viewed in another, a reduced desktop keyboard. The chimeric effect may be further enhanced by other visual and/or tactile stimuli which help link micro-keys into a macro key, while allowing each micro-key to function separately to input symbols. An illustrative, non-limiting example of a tactile stimulus would angle the surfaces of the micro keys downwards at borders interior to a macro-key (for instance, at the border between the key inputting the letters qwe and the key inputting r in FIG. 29) and upwards at borders between macro-keys (for instance, at the border between the key inputting r and the key inputting t in FIG. 29). A similar enhancement could be achieved by means of ridges, colors, vibrations, or other technical means known to those skilled in the art of industrial design.

Backward Compatibility Mode

A chimeric keypad might also be configured in a full backward compatibility mode. In the backward compatibility mode, the digit-assigned keys may function to enter letters as they do in the standard telephone keypad. For example, in backward compatibility mode, any of the keys labeled "2" in FIG. 29 might input any of the letters a, b, or c, just as the key labeled 2 may input a, b, or c in the standard telephone keypad layout for Latin. Alternatively, fuller backward compatibility could be obtained as shown in the illustrative embodiment of FIG. 41. Here the macro keys are recombined to form a 3-column keyboard, which in backward compatibility mode behaves in the same way as a standard telephone keypad, and in qwerty mode, inputs letters according to the alternate qwerty layout. Note that this embodiment is not limited to a standard telephone keypad for Latin, or to the qwerty desktop standard. Any combination of a telephone keypad standard with a desktop standard could be used.

Rocker Keys Implementing the Macro/Micro Distinction

Figure 30:
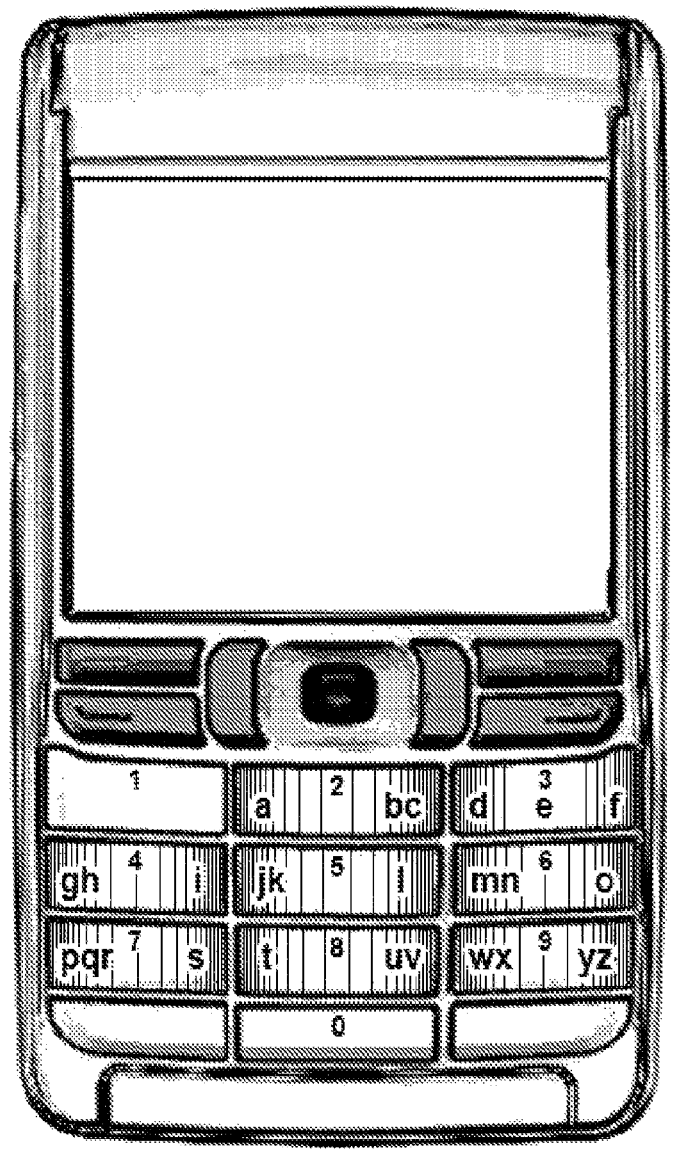
FIG. 30 Illustrative rocker-key embodiment with letters on two or three directions of rocking.

The use of rocker keys is another method to obtain a macro/micro distinction combinable with other features and aspects herein disclosed. In the illustrative, non-limiting embodiment of FIG. 30, rocker keys are employed to provide a keypad which is backward compatible with the telephone keypad for Latin, but which has improved typability as compared with the standard telephone keypad for Latin. In this embodiment, the macro-keys are rocker keys, and emulate the standard telephone keypad. When, for instance, the key labeled 2 is rocked to the left, it input the letter a. When rocked to the right, it inputs the letters b or c. When pressed straight downward, and/or in digit mode, depending on the implementation, it inputs the digit 2. Similarly, the key 3 inputs the letter d when rocked to the left, the letter f when rocked to the right, and 3 or e when pressed straight down. If the keypad is implemented with a digit/letter mode distinction, then a straight press would input 3 in digit mode, and the letter e in letter mode. Note that this is an ambiguous keyboard since some keys, rocked in certain directions, may input more than one letter. The ambiguity could be resolved, depending on implementation, by disambiguation software or mechanical disambiguation such as multi-tap or an auxiliary "Next Letter" key. Note that this embodiment is illustrated with a particular, but non-limiting, assignment of letters to keys. This assignment is but one of many in which letters assigned to a given key on a standard telephone keypad are all assigned to the same macro-key, and are distributed over the micro keys so as to maintain the order and row of the standard telephone keypad to which the improved keypad is related. Any such assignment may be implemented with rocker keys are illustrated by this embodiment.

Pseudo-Rocker Keys

Any keyboard which can be implemented using rocker keys can also be implemented using pseudo rocker keys. Typically a rocker key has a mechanism to detect if the key has been rocked in a given direction, and to send electrical signals accordingly. A rocker key may also exhibit a raising relative to the surface of the key of the side of the key in the direction to which it will be rocked, making it easier to rock in that direction. These aspects may be decoupled from each other. In particular, by separating the various directions to which a key could be rocked into distinct (non-rocking) keys, and yet contouring the various keys representing the various directions as if they were to be rocked. These pseudo-rocker keys give a firm tactile impression which is an aid to the user in activating the various keys, but does not require a rocking mechanism.

Figure 31:
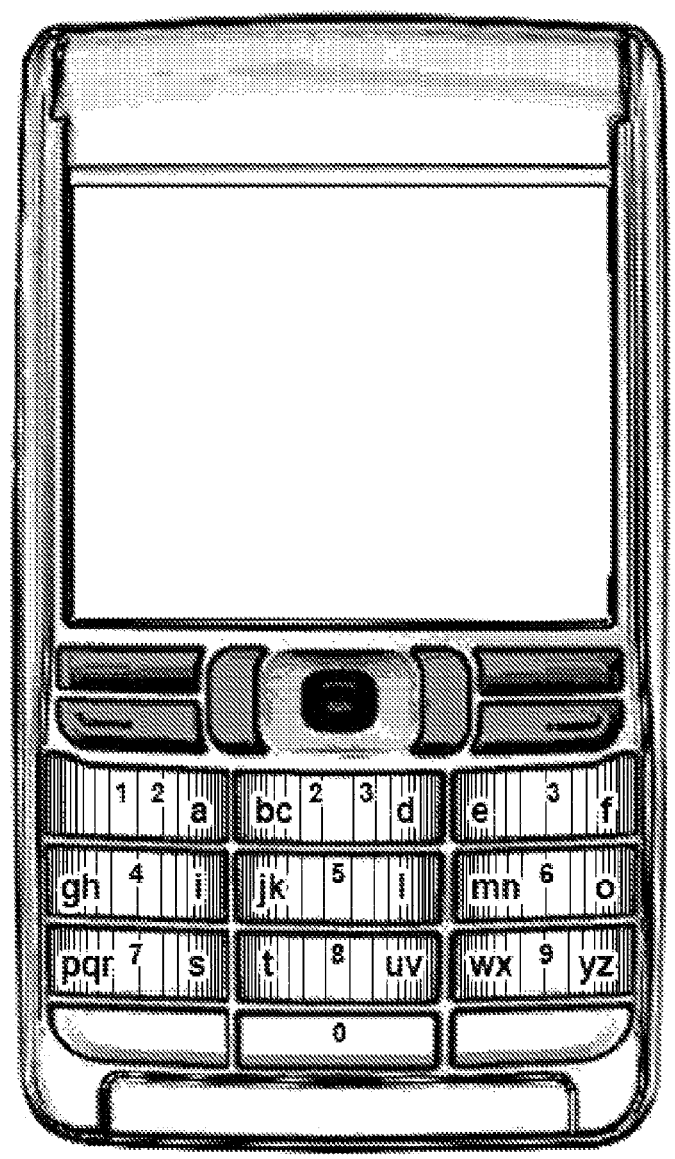
FIG. 31 Illustrative rocker-key embodiment with letters on two directions of rocking.

An alternate method to associate micro-keys to macro keys is shown in FIG. 31. Here, digits may be assigned to more than one macro-key, so that macro-keys as defined by digit assignment may be different than the macro-keys defined by the keyboard mechanics or visual design. Here, the keyboard mechanics of rocker keys group the micro keys 2 by 2, but the digit assignments do not completely respect this grouping. For example, the digit 2 appears more than one macro-key. Making the association of macro-keys as defined by keyboard mechanics different from the macro-keys defined by digit assignment has numerous unexpected advantages. For instance, the assignment illustrated preserves the association of digits to letters in the standard telephone keypad, solving the "1-800-flowers" problem, namely, the problem of entering mnemonic telephone numbers when letter and/or digit assignments differ from the standard on which the mnemonic is based. This desirable property is obtained, even within the limitation of three columns of rocker keys, which limitation allows the keypad to chimerically appear as a telephone keypad as regards the number and layout of macro-keys.

Figure 32:
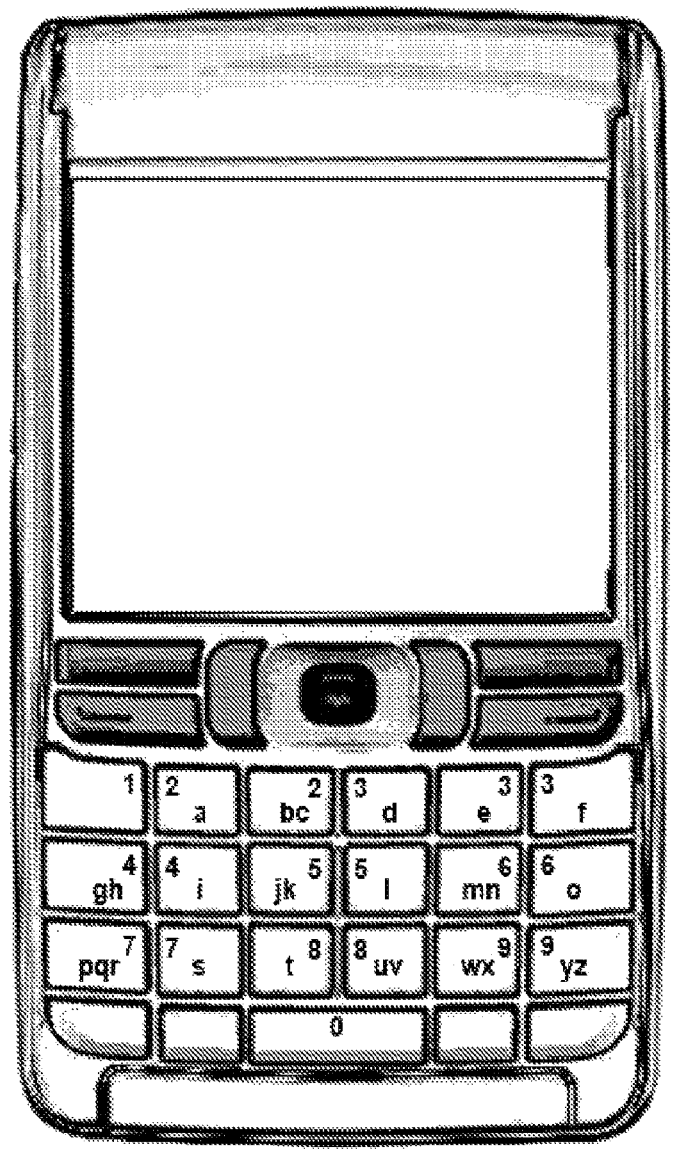
FIG. 32 Illustrative 1-800-flowers solution.

Note that the solution of the 1-800-flowers problem just described may be implemented without the limitation of rocker keys or, indeed, any mechanical means to pair micro-keys into macro-keys. An example is shown in FIG. 32, in which the same layout of both digits and letters to micro-keys as used in FIG. 31 is shown, on 6 columns of non-rocking, but potentially pseudo-rocking keys.

Vowel Isolation

Figure 33:
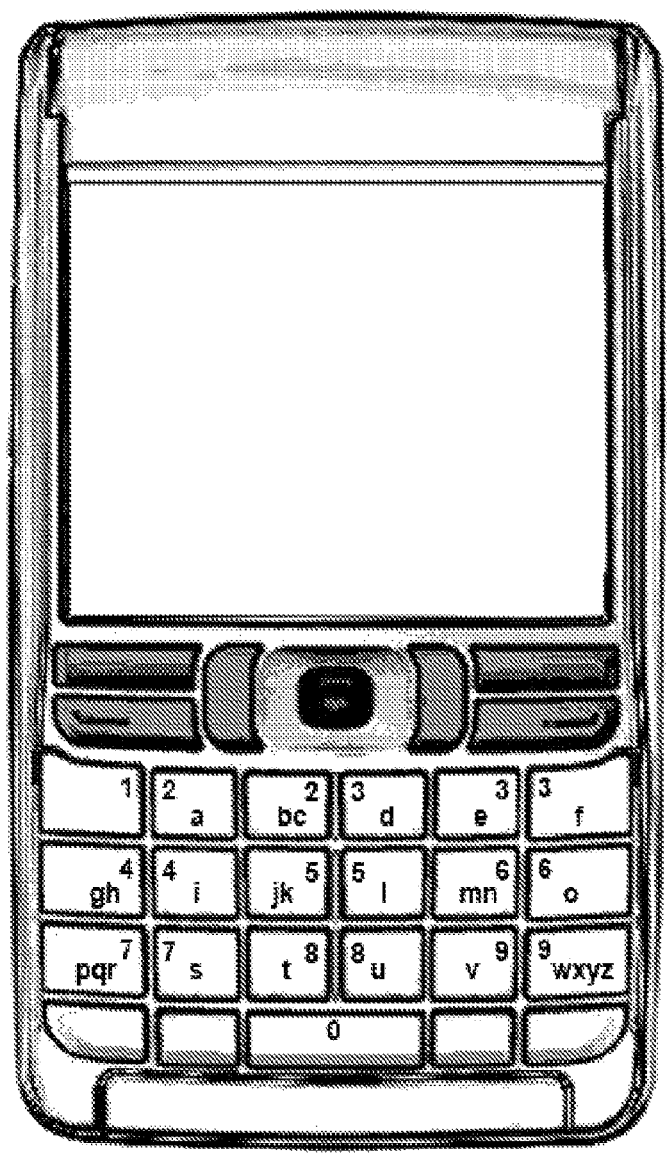
FIG. 33 Illustrative keypad with isolated vowels.
Figure 34:
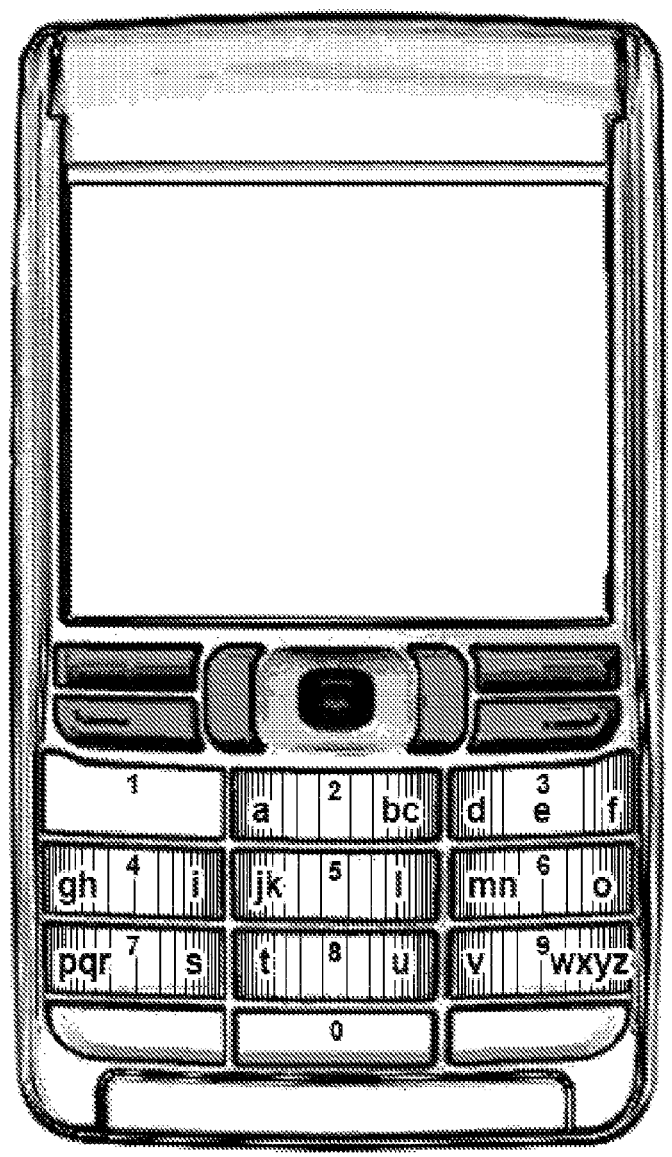
FIG. 34 Illustrative keypad with rocker keys and isolated vowels.

This embodiment illustrates the isolation of vowels each on its own micro-key. A non-limiting example of how this may be achieved while respecting the limitation of row similarity to a telephone keypad is shown in FIG. 33. For illustrative purposes and to aid comparison with other embodiments discussed above, this embodiment is again developed for a 6-column keypad row similar to the standard telephone keypad for Latin script, though the approach may be taken with keypads of any number of columns of letter-assigned keys, with letters from any script which contains vowels. Note that each of the vowels, a, e, i, o, and u are isolated on a micro-key. Macro keys are here shown indicated by labeling each micro key in a macro key with the same digit, though other methods, as described elsewhere in this disclosure, could be used as well. For example, a rocker-key implementation with isolated vowels is shown in FIG. 34. To map the isolated-vowel implementation while obeying the limitation of a telephone-keypad-like layout of rocker keys, it is sufficient that at least one of the rocker keys (labeled d,e,f) is a three-way rocker key, so that the letter e may be obtained by pressing the key labeled d,e,f downwards. The other keys could be two-way or three-way, depending on implementation. Note that, as labeled, the 1-800-flowers limitation is obeyed except for the letter v. The limitation could be strictly obeyed by making macro key labeled v, wxyz encode 8 when rocked to the left and 9 when rocked to the right, preferably labeling the keypad correspondingly.

Figure 35:
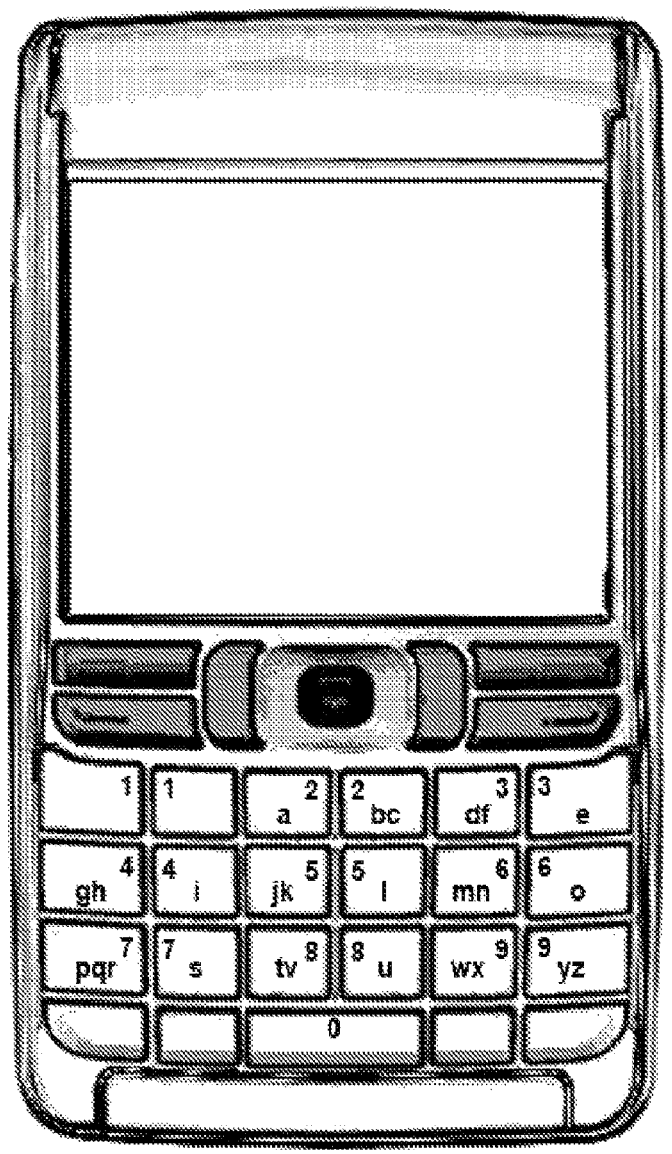
FIG. 35 Illustrative keypad with two (letter) micro keys per macro key and isolated vowels.
Figure 36:
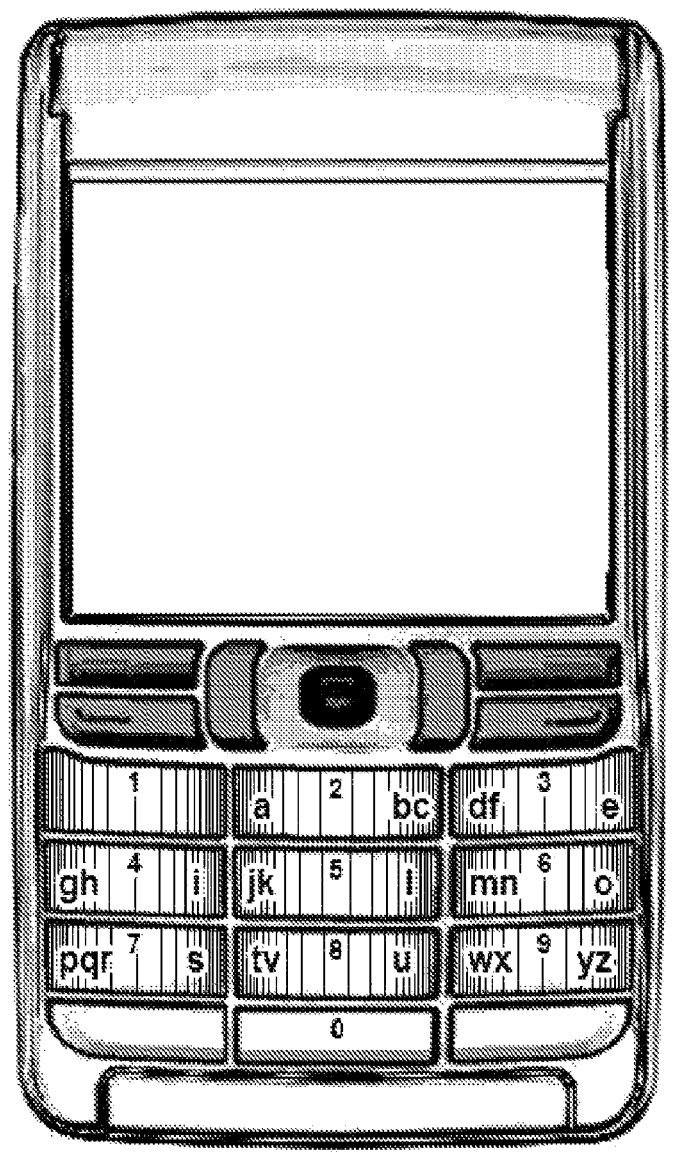
FIG. 36 Illustrative rocker-key embodiment of a 1-800-flowers solution with two (letter) micro keys per macro key and isolated vowels.

Isolation of vowels is compatible with strict bipartite splitting of macro keys into micro keys, perhaps with a perturbation of standard letter ordering. An example layout is shown in FIG. 35. The same layout implemented with rocker keys is shown in FIG. 36.

Standard Keypad Column Tripling

Figure 37:
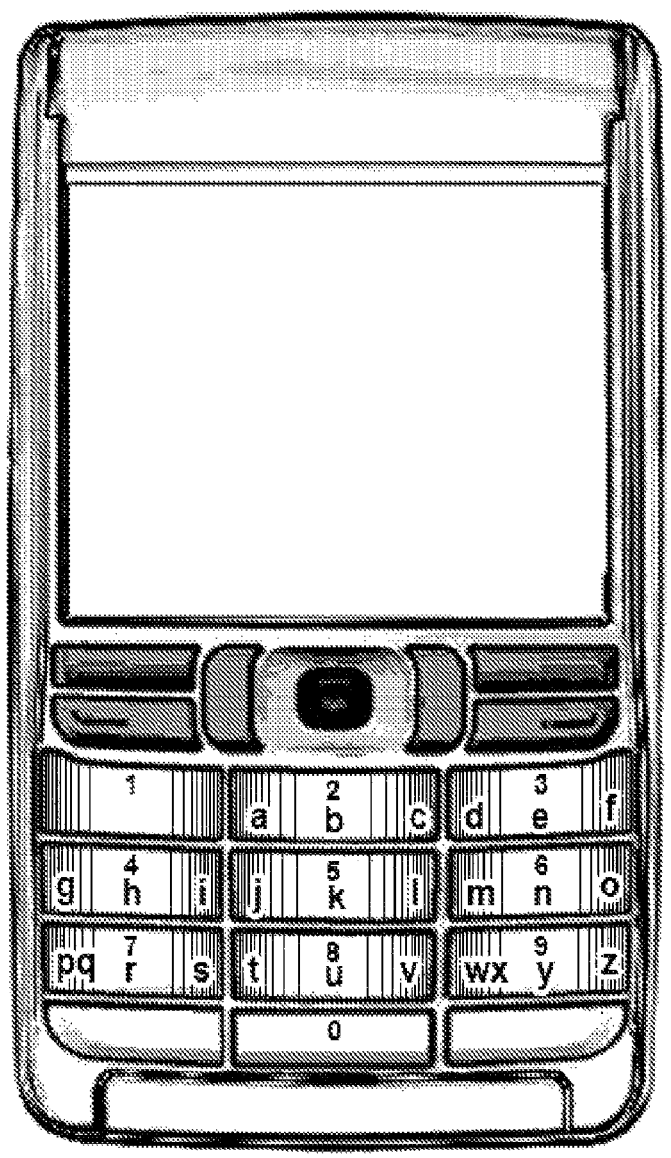
FIG. 37 Illustrative rocker-key embodiment of a 1-800-flowers solution with three (letter) micro keys per macro key.
Figure 38:
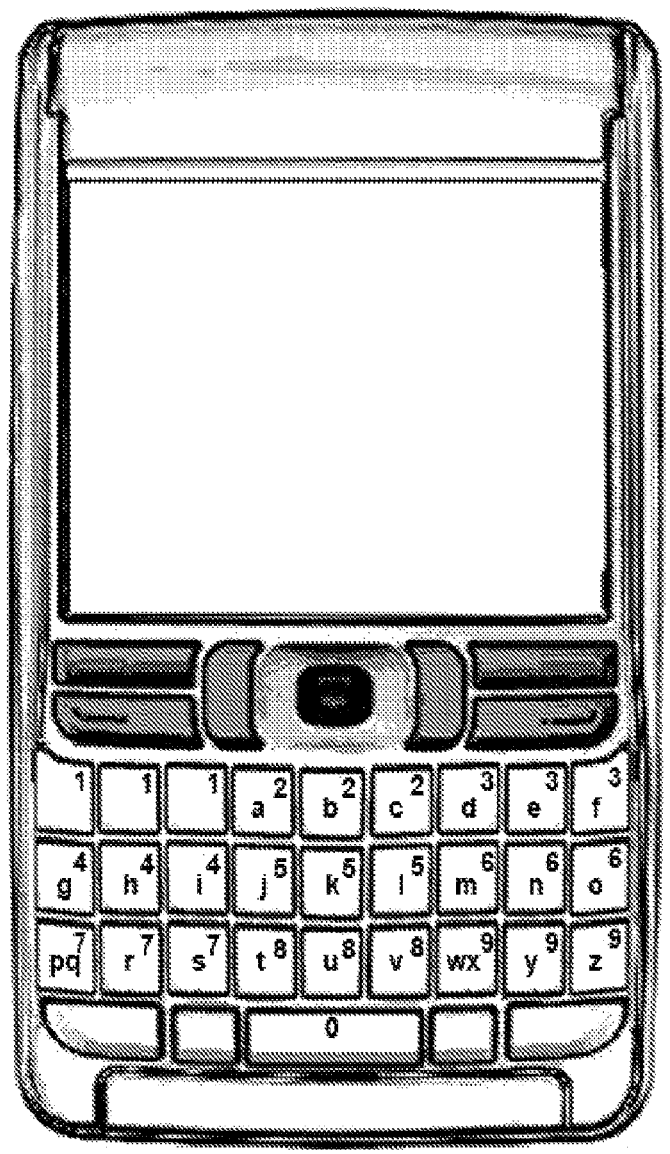
FIG. 38 Illustrative 1-800-flowers solution with 3 (letter) micro keys per macro key.

The methods and illustrative machines described herein with respect to column doubling may also be applied to make keypads by column tripling. An illustrative, non-limiting example is shown in FIG. 37, where a row-similar to a standard telephone keypad for Latin, 9-columns of letter-assigned keys keypad is shown. In FIG. 37 3-way rocker keys are used for illustration. A related design on non-rocker keys is shown in FIG. 38. These keypads have very low ambiguity, and yet are a) chimeric with respect to the standard telephone keypad, both with respect to digits and letters, and b) solutions to the 1-800-flowers problem. They admit a complete backwards compatibility mode in which the keypad is configured such that a keystroke on a macro key (or any or several of the micro-keys of which the macro key is comprised) inputs digits and/or letters in the same way as the standard telephone keypad on which it is based. Other methods and designs illustrated in other embodiments discussed herein in reference to column doubling may also be used in the context of column tripling. For example, the method of intercalated digits could be implemented by a digit key (or digit label) separated from the letter-assigned micro keys in the same macro key.

Intercalated Digit Layouts

Figure 39:
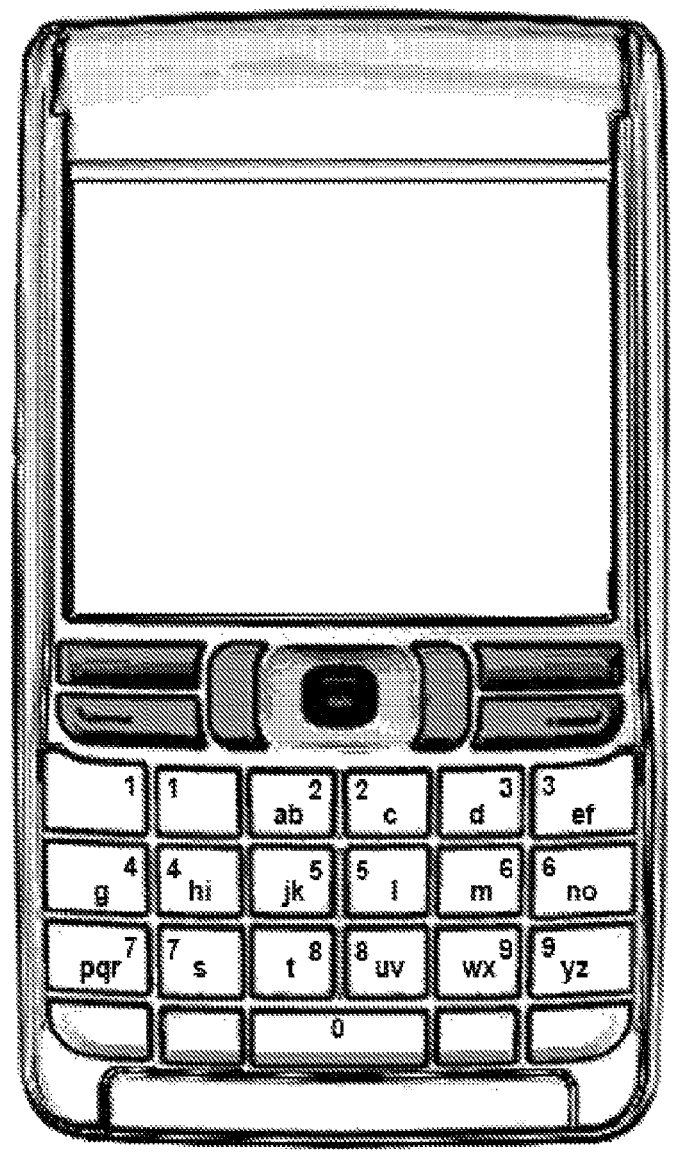
FIG. 39 Illustrative 1-800-flowers solution with two (letter) micro keys per macro key.
Figure 40:
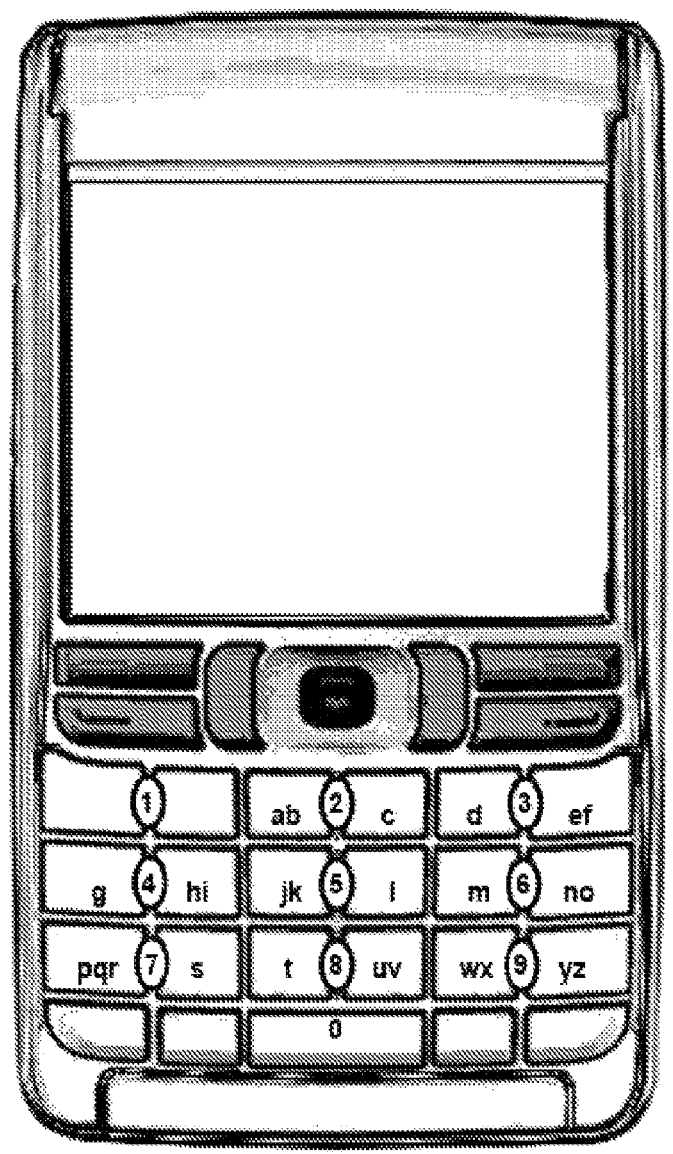
FIG. 40 Illustrative 1-800-flowers solution with two (letter) micro keys per macro key.

An intercalated digit layout is one in which a digit key or digit label is inserted substantially between a pair of keys, generally a pair of letter-assigned keys. In a special case, each key in the pair of keys is assigned a subset of base letters assigned to the same given key in a telephone keypad standard. In a still more particular case, the union of the set of base letters assigned to the pair is equal to the set of base letters assigned to the same given key in a telephone keypad standard. Intercalated digits should be contrasted with digit assignments to both of a pair of keys in which that assignment is repeatedly labeled on each key, as shown in FIG. 39. An illustrative intercalated example is shown in FIG. 40. Here, the digits layout of the standard telephone keypad for Latin is combined with a row-similar to the standard telephone keypad for Latin letter layout, on 6 columns of letter-assigned keys, but with the digit indication between the pair of keys to which it relates.

The intercalated digits could be implemented in a number of different ways. For example, the digit keys could be raised relative to the other keys. This would provide the advantage of tactile unification of the macro-key consisting of the digit key and its adjacent keys, and would enhance the standard keypad aspect of the chimera. Alternatively, the digit key could be recessed relative to the adjacent keys. In another alternative, the digit key could be absent entirely, except as an intercalated label on neither or both of the adjacent keys. In this case, a digit could be input by a) pressing either of the adjacent keys in digit mode, b) pressing both of the adjacent letter keys substantially simultaneously, c) pressing both of the adjacent keys in digit mode, d) some other method. The digit could also be associated with a key press on but one of the adjacent keys.

Figure 42:
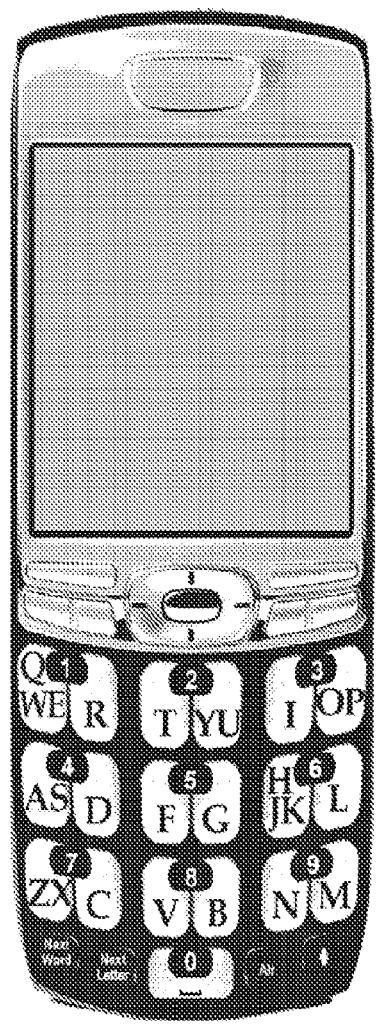
FIG. 42 Illustrative 6-column qwerty-like layout with digit backward compatibility with a telephone keypad.
Figure 43:
FIG. 43 Illustrative 6-column qwerty-like layout with full backward compatibility with a telephone keypad.
Figure 44:
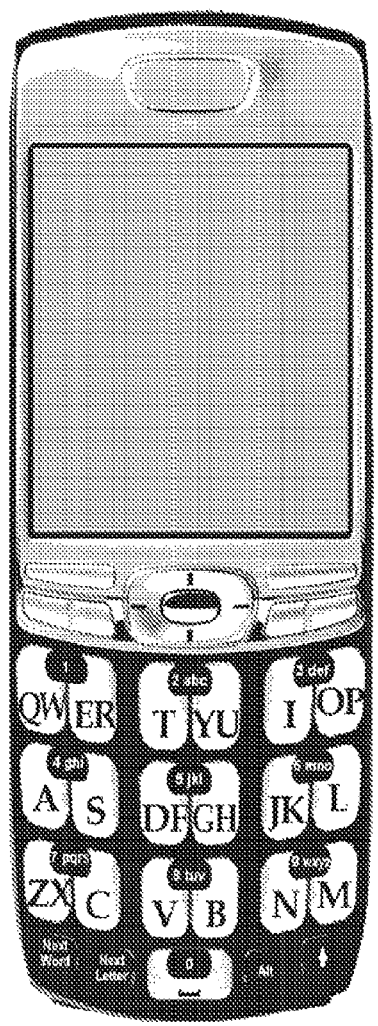
FIG. 44 Illustrative 6-column qwerty-like layout with full backward compatibility with a telephone keypad, and no more than two letters per micro key.

The method and apparatus of intercalated digits is not limited to the standard telephone keypad for Latin, and the letter layout need not be row similar to a telephone keypad, but could, e.g. be a row-similar compression of a desktop keyboard standard as shown in FIGS. 42 to 44. These figures show a keypad labeled with an intercalated digit layout of a standard telephone keypad for Latin, and a row-similar compression of a qwerty keyboard. In FIGS. 43 and 44, the digits of the telephone keypad are supplemented with the letters of the telephone keypad for Latin. Thus, the keypads of FIG. 43-44 could support a full backward compatibility mode based on the macro keys, and text entry using either the telephone standard keyboard or the row-similar compression of the desktop standard keyboard. Any of these three aspects could be visually and/or tactilely enhanced by selection of visual aspects such as placement, color, and font faces, shapes of the macro and micro keys (more telephone keypad like or more desktop keyboard like), and colors and shapes of the material in which the keypad is embedded. If any of the keypads disclosed herein were implemented in a touch screen device, the various aspects could be shown in isolation, according to a mode switch. Similarly, a device in which the labeling of the keys is electronically switchable (using for example illuminated filters or LEDs) could support all of these layouts simultaneously and yet in a visually distinct way.

It should also be noted that punctuation symbols and function symbols might share any or all of the letter and/or number assigned keys, depending on implementation.

Chimeric Standard and Extension, Optimized for Typability

Figure 48:
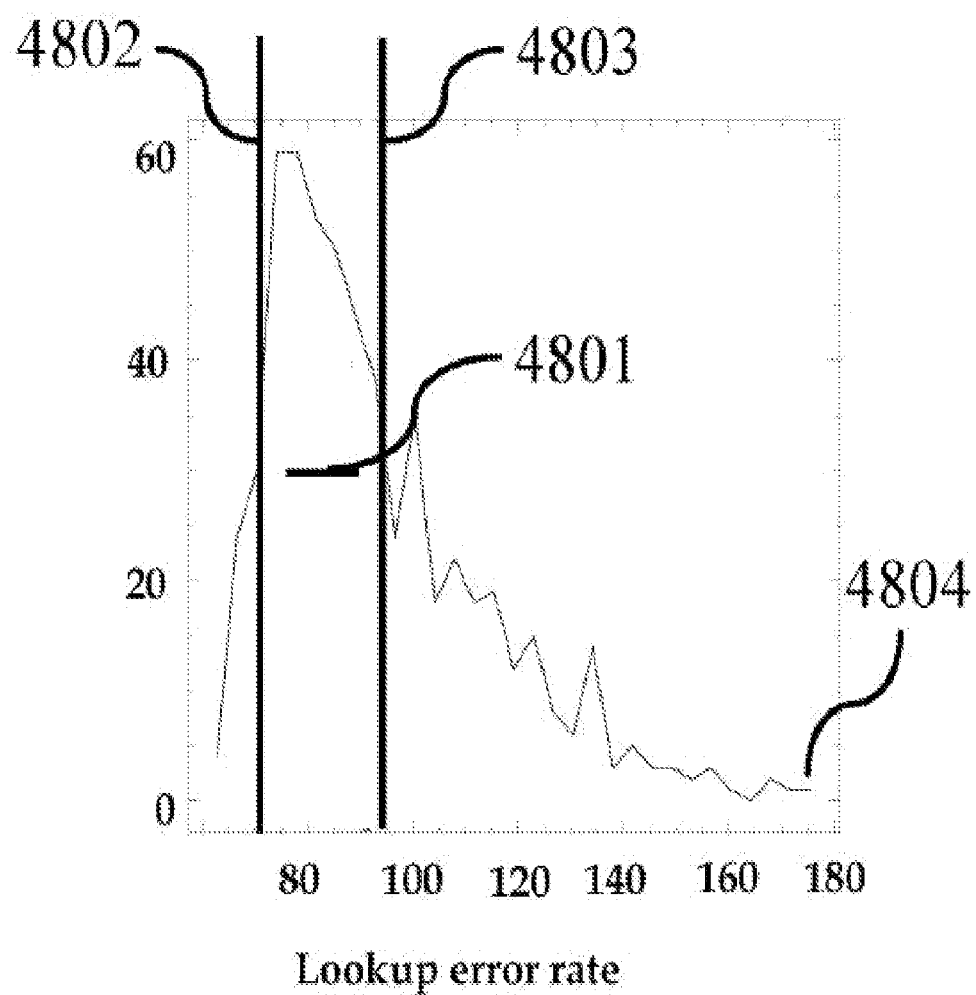
FIG. 48 Illustrative distribution of lookup error rates in a set of keypads.
Figure 49:
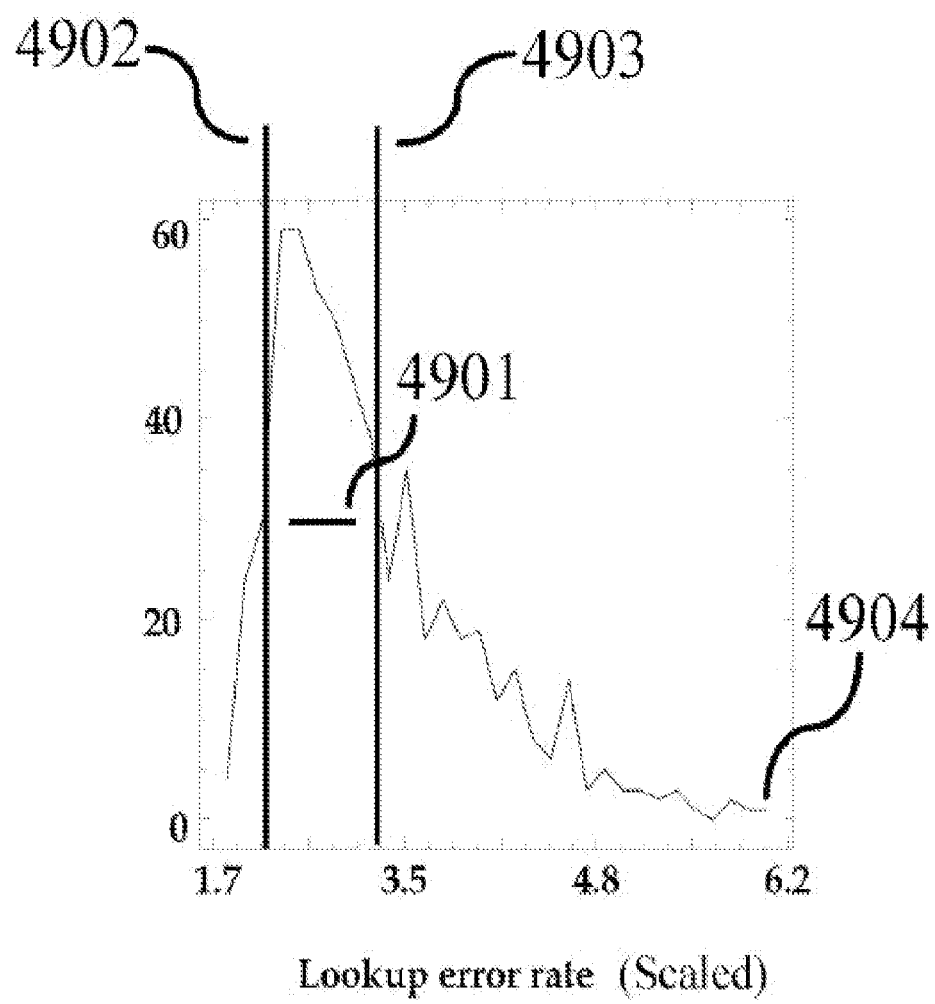
FIG. 49 Illustrative distribution of lookup error rates in a set of keypads, normalized according to the standard telephone keypad for Latin script.

The present embodiment provides a non-limiting illustration of a chimera between a telephone keypad and a row-similar extension of a telephone keypad or a row-similar compression of a standard typewriter keyboard, in which the standard telephone keypad aspect is enhanced by 1) a physical layout of macro-keys which is the same as the standard telephone keypad, 2) labeling the macro-keys with digits according to the plan of the standard telephone keypad, and optionally, 3) a labeling of macro-keys with letters which is the same as the standard telephone keypad. Optionally, and for the sake of illustration, in the case of a row-similar extension of a telephone keypad, the extended, row-similar aspect of the chimera is selected for improved typability. For illustration, lookup error is chosen as a measure of typability. In general, other quantitative measures could be used, alone or in combination. A threshold of improvement applicable to the present case is as follows: given a representative corpus of a language and a quantitative measure of typability, a layout is improved if has a better value of the property, as measured with respect to the corpus, which better value is unlikely to have been produced by chance by drawing at random from the population of layouts which obey pre-determined structural limitations. In the present case, the pre-determined structural limitations are row similarity to the standard telephone keypad for Latin, a partition such that letters assigned to the standard keypad are broken into two groups, and alphabetic order. There are 9*2^6=576 layouts matching this description. On a corpus of newspaper data in English, the distribution of lookup error values for this set of rules is shown in FIG. 48. As an illustrative threshold for "unlikely to have been produced by chance by drawing at random from the population," we consider that any layout with a value of lookup error rate more distant from the peak of the distribution than ½ the width of the peak at ½ height ("HWHH"). The half height (4801) is shown in FIG. 48, as are the bounds (4802 and 4803) of the region within the HWHH of the peak. The layout used in FIGS. 39 and 40 is pointed out as element contributing to the final bin in the distribution (4804). This layout is not only unlikely to be produced by chance, but is within the set of substantially optimal layouts given these data and the specified structural limitations. Recasting the data of FIG. 48 in units of the lookup error rate of the standard telephone keypad, as shown in FIG. 49, we see that the peak value of the distribution is about 2.75 on this scale. This is the improvement over the standard telephone keypad layout for Latin that can be expected by chance given the limitations of a uniform bipartite split of the letter assignments of the standard telephone keypad, given these linguistic data. The further improvement (about 6 times better than the standard telephone keypad) realized in the layout of FIGS. 39 and 40 [4904] is due to selection within the set, as taught in one aspect of this invention. This point is well beyond the half width (area between [4902] and [4903]) at half height [4901]. It is to be noted that lookup error rate is but one of many quantitative measures of typability to which these methods could be applied, within the scope of this disclosure. Furthermore, aspects of this illustrative embodiment may be combined with aspects of other embodiments and remain within the scope of the appended claims. Each embodiment is intended to illuminate this scope with variously placed and aimed lights, to particularly point out and describe various features. The full scope can only be judged from the appended claims. In particular, features of letter layouts described herein may be combined with features of digit layouts described herein and others. An example alternative for digit layout embodiment is described in the next section.

Splitting and Folding Designs Based on Column Multiplication

Figure 50:
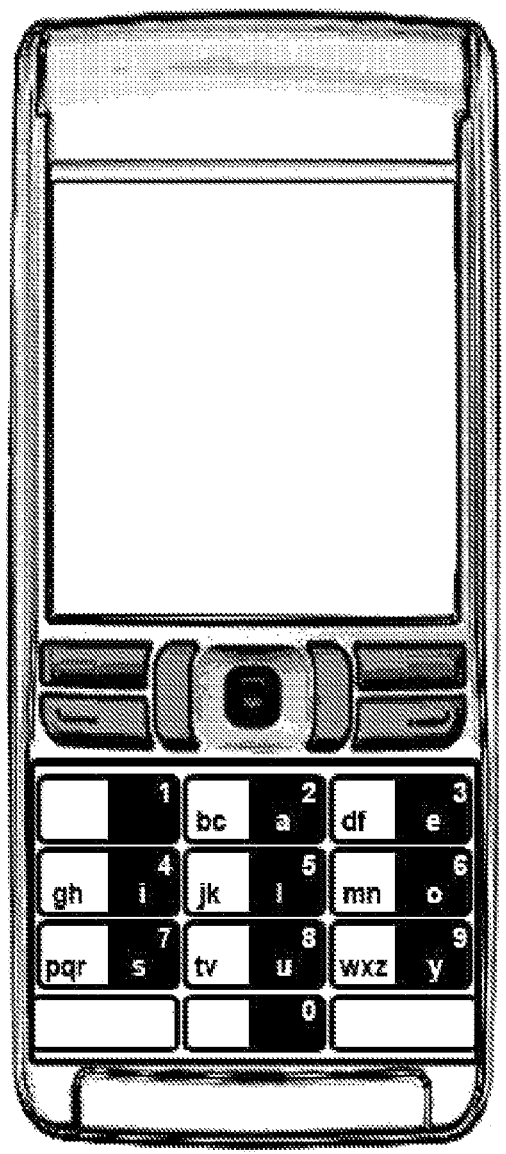
FIG. 50 Illustrative foldable/slidable design in closed position.

The following embodiments illustrate further surprising and novel aspects of the column multiplication aspects of the present invention. Namely, the ability of column multiplication to support a variety of mechanical means to physically transform a keypad based on one multiple into a keypad based on another multiple. The row-similar aspect and the column multiplication aspect combine to permit chimeric keypads which are equivalent to a standard telephone keypad in one configuration (though possibly with a variance from strict alphabetic ordering of the letter labels on the keys), and yet are expanded to a column multiplied version in another configuration. An illustrative, non-limiting example is shown in FIG. 50. In the configuration shown, FIG. 50 is a standard telephone keypad for Latin, in the sense that each of the keys is assigned the same set of letters and digits as in the standard. However, unlike the standard, the keypad admits an alternate configuration, which is a column-doubled configuration. For convenience, the availability of an alternate configuration is indicated by a visual signal. Here, for illustration, the signal comprises labeling the left half of each key with a different color than the right half. Other visual signals could be used. In FIG. 50, the digits are associated with the right half of the keys, but it could be otherwise within the scope of this embodiment. As further illustration of this scope, the labels for the base letters assigned to each key are not necessarily in alphabetic order. Here, for illustrative example, the labels are ordered so that a vowel assigned to the key, if any, is isolated on the right side of the key. With a predictive text system, this keypad would operate in the same way as the standard telephone keypad with a predictive text system, as the predictive text system typically chooses the order in which letters appear, independently of the order of the labels on the key.

Figure 51:
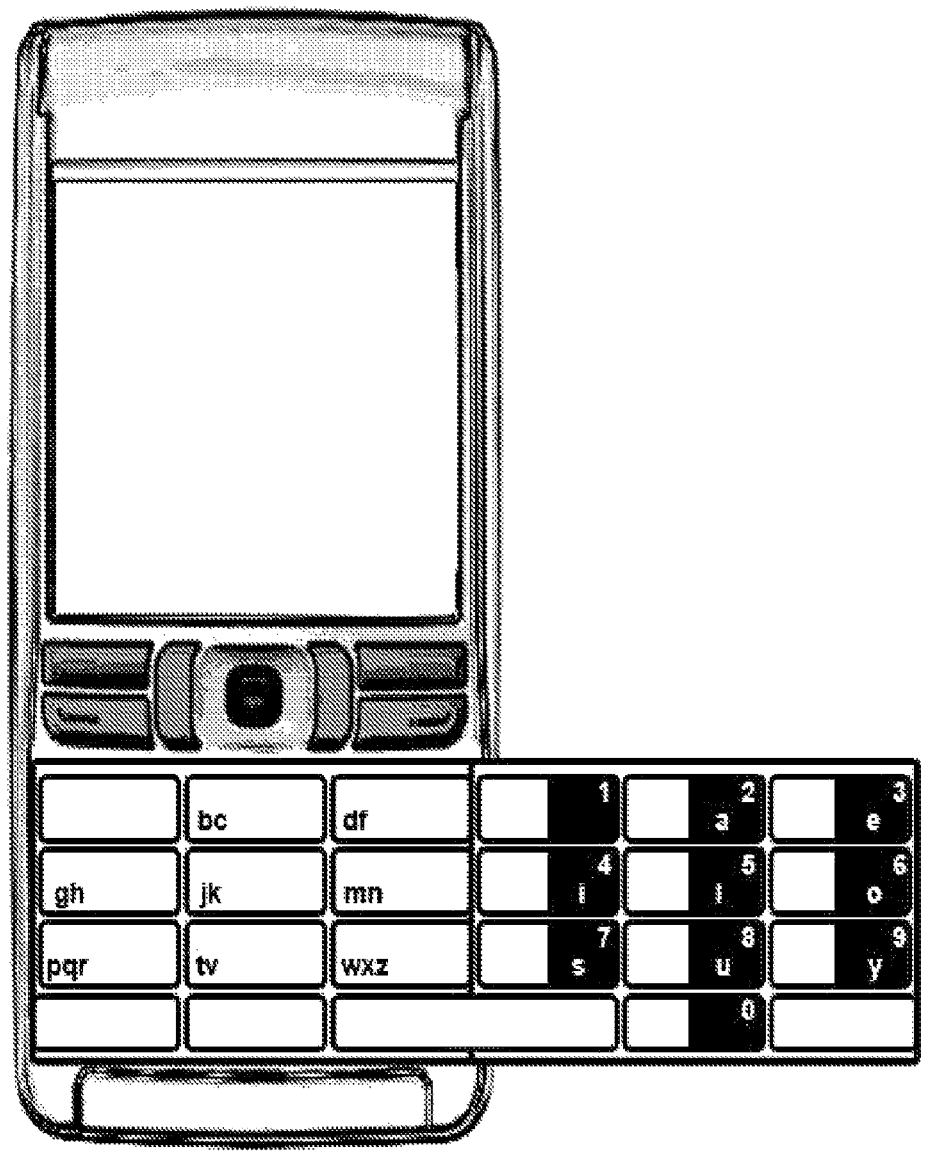
FIG. 51 Illustrative foldable/slidable design in open position.
Figure 52:
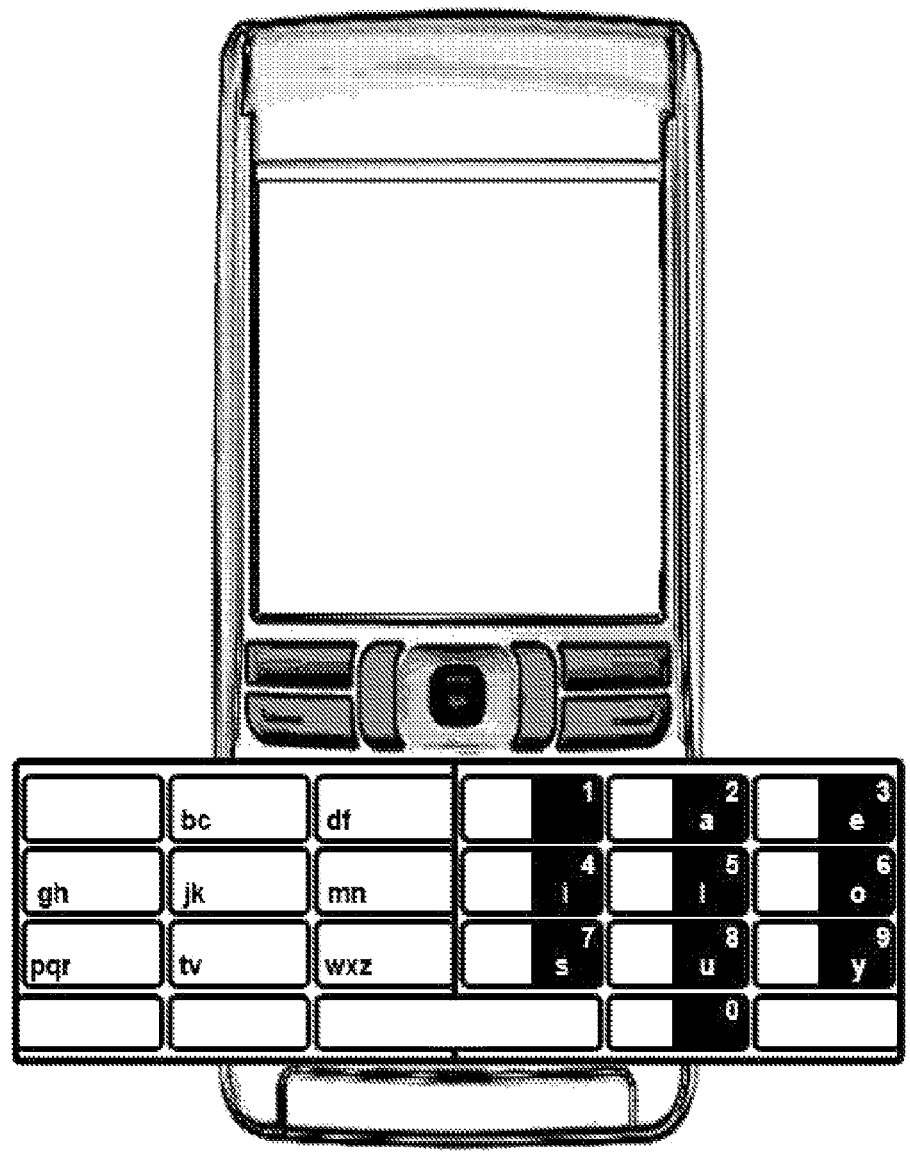
FIG. 52 Illustrative foldable/slidable design in open and centered position.
Figure 53:
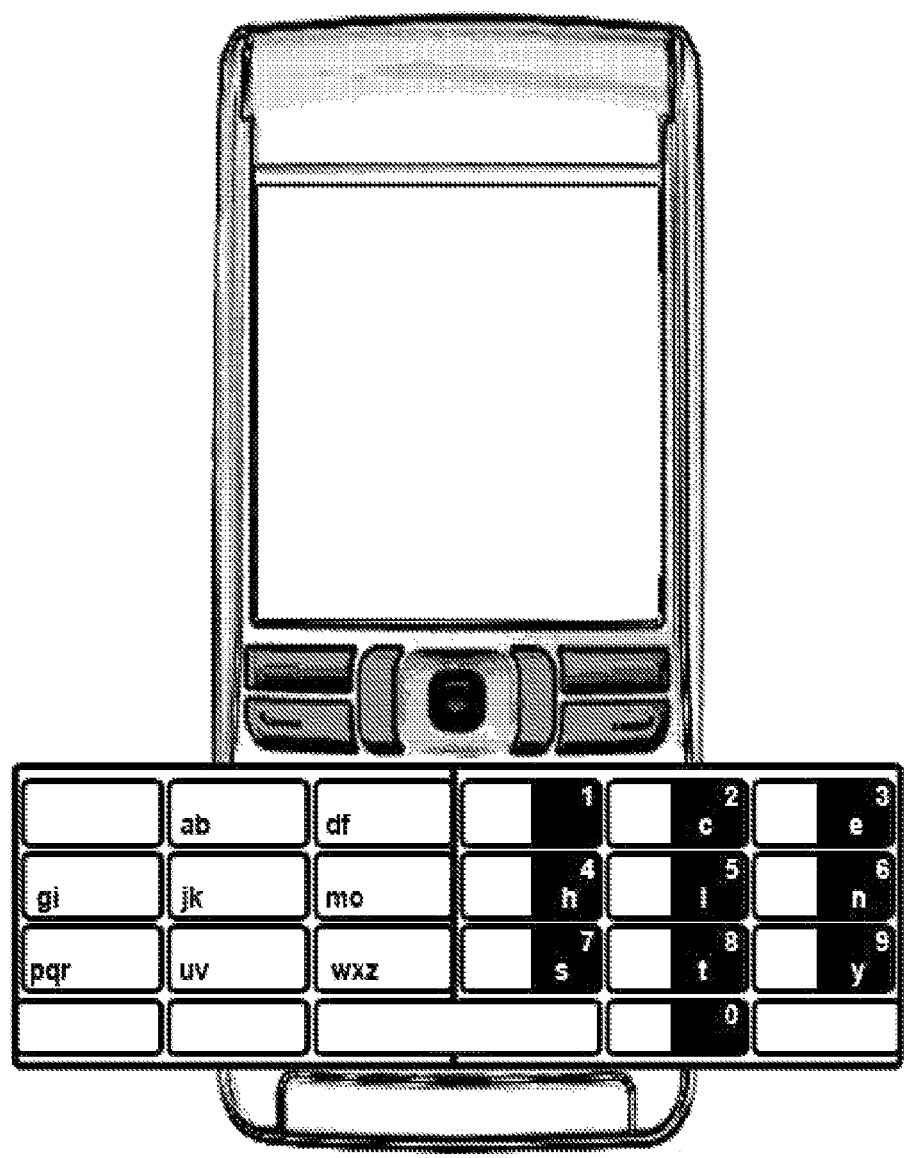
FIG. 53 Illustrative foldable/slidable design in open and centered position, with an alternative letter layout.

The second configuration of the keypad of FIG. 50 is shown in FIG. 51. Here, the key half labeled black in FIG. 50 now appears in 3 separate columns to the right. The transformation could be accomplished by a variety of mechanical means. For instance, the 3 right-most columns could have been folded out or rolled out from under or within the body of the device. Alternatively, the labels on the keys could be transparent on their left half, so that when the rightmost 3 columns of FIG. 51 are slid over the leftmost 3 columns of FIG. 51, they give the appearance of the 3-column keypad of FIG. 50. Other foldable and/or slideable or other mechanical means could be used to achieve the same effect of extending the 3-column keypad of FIG. 50 to the 6-column keypad of 51. Note that in this description, we are focusing on the disposition of the letter-assigned keys. Other keys, such as function keys, could be treated in a similar manner. As shown in FIG. 52, with a further sliding mechanism, the 6 columns of letter-assigned keys configuration can be centered with respect to the body of the device, improving the mechanical stability of the keypad in this configuration. To re-emphasize that a broad range of letter layouts are amenable to treatment according to the present embodiment, FIG. 53 shows an alternate compatible letter layout. Here, letters in the right half are chosen so as to improve typability as measured by lookup error rate. Compressed desktop keyboard standards are amenable to the same treatment. The techniques of this embodiment may be used also for column multiples other than 2, with appropriate modification of the folding and/or sliding mechanisms.

Provisions for Negative Space

The present embodiment illustrates how to provide negative space between keys in a beneficial manner. This can be done consistently with numerous other aspects of this invention. By negative space we mean non-actuatable space between keys, either vertically or horizontally. Thus, for the purposes of this embodiment, a rocker key is a treated as a single key since its entire continuous service is actuatable. The same consideration would apply to a touch screen implementation of a keyboard, if the space between keys is non-actuatable in text entry mode to input characters. Any not necessarily continuous curve on the touchscreen on which an input is equally likely to produce the same result as a direct input on more than one of the keys is treated as non-actuatable. For the purposes of this aspect, the area outside of the boundary of the keypad is treated as negative space. Thus any edge key has at least one edge which is bounded by effectively infinite negative space. We will call a substantial (vertical or horizontal) interior negative space an interior space between keys which is at least 10% (in width or height respectively) greater than the smallest (vertical or horizontal respectively) space between keys. A keypad with substantial negative space being one in which each interior key is adjacent to a substantial interior space. A uniform keypad with substantial negative space is one in which each key has substantially the same negative space, summing the space on both sides of the key in the relevant direction (vertical or horizontal). A preferred way to provide a uniform keypad with substantial negative space is to group the keys by pairs in the relevant direction. Preferably, the space between the members of the pair is small, and the space between the pairs is substantial. Preferably, the small spaces are substantially the same and the substantial spaces are substantially the same (in the relevant direction). An example is shown in FIG. 42, where a 6-column keypad is arranged so that the keys are grouped by pairs horizontally, to form 3 columns of pairs. The space between the pairs is larger than the space separating members of the pair. It will be appreciated that any even number of columns, or even number of rows, could be treated in the same manner. For odd numbers of columns or rows, one of the keys (in each row or column) would need to be expanded or shrunk in the relevant direction to compensate for its lack or surplusage of adjacent negative space, or otherwise out of stride with the pairs.

The provision of substantial negative space provides local tactile orientation information. This information can be augmented by additional tactile stimuli, such as a ridge or depression along the edges of the non-substantial negative spaces; these non-substantial negative spaces being typically, especially in a uniform array of negative space, between the members of a given pair, while the substantial negative space is between pairs. Roughly speaking, in the direction of a substantial negative space, the key feels somewhat as if it is an edge key. Ideally, each key can be pressed without substantial risk of pressing another key across the substantial negative space. Further local tactile stimuli signaling not only the presence of a negative space, substantial or not, but also co-ordinates within the array of keys and negative space could include ridges, depressions, bevels, key shapes, and the like which are unique or indicative of a particular location. An example would be Braille dots for the digits and/or letters or a subset of letters assigned to each key and/or pair of keys.

Figure 41:
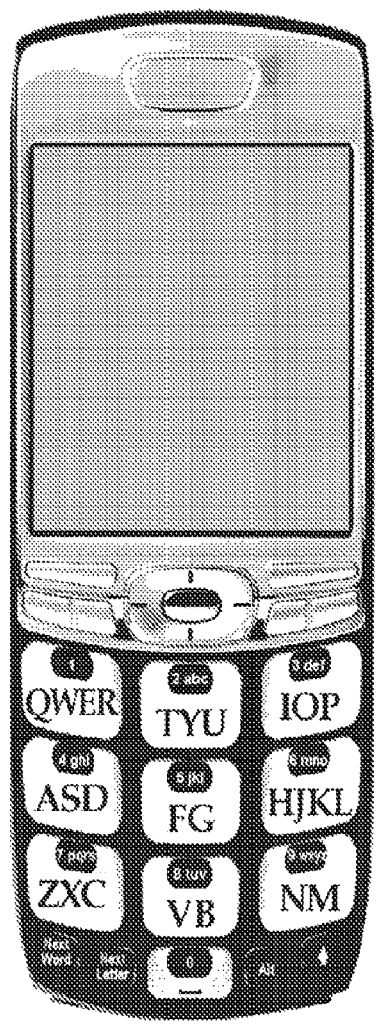
FIG. 41 Illustrative 3-column qwerty-like layout with full backward compatibility with a telephone keypad.
Figure 45:
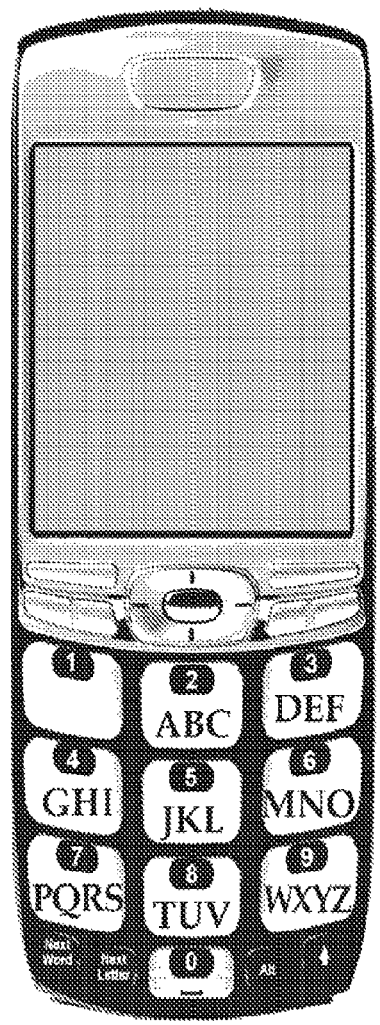
FIG. 45 Illustrative 3-column design compatible with 6-column backward compatibility designs.
Figure 46:
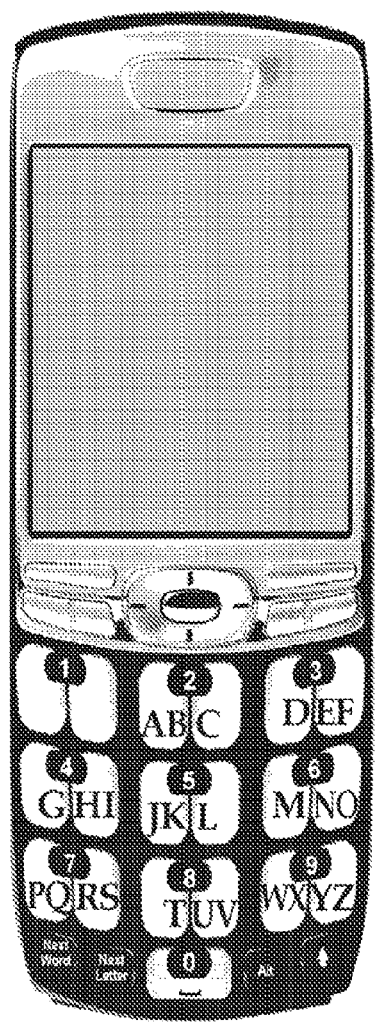
FIG. 46 Illustrative 6-column row-similar backward compatible design with maximum two letters per micro key.
Figure 47:
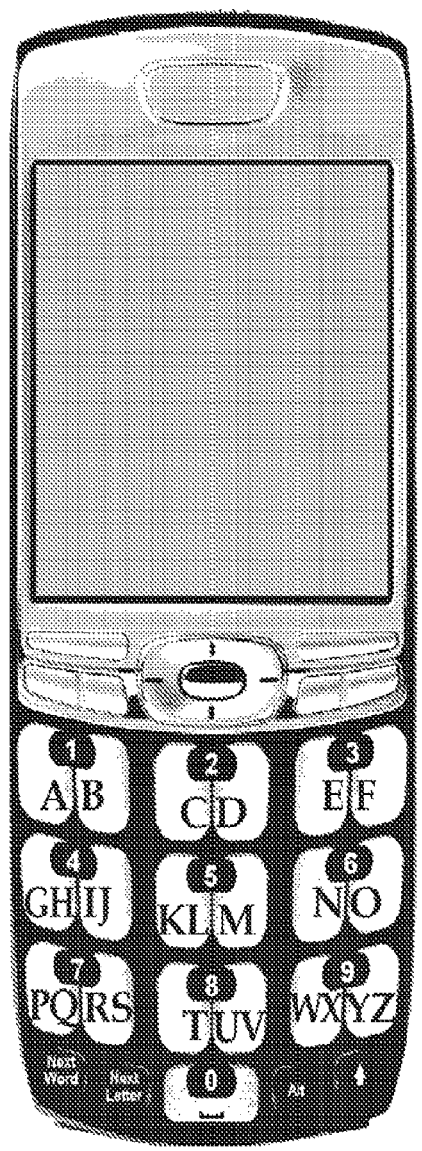
FIG. 47 Illustrative 6-column row-similar digit backward compatible design with maximum two letters per micro key.

The provision of substantial negative space just described is consistent with multiple keypad layouts being easily interchangeable. For instance, the 6-column keyboard just described could be easily transformed into a 3-column keyboard, where each pair in the 6-column keypad is replaced by a single key. For keypads to be subject to such transformation, it is preferable that the keys in the 2n-column version be elongated relative to the keys in the n-column version in the direction perpendicular to the pairing, as is illustrated by the keypad of FIG. 42. For the corresponding 3-column version, as shown in FIG. 41, the elongation of the keys in the 6-column version transforms to a lower aspect ratio. The keypad of FIG. 41 resembles a standard telephone keypad layout. This resemblance can be emphasized by labeling the keys both with a first row-similar layout (here row similar to qwerty) and a second row-similar layout (here, the standard telephone keypad for Latin, shown in the intercalated space). By appropriate visual markings (e.g. a different color background for the labeling of the standard telephone keypad, and a different font for the letters) the first and second letter layouts may be made visually distinct and non-confusing. A similar effect could be obtained by backlighting, polarized lighting, or other means. The dual 6-column/3-column versions of the device need differ only in their keypad. The labeling with letters of the standard telephone keypad could also be applied to the 6-column version, as shown in FIG. 43. The implementation could be a max2 implementation, as shown in FIG. 44. Alternatively, the 3-column version could be simply a standard telephone keypad, preferably marked in a way to show its family resemblance to the 6-column version, as shown in FIG. 45. Indeed, the 6-column version might also be row-similar to a telephone keypad in its first letter labeling, and there are various ways of doing so, some of which have already been described above. One way is to label the 6-column version so that each member of a pair is assigned letters from the same parent key in the 3-column version. An illustrative example is shown in FIG. 46. Another way is to distribute the letters as evenly as possible, while respecting row similarity, an illustrative example of which is shown in FIG. 47. From the forgoing, we appreciate that the keys could be further labeled, e.g. with punctuation, that label lings from other scripts or other standards in Latin script could be used, and that the 3-column/6-column pairing of alternate keyboards is but one of many within the scope of this written description and its appended claims.

Pseudo-Standard Keyboards

Figure 62:
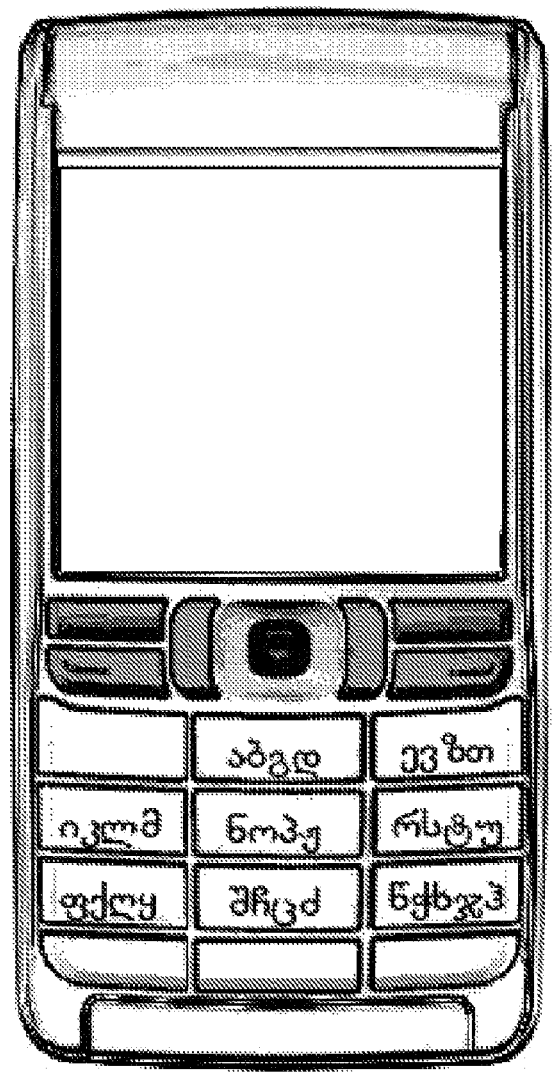
FIG. 62 An illustrative pseudo-standard for Georgian script.
Figure 63:
FIG. 63 All pseudo-standards for Georgian script, based on a selection of 33 Georgian letters.

Telephone keypad standards are typically even-as-possible distributions of base letters over 8 keys arranged in three rows and three columns, typically in alphabetic order. Only the right-most two keys of the top row are used for letter assignments. A pseudo-standard is an assignment of letters to keys which obeys these limitations, but is not as of this writing an officially recognized standard. Two useful not necessarily disjoint classes of pseudo standards are a) pseudo-standards for scripts for which there exists no official standard as of this writing with the letters arranged in alphabetic order, and b) pseudo-standards derived from desktop keyboard standards. For an illustrative example of the first class, we turn now to FIG. 62. To our knowledge, a telephone keypad standard for Georgian does not exist, and for the purposes of illustration, we will assume that it does not. FIG. 62 shows an alphabetically ordered, even-as-possible arrangement of Georgian script on 8 keys in three rows and three columns, with only the rightmost two keys of the top row used for letter assignments. For illustration, 33 letters from the Georgian script were chosen to represent the Georgian language. The even-as-possible property is understood to refer to the selection of 33 letters. If a different number of letters were chosen, different layouts would be even as possible. Given the selection of 33 letters, there is more than one even-as-possible layout, since 33 letters can be distributed over 8 keys in more than one way, and thus more than one pseudo-standard for this script, with this selection of letters. The set of such pseudo-standards is shown in FIG. 63, where each column represents a pseudo-standard, the horizontal bars separating the assignments to the various keys.

Figure 61:
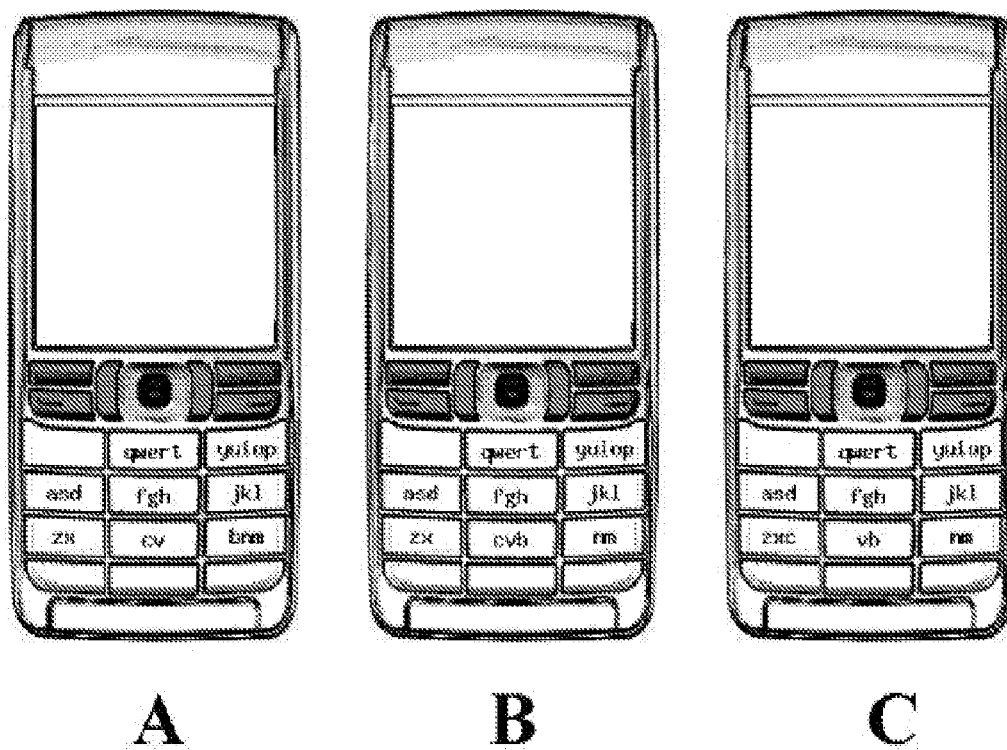
FIG. 61 Illustrative pseudo-standards based on qwerty.

A non-limiting example of a pseudo standard based on a desktop keyboard is shown in FIG. 61. This pseudo-standard is based on qwerty ordering of letters of the Latin script, and is row-similar to a full qwerty keyboard. As is the case of pseudo-standards of the first type, there may be multiple pseudo standards of this second type, all being different ways of distributing letters over the 8 keys as evenly as possible given other constraints (alphabetic order in the case of the example of the first type, and row similarity to a desktop standard in the case of the example of the second type). The possible qwerty-like pseudo-standards are shown in FIG. 61A-C.

Extension and Smooth Extension of Pseudo Standards

Pseudo standards, like telephone keypad standards may be subject to row-similar extension. These extensions may be smooth or non-smooth. As illustrated in other embodiments illustrating aspects of the present invention, members of a sequence of extensions may be optimized for typability according to a number of typability or structural criteria, if desired; this whether the extensions are of a telephone keypad standard or of a pseudo standard.

An Illustrative Embodiment for Chinese Pinyin

This embodiment is meant to further stress that which has already been stressed throughout: the scope of this invention extends well beyond the scope of the individual illustrative embodiments. In particular choices, of language, language data, number of columns of letter assigned keys, telephone or keyboard standards and so on used in the construction of the various embodiments are for didactic, illustrative purposes only. Now, therefore, we seek to construct keyboards for the entry of Chinese Pinyin, using again a 6-column qwerty-like keyboard with a maximum number of letters per key equal 3, to facilitate comparison with other embodiments. We will assume that tone marks are entered with separate digit keys or in a separate digit mode, so that ambiguity of letters and digits is not a concern for this embodiment. Within these structural constraints, we seek layouts which have good lookup error rates for Pinyin. The top 20 layouts found, based on lookup error rates calculated relative to illustrative statistical data for Pinyin are shown in FIG. 65. The lookup error rates are scaled relative to the standard telephone keypad for Latin, again assuming that digits are entered in a digit mode distinct from letter-entry mode. FIG. 64 shows two of these layouts in the context of a cell phone keyboard. FIG. 64A represents the top layout from FIG. 65. FIG. 64B represents the top layout which also has 12 isolated letters. Thus, both the layouts of FIGS. 64A-B are structural interior points of the set of layouts characterized by a fixed maximum number of letters equal 3, qwerty-like, with 6 columns of letter-assigned keys, where each key in each of the 6 columns and three rows is assigned at least one letter.

The invention claimed is:

1. An apparatus for inputting letters of a natural alphabetic language having a first array of a plurality of keys having a first layout of a plurality of letters from a natural language assigned to various of said keys with at least one of said keys having more than one of said letters thereon, said first array and said first layout being row-similar to a second apparatus having a second array of a plurality of keys and a second layout, said second layout being that of a standard telephone keypad for said natural language, and where a given layout will be said to be row similar to a standard layout if a base-letter label assigned to a key in a row of said standard layout is also assigned to the corresponding row in said given layout, and vice versa, so that both said row of said standard layout and said corresponding row of said given layout have the same said base-letter labels and thus the same integer number n of said base-letter labels, but said base-letter labels are partitioned across said keys in said row of said standard layout and said corresponding row of said given layout differently, such that if said integer number n of said labels in said row of said standard layout are distributed across said keys in said row according to a partition $P_1$ of said integer number n, then said corresponding row of said given layout has said base-letter labels partitioned across said keys of said corresponding row according to a partition $P_2$ of said integer n, where said partition $P_1$ is not identical to said partition $P_2$.

2. The apparatus defined in claim 1, wherein said first layout of keys being substantially optimized for at least one typability property.

3. The apparatus defined in claim 1, wherein the first array has all of said alphabetic letters assigned to keys on three rows.

4. The apparatus defined in claim 1, wherein the first layout is subject to the constraint of being in alphabetic order for said natural language.

5. The apparatus defined in claim 1, wherein the first layout is subject to the constraint of having row similarity to a standard typewriter keyboard.

6. The apparatus defined in claim 1, wherein said first array having a number of columns of keys that differs from the number of columns of keys in said second array.

7. The apparatus defined in claim 1, wherein the first layout is subject to the constraint of having a predetermined maximum range on an array-wise basis.

8. The apparatus defined in claim 7, wherein said predetermined maximum range is no greater than the maximum range of a standard telephone keypad.

9. The apparatus defined in claim 7, wherein said predetermined maximum range exceeds the maximum range of said standard telephone keypad by no more than 3.

10. The apparatus defined in claim 1, wherein said first layout is subject to the constraint of having no more than a predetermined maximum number of letters on any one key.

11. The apparatus defined in claim 10, wherein said predetermined maximum number of said letters on said any one key is no more than the maximum number of said letters on any one key in said second layout.

12. The apparatus defined in claim 1, wherein each row of said first layout is subject to the constraint of having no more than a predetermined maximum number of letters on any one key.

13. The apparatus defined in claim 1, wherein each row of said first layout has no more said letters assigned to any one of said keys in said each row than the maximum number of said letters assigned to any one of said keys in the corresponding row of said second layout.

14. The apparatus defined in claim 1, wherein the first layout of letters to keys is as even-as-possible on said first array given other constraints.

15. The apparatus defined in claim 1, wherein the first layout of letters to keys is as even-as-possible on a row-wise basis given other constraints.

16. The apparatus defined in claim 1, wherein there are no more than 2 base alphabetic letters assigned to any key.

17. The apparatus defined in claim 16, wherein said first array has at least 6 columns.

18. The apparatus defined in claim 1, wherein said keys of said first array are dual-labeled with a sub-layout of alphabetic letters row-similar to a standard telephone keypad and a sub-layout of alphabetic letters row-similar to a standard typewriter keyboard.

19. The apparatus defined in claim 1, wherein said keys of said first array are dual-labeled with a sub-layout of alphabetic letters row-similar to a standard telephone keypad in a first natural language and a sub-layout of alphabetic letters row-similar to a standard telephone keypad in a second natural language.

20. The apparatus defined in claim 1, wherein said keys of said first array are dual-labeled with a sub-layout of alphabetic letters row-similar to a standard typewriter keyboard in a first natural language and a sub-layout of alphabetic letters row-similar to a standard typewriter keyboard in a second natural language.

21. The apparatus defined in claim 1, wherein said keys of said first array are dual-labeled with a sub-layout of alphabetic letters row-similar to a standard telephone keypad for said natural language and a sub-layout of alphabetic letters which is row similar to a standard typewriter keyboard for said natural language.

22. An apparatus wherein keys of an array are dual-labeled with a sub-layout of alphabetic letters row-similar to a standard telephone keypad and a sub-layout of alphabetic letters row-similar to a standard typewriter keyboard, and where a given layout will be said to be row similar to a standard layout if a base-letter label assigned to a key in a row of said standard layout is also assigned to the corresponding row in said given layout, and vice versa, so that both said row of said standard layout and said corresponding row of said given layout have the same said base-letter labels and thus the same integer number n of said base-letter labels, but said base-letter labels are partitioned across said keys in said row of said standard layout and said corresponding row of said given layout differently, such that if said integer number n of said labels in said row of said standard layout are distributed across said keys in said row according to a partition $P_1$ of said integer number n, then said corresponding row of said given layout has said base-letter labels partitioned across said keys of said corresponding row according to a partition $P_2$ of said integer n, where said partition $P_1$ is not identical to said partition $P_2$.

23. The apparatus defined in claim 22, wherein such selective emphasis is accomplished by means of selective lighting.

24. The apparatus defined in claim 1, wherein the first layout is subject to the constraint of having a predetermined maximum range on a row-wise basis.

25. The apparatus defined in claim 24, wherein on a row-wise basis the predetermined maximum range for each row exceeds the maximum range of the corresponding row of a standard telephone keypad but by no more than 3.

26. The apparatus defined in claim 1, wherein said first layout is a member of a smooth sequence of layouts, such that said first layout may be transformed into any other member of said smooth sequence of layouts by a change in the number of columns containing said keys to which said letters are assigned, while break similarity and row similarity are maintained between said first layout and said any other member of said smooth sequence with a smaller number of columns containing said keys to which said letters are assigned.

27. The apparatus defined in claim 1, wherein said first layout is, is a member of a smooth sequence of layouts, such that said first layout may be transformed into any other member of said smooth sequence of layouts by a change in the number of columns containing said keys to which said letters are assigned, while break similarity and row similarity are maintained between said first layout and said any other member of said smooth sequence with a smaller number of columns containing said keys to which said letters are assigned.

28. The apparatus defined in claim 2, wherein at least one of said typability properties is the average keystrokes per character when prefix blocks are used for prediction of single letters.

29. The apparatus defined in claim 28, wherein at least one of said typability properties is lookup error rate.

30. The apparatus defined in claim 28, wherein at least one of said typability properties is query error rate.

31. The apparatus defined in claim 28, wherein at least one of said typability properties is flip rate.

32. The apparatus defined in claim 28, wherein at least one of said typability properties is the keystrokes per character when multi-tap is used as a text entry method, with or without the use of an auxiliary "next" key.

33. The apparatus defined in claim 28, wherein at least one of said typability properties is the average keystrokes per character when the letters are ordered by descending average probability.

34. The apparatus defined in claim 28, wherein at least one of said typability properties is the probability of an isolated letter or any of these combined with each other and/or further combined with word prediction and/or multiple next words prediction.

35. The apparatus defined in claim 28, wherein at least one of said typability properties is the probability of a letter being the first in the order, when the order of letters is fixed by their probability.

36. The apparatus defined in claim 1, wherein said alphabetic letters include vowels, each of said vowels being isolated on a key having no other letters assigned to it.

37. The apparatus defined in claim 1, wherein said keys on each of at least three rows of said first array are grouped in threes as a three-way rocker, having a left, right and middle selectable portions, said letters being arranged in a first layout on at least some of said portions of each of said rockers on a row-similar basis to said second layout.

38. The apparatus defined in claim 37, wherein at least some of said keys of said first array have digits assigned to them on a row-similar basis as compared to a standard telephone keypad, such that for each one of the keys of said rockers has assigned to it the same digits and letters as with respective keys of a standard telephone keypad, on a row-wise basis.

39. The apparatus defined in claim 37, wherein at least some of said keys of said first array have digits assigned to them on a row-similar basis as compared to a standard typewriter keyboard, such that for each one of the keys of said rockers has assigned to it the same digits and letters as with respective keys of a standard typewriter keyboard, on a row-wise basis.

40. The apparatus defined in claim 37, wherein said alphabetic letters include vowels and said rockers are three-way rockers, having a left, right and middle selectable portions, each of said vowels being isolated on a separate one of said selectable portions of said rockers.

41. The apparatus defined in claim 22, wherein said respective sub-layouts can be selectively emphasized for the user.

42. The apparatus defined in claim 22, wherein said keys of said array are dual-labeled with a sub-layout of alphabetic letters row-similar to a standard telephone keypad in a first natural language and a sub-layout of alphabetic letters row-similar to a standard typewriter keyboard in a second natural language.

43. The apparatus defined in claim 22, wherein at least some of said keys of said array have digits assigned to them on a row-similar basis as compared to a standard telephone keypad for at least three corresponding rows, but subject to the possibility of assignment of the same digit to two adjacent keys in a row of said array.

44. The apparatus defined in claim 43, wherein, when said array has an even number of columns, said digits are disposed on adjacent keys of each of the keys of three columns of at least three rows corresponding to the rows of a standard telephone keypad.

45. The apparatus defined in claim 43, wherein when said array has 6 columns, at least some of said digits are assigned to more than one adjacent key on a row-similar basis to a standard telephone keypad for at least three rows.

46. The apparatus defined in claim 43, wherein said array including a visual, audio or tactile indication of the assignment of said digits to more than one adjacent key on a row-similar basis to a standard telephone keypad for at least three rows.

47. The apparatus defined in claim 43, wherein, when said array has 6 columns, at least some of said digits are displayed on more than one adjacent key on a row-similar basis to a standard telephone keypad for at least three rows.

48. The apparatus defined in claim 43, wherein when said array has 6 columns of letter-assigned keys, said keys of each column on each of at least three rows are paired 1-2, 3-4, and 5-6, said digits are labeled between each pair of said keys in each row of said pair of columns, 3 digits for each of said at least three rows.

49. The apparatus defined in claim 43, wherein said array including a visual, audio or tactile indication of the assignment of said digits to more than one adjacent key on a row-similar basis to a standard telephone keypad for at least three rows.

50. The apparatus defined in claim 48, wherein said digits are selected by an action taken from the group of pressing either one of the adjacent keys of the pair of keys to which each of the respective digits are assigned, pressing both keys of said pair substantially simultaneously and selecting a number mode before or substantially simultaneously with pressing at least one of said pair of keys.

51. The apparatus defined in claim 43, wherein said second layout is a standard typewriter keyboard.

52. The apparatus defined in claim 43, wherein said second layout is a standard telephone keypad.

53. The apparatus defined in claim 43, wherein when a same digit is assigned to each of a pair of horizontally adjacent keys, the digit assigned to each of said keys in a said pair is displayed generally between at least part of each one of said keys in each of said pairs.

54. The apparatus defined in claim 48, wherein both keys of each one of said pairs of keys are integrated into single rocker key.

55. The apparatus defined in claim 54, wherein the digit assigned to each of said pairs of keys is selected by pressing down on said rocker key rather than to the left or right.

56. The apparatus defined in claim 54, wherein each one of the keys of said rockers has assigned to it the same digits and letters as with respective keys of a standard telephone keypad, on a row-wise basis.

57. The apparatus defined in claim 54, wherein each of said rockers including said pair of keys has the same digits and letters assigned to it as with respective keys of a standard telephone keypad, on a row-wise basis.

58. The apparatus defined in claim 54, wherein both keys of each one of said pairs of keys are configured as separately operable pseudo-rocker keys.

59. The apparatus defined in claim 54, wherein said alphabetic letters include vowels, each of said vowels being isolated on one of said pair of keys forming rocker.

60. An apparatus for inputting letters of a natural alphabetic language having a first configuration comprising a first array of a plurality of keys arranged over a predetermined number m of columns of letter-assigned keys, where a column is keys is deemed letter-assigned if at least one key in said column is assigned said letters, and a first layout of a plurality of said letters from said natural language assigned to various of said keys with at least one of said keys having more than one of said letters thereon, said first layout being row-similar to a second apparatus having a second array of a plurality of keys arranged over three columns and a second layout of a plurality of letters taken from the group of standard telephone keypads layouts having substantially alphabetic ordering of letters and standard typewriter keyboards layouts for said natural language, said first layout differing from said second layout in that at least one row of said first layout contains the same said letters as a corresponding row in said second layout but ordered differently along said corresponding row, and where a given layout will be said to be row similar to a standard layout if a base-letter label assigned to a key in a row of said standard layout is also assigned to the corresponding row in said given layout, and vice versa, so that both said row of said standard layout and said corresponding row of said given layout have the same said base-letter labels and thus the same integer number n of said base-letter labels, but said base-letter labels are partitioned across said keys in said row of said standard layout and said corresponding row of said given layout differently, such that if said integer number n of said labels in said row of said standard layout are distributed across said keys in said row according to a partition $P_1$ of said integer number n, then said corresponding row of said given layout has said base-letter labels partitioned across said keys of said corresponding row according to a partition $P_2$ of said integer n, where said partition $P_1$ is not identical to said partition $P_2$.

61. The apparatus defined in claim 60, wherein at least some of said keys of said first array have digits assigned to them on a row-similar basis as compared to a standard telephone keypad for at least three corresponding rows.

62. The apparatus defined in claim 60, wherein, on said keys having visually distinct portions, different ones of said letters assigned to said keys are displayed on different visually distinct portions.

63. The apparatus defined in claim 60, wherein said apparatus further comprises a second configuration where said first array has 2m columns of letter-assigned keys, being double the number of columns of letter-assigned keys of said first array in said first configuration, and said second layout is a layout of a standard telephone keypad.

64. The apparatus defined in claim 63, wherein said apparatus further comprises a second configuration where said first array has double the number of columns of keys of said first array in said first configuration and said second layout is a layout of a standard typewriter keyboard.

65. The apparatus defined in claim 63, wherein said first configuration is changed to said second configuration by mechanical means.

66. The apparatus defined in claim 65, wherein said mechanical means include an additional array of keys, said additional array of keys being deployed from the body of said apparatus and positioned adjacent said first array of keys of said first configuration.

67. The apparatus defined in claim 66, wherein said first array of keys in said first configuration and said second array of keys in said second configuration can be mechanically centered over said apparatus.

68. The apparatus defined in claim 65, wherein the changing of said first configuration to said second configuration causes said key having visually distinct portions to be separated one from the other between the first array and the additional array.

69. The apparatus defined in claim 68, wherein different ones of said letters are respectively assigned to said first array or to said additional array in a manner to improve at least one property relating to typability.

\* \* \* \* \*